US010149191B2

United States Patent
Takano

(10) Patent No.: US 10,149,191 B2
(45) Date of Patent: Dec. 4, 2018

(54) COMMUNICATION CONTROL DEVICE, COMMUNICATION CONTROL METHOD, TERMINAL DEVICE, AND INFORMATION PROCESSING DEVICE

(71) Applicant: SONY CORPORATION, Tokyo (JP)

(72) Inventor: Hiroaki Takano, Saitama (JP)

(73) Assignee: Sony Corporation, Tokyo (JP)

( * ) Notice: Subject to any disclaimer, the term of this patent is extended or adjusted under 35 U.S.C. 154(b) by 194 days.

(21) Appl. No.: 14/782,709

(22) PCT Filed: Apr. 1, 2014

(86) PCT No.: PCT/JP2014/059681
§ 371 (c)(1),
(2) Date: Oct. 6, 2015

(87) PCT Pub. No.: WO2014/185185
PCT Pub. Date: Nov. 20, 2014

(65) Prior Publication Data
US 2016/0057645 A1  Feb. 25, 2016

(30) Foreign Application Priority Data

May 17, 2013 (JP) ................................. 2013-105005

(51) Int. Cl.
*H04W 24/10* (2009.01)
*H04W 72/04* (2009.01)
(Continued)

(52) U.S. Cl.
CPC ....... *H04W 24/10* (2013.01); *H04W 72/0453* (2013.01); *H04W 72/085* (2013.01); *H04W 88/02* (2013.01)

(58) Field of Classification Search
CPC ... H04W 72/085; H04W 24/08; H04W 36/30; H04W 24/10; H04W 24/00; H04W 48/16;
(Continued)

(56) References Cited

U.S. PATENT DOCUMENTS 6,397,041 B1* 5/2002 Ballard ................. H04W 52/24
455/226.1
8,264,975 B2* 9/2012 Yuan .................... H04B 17/382
370/208
(Continued)

FOREIGN PATENT DOCUMENTS

JP  2010-219793 A  9/2010
JP  2012-138693 A  7/2012
(Continued)

OTHER PUBLICATIONS

3GPP ETSI TS 136 331 V10.2.0 LTE; Evolved Universal Terrestrial Radio Access (E-UTRA); Radio Resource Control (RRC); Protocol specification (3GPP TS 36.331 version 10.2.0 Release 10) http://www.etsi.org/deliver/etsi_ts/136300_136399/136331/10.02.00_60/ts_136331v100200p.pdf (Jul. 2011).*
(Continued)

*Primary Examiner* — Wutchung Chu
(74) *Attorney, Agent, or Firm* — Xsensus LLP

(57) ABSTRACT

A communication control device includes an acquisition unit configured to acquire measurement related information related to execution of measurement by a terminal device in an extension band, which is other than a band of a predetermined bandwidth in frequency bands allocated to a service provider; and a control unit configured to perform control related to the measurement by the terminal device in the extension band, on the basis of the measurement related information.

20 Claims, 38 Drawing Sheets

(51) Int. Cl.
*H04W 72/08* (2009.01)
*H04W 88/02* (2009.01)

(58) Field of Classification Search
CPC .......... H04W 72/0446; H04W 36/0055; H04L 1/0031; H04L 5/001; H04L 1/0026; H04L 5/0053; H04L 5/0091
See application file for complete search history.

(56) References Cited

U.S. PATENT DOCUMENTS

| | | | | |
|---|---|---|---|---|
| 8,537,718 | B2* | 9/2013 | Etemad | H04L 5/003 370/254 |
| 8,660,559 | B2* | 2/2014 | Tamura | H04W 24/10 455/436 |
| 9,014,039 | B2* | 4/2015 | Jeong | H04W 36/0094 370/252 |
| 9,247,542 | B2* | 1/2016 | Ahmadi | H04W 72/0453 |
| 9,319,204 | B2* | 4/2016 | Kazmi | H04L 5/0091 |
| 9,648,553 | B2* | 5/2017 | Chen | H04W 48/16 |
| 9,686,706 | B2* | 6/2017 | Kim | H04W 24/10 |
| 2005/0047528 | A1* | 3/2005 | Koskela | H03D 3/007 375/329 |
| 2008/0267086 | A1* | 10/2008 | Wheatley | H04B 17/345 370/252 |
| 2009/0010219 | A1* | 1/2009 | Lee | H04W 28/20 370/329 |
| 2011/0076999 | A1* | 3/2011 | Kazmi | H04W 24/10 455/423 |
| 2011/0310753 | A1* | 12/2011 | Chou | H04W 48/16 370/252 |
| 2012/0178465 | A1 | 7/2012 | Lin et al. | |
| 2012/0213107 | A1* | 8/2012 | Jang | H04W 24/10 370/252 |
| 2013/0016613 | A1* | 1/2013 | Huang | H04W 72/085 370/241 |
| 2013/0088980 | A1* | 4/2013 | Kim | H04W 24/00 370/252 |
| 2013/0107743 | A1* | 5/2013 | Ishii | H04L 5/001 370/252 |
| 2013/0136015 | A1* | 5/2013 | Ojala | H04L 5/001 370/252 |
| 2013/0225160 | A1* | 8/2013 | Fujino | H04W 48/16 455/423 |
| 2013/0229931 | A1* | 9/2013 | Kim | H04W 24/10 370/252 |
| 2013/0294416 | A1* | 11/2013 | Li | H04W 36/30 370/332 |
| 2014/0044109 | A1 | 2/2014 | Nogami et al. | |
| 2014/0140293 | A1* | 5/2014 | Sharma | H04L 5/001 370/329 |
| 2014/0204791 | A1* | 7/2014 | Teng | H04W 16/14 370/252 |
| 2014/0293818 | A1* | 10/2014 | Sesia | H04B 17/318 370/252 |
| 2014/0301235 | A1* | 10/2014 | Ahn | H04W 16/14 370/252 |
| 2014/0376393 | A1* | 12/2014 | Shi | H04W 24/06 370/252 |

FOREIGN PATENT DOCUMENTS

| | | |
|---|---|---|
| JP | 2012-222430 A | 11/2012 |
| WO | WO 2012/137764 A1 | 10/2012 |
| WO | WO 2013/023377 A1 | 2/2013 |

OTHER PUBLICATIONS

Extended European Search Report dated Nov. 28, 2016 in Patent Application No. 14797706.0.
International Search Report dated Jul. 8, 2014 in PCT/JP2014/059681.
Motorola Mobility, "Characteristics of Additional Carrier Types" 3GPP TSG-RAN WG1#67 R1-114020, Nov. 2011, 6 Pages.
Alcatel-Lucent, Alcatel-Lucent Shanghai Bell, "Design Considerations for Extension Carriers and Carrier Segments" 3GPP TSG-RAN WG1 #59bis R1-100408, Jan. 2010, 4 Pages.
NTT Docomo, AT&T, Deutch Telekom, "Bandwidth extension in LTE Advanced" TSG-RAN Working Group 4 Meeting #53 R4-094743, Nov. 2009, 3 Pages.
AT&T, "NCT and Band Filling" 3GPP TSG RAN WG1 Meeting #71 R1-125347, Nov. 2012, 3 Pages.
Office Action dated Apr. 10, 2018 in Japanese Patent Application No. 2015-516993 (with English language translation), 16 pages.
Office Action dated Jun. 5, 2018 in Chinese Patent Application No. 201480026376.8 (with English translation), 20 pages.
European Office Action dated Aug. 31, 2018 in European Application No. 14797706.0-1214.

* cited by examiner

COMMUNICATION CONTROL DEVICE, COMMUNICATION CONTROL METHOD, TERMINAL DEVICE, AND INFORMATION PROCESSING DEVICE

TECHNICAL FIELD

The present disclosure relates to a communication control device, a communication control method, a terminal device, and an information processing device.

BACKGROUND ART

The 3GPP (Third Generation Partnership Project) is now standardizing LTE (Long Term Evolution) and LTE-A (Advanced). For example, as channel bandwidths of LTE and LET-A, six bandwidths are standardized: 1.4 MHz, 3 MHz, 5 MHz, 10 MHz, 15 MHz, and 20 MHz.

On the other hand, bands for mobile communication that are allocated in other countries do not necessarily have the above-described bandwidths. Accordingly, part of the allocated bands may remain unused. It would be desirable to utilize such remaining band, which is other than the bands of predetermined bandwidths in the allocated frequency bands. This point is indicated in Non-Patent Literature 1.

In addition, Patent Literature 1 discloses a terminal device performing wireless communication not only in a component carrier but also in a band between the component carrier and another adjacent component carrier.

CITATION LIST

Patent Literature

Patent Literature 1: JP 2010-219793A

Non-Patent Literature

Non-Patent Literature 1: "NCT and Band Filling", 3GPP TSG RAN WG1 Meeting #71, New Orleans, USA, R1-125347, 12-16 Nov. 2012

SUMMARY OF INVENTION

Technical Problem

In a case in which a terminal device performs wireless communication also in a remaining band, which is other than bands of predetermined bandwidths in frequency bands allocated to a service provider, since the remaining band is also used, the terminal device may execute measurement also in the remaining band. However, in this case, the terminal device executes measurement in the bands of the predetermined bandwidths and the remaining band (that is, a wider band). As a result, a load of measurement on the terminal device may be increased.

Accordingly, it would be desirable to provide a mechanism that enables the load of measurement by the terminal device to be suppressed in a case in which the allocated frequency bands are utilized.

Solution to Problem

According to the present disclosure, there is provided a communication control device including: an acquisition unit configured to acquire measurement related information related to execution of measurement by a terminal device in an extension band, which is other than a band of a predetermined bandwidth in frequency bands allocated to a service provider; and a control unit configured to perform control related to the measurement by the terminal device in the extension band, on the basis of the measurement related information.

According to the present disclosure, there is provided a communication control method including: acquiring measurement related information related to execution of measurement by a terminal device in an extension band, which is other than a band of a predetermined bandwidth in frequency bands allocated to a service provider; and performing control related to the measurement by the terminal device in the extension band, on the basis of the measurement related information.

According to the present disclosure, there is provided a terminal device including: a recognition unit configured to recognize an extension band, which is other than a band of a predetermined bandwidth in frequency bands allocated to a service provider; and a control unit configured to control execution of measurement in a manner that part of the measurement in the extension band is not executed or none of the measurement in the extension band is executed.

According to the present disclosure, there is provided an information processing device including: a memory configured to store a predetermined program; and a processor capable of executing the predetermined program. The predetermined program causes execution of recognizing an extension band, which is other than a band of a predetermined bandwidth in frequency bands allocated to a service provider, and controlling execution of measurement in a manner that part of the measurement in the extension band is not executed or none of the measurement in the extension band is executed.

Advantageous Effects of Invention

As described above, according to the present disclosure, it becomes possible to suppress the load of measurement by the terminal device in a case in which the allocated frequency bands are utilized.

DESCRIPTION OF EMBODIMENTS

Hereinafter, preferred embodiments of the present disclosure will be described in detail with reference to the appended drawings. In this specification and the drawings, structural elements that have substantially the same function and structure are denoted with the same reference signs, and repeated explanation is omitted.

The description will be made in the following order.
1. Introduction
2. Schematic Configuration of Communication System according to Embodiment of Present Disclosure
3. First Embodiment
   3.1. Configuration of eNode B
   3.2. Configuration of UE
   3.3. Flow of Process
   3.4. Modification Example
4. Second Embodiment
   4.1. Configuration of UE
   4.2. Flow of Process
5. Third Embodiment
   5.1. Configuration of eNode B
   5.2. Configuration of UE
   5.3. Flow of Process
   5.4. Modification Example
6. Fourth Embodiment
   6.1. Configuration of eNode B
   6.2. Configuration of UE
   6.3. Flow of Process
   6.4. Modification Example
7. Application Example
   6.1. Application Example of eNode B
   6.2. Application Example of UE
8. Conclusion 1. Introduction First, carrier aggregation, extension band, and measurement will be described with reference to FIGS. 1 to 4.
(Carrier Aggregation)
   Component Carrier
   In carrier aggregation of Release 10, up to five component carriers (CCs) are bundled and used by a UE (User Equipment). Each CC is a bandwidth of up to 20 MHz. In carrier aggregation, CCs continuing in a frequency direction are used in some cases and CCs separated in the frequency direction are used in some cases. In carrier aggregation, the CCs to be used can be set for each UE.

Primary CC and Secondary CC

In carrier aggregation, one of the plurality of CCs used by the UE is a special CC. The one special CC is referred to as a primary component carrier (PCC). Of the plurality of CCs, the remaining CCs are referred to as secondary component carriers (SCCs). The PCC can differ for each UE. This point will be described more specifically below with reference to FIG. 1.

Figure 1:
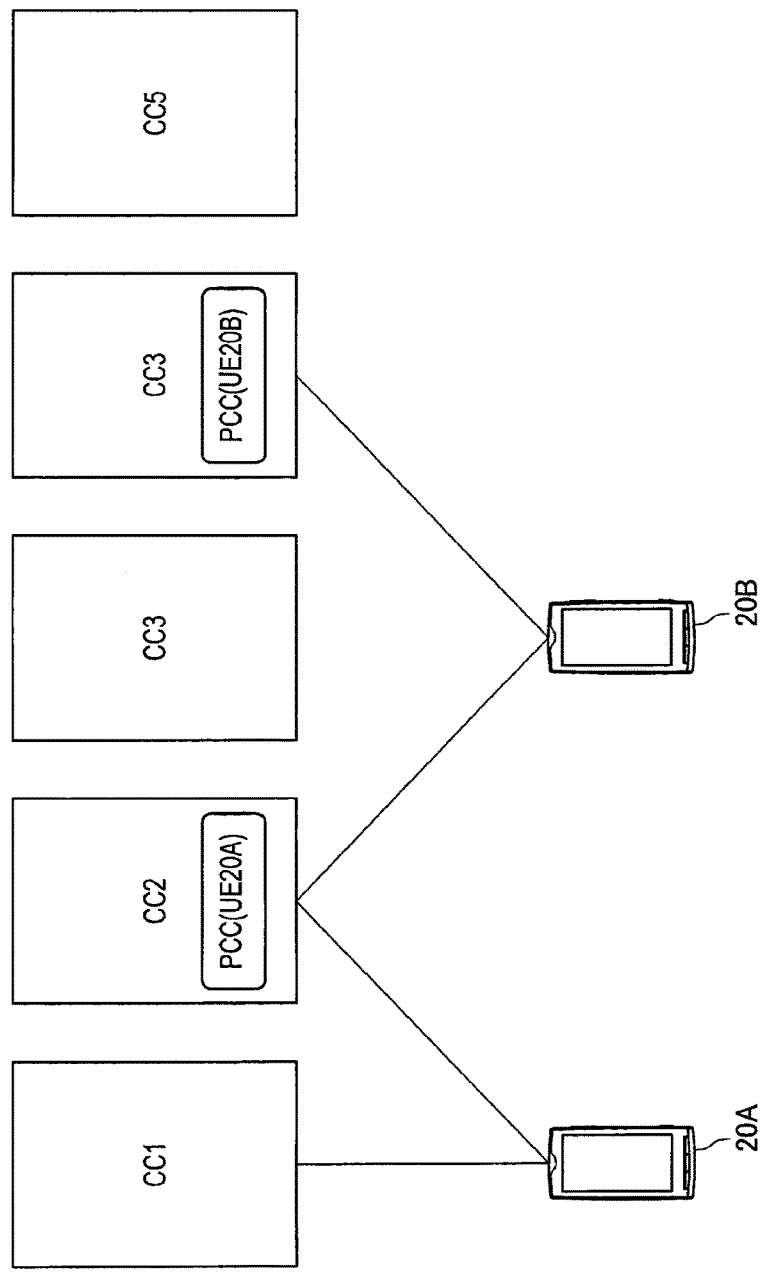
FIG. 1 is an explanatory diagram illustrating an example of a PCC of each UE.

FIG. 1 is an explanatory diagram illustrating an example of the PCC of each UE. A UE 20A, a UE 20B, and five CCs 1 to 5 are illustrated in FIG. 1. In this example, the UE 20A uses two CCs, the CC 1 and the CC 2. The UE 20A uses the CC 2 as the PCC. On the other hand, the UE 20B uses two CCs, the CC 2 and the CC 4. The UE 20B uses the CC 4 as the PCC. In this way, each UE can use a different CC as the PCC.

Since the PCC is the most important CC among the plurality of CCs, the CC for which communication quality is the stablest is preferable. Which CC is used as the PCC actually depends on the way in which they are installed.

The CC with which a UE initially establishes connection is the PCC for the UE. The SCC is added to the PCC. That is, the PCC is a main frequency band and the SCC is an auxiliary frequency band. The SCC is changed by deleting the existing SCC and adding a new SCC. The PCC is changed in an inter-frequency handover sequence of the related art. In carrier aggregation, a UE can not use only the SCC, but necessarily uses one PCC.

The PCC is also referred to as a primary cell. The SCC is also referred to as a secondary cell.

CRS in Each CC

In carrier aggregation, a common reference signal (CRS) is transmitted in each CC. The common reference signal is also referred to as a cell-specific reference signal.

(Extension Band)

Six bandwidths are standardized as channel bandwidths of LTE and LTE-A: 1.4 MHz, 3 MHz, 5 MHz, 10 MHz, 15 MHz, and 20 MHz. That is, the bandwidth of a component carrier (CC) is selected from the six bandwidths.

On the other hand, the bandwidths of frequency bands allocated to service providers in each country often differ from the above six bandwidths. For example, in Germany, a band of 3.8 MHz or 7.2 MHz is allocated. In Italy, a band of 11.8 MHz or 12.4 MHz is allocated. In Slovakia, a band of 6 MHz or 7 MHz is allocated.

In this manner, the bandwidths of the allocated frequency bands are different from the predetermined bandwidths (i.e., CCs) according to the communication standard, and thus, bands other than the band of the predetermined bandwidths in the allocated frequency bands remain unused. In the present specification, the entire or part of the remaining band is referred to as an extension band. The communication industry needs to utilize such an extension band. This point is indicated in Non-Patent Literature, "NCT and Band Filling", 3GPP TSG RAN WG1 Meeting #71, New Orleans, USA, R1-125347, 12-16 Nov. 2012'. A specific example of the extension band will be shown below with reference to FIG. 2.

Figure 2:
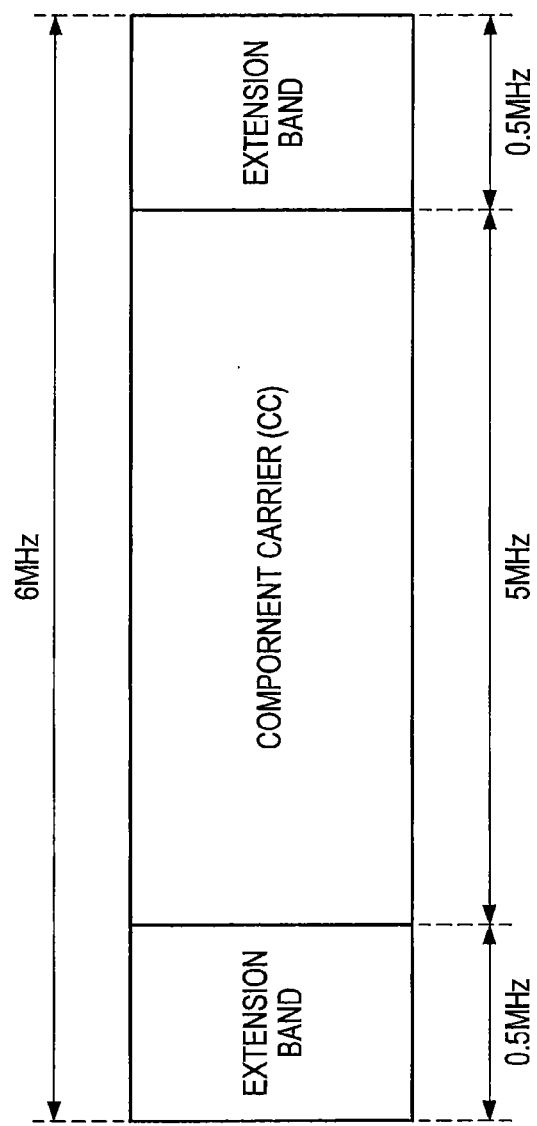
FIG. 2 is an explanatory diagram illustrating an example of an extension band.

FIG. 2 is an explanatory diagram illustrating an example of the extension band. Referring to FIG. 2, a frequency band of 6 MHz allocated to a service provider is illustrated. A band of 5 MHz in the frequency band is used as a CC. In this case, in the frequency band of 6 MHz, a band other than the CC of 5 MHz is the extension band. In this example, two bands of 0.5 MHz each are extension bands.

Note that the bandwidth of the extension band may be less than 1.4 MHz. Thus, it would not be desirable to handle the extension band as an individual CC. Therefore, it would be desirable to handle the extension band as a band accompanying the CC.

(Measurement)

Measurement indicates measurement of the quality of a transmission route. An UE executes measurement. Then, the result of the measurement is reported by the UE to an eNode B (Evolved Node B).

Measurement Target

The measurement target includes three kinds of frequency bands. Firstly, a frequency band being used in a serving cell is the measurement target. This is the frequency band being used by the UE for wireless communication with the eNode B. In a case of carrier aggregation, the PCC and the SCC are measurement targets. Secondly, a frequency band included in a white list contained in system information transmitted by the eNode B is the frequency band being the measurement target. Thirdly, a frequency band detected by the UE is the frequency band being the measurement target.

RSRP and CRS

Typical results of measurement in a downlink are an RSRP (Reference Signal Received Power) and an RSRQ (Reference Signal Received Quality). The RSRP and the RSRQ are obtained through measurement using the CRS (Cell Specific Reference Symbol).

The RSRP is a result of measurement of electric power of the CRS. Since the CRS is a signal unique to each cell, by use of the CRS, a reception power from which interfering components are eliminated is measured. To eliminate effects of fading, the RSRP is averaged over a certain period of time. To obtain reliable results, the reception power of the CRS is averaged over a certain period of time, and thus, a large amount of calculation cost and power consumption can be necessary in the UE. The measurement is a process that needs a heavy load on the UE. Accordingly, if surplus measurement is omitted, the calculation cost and power consumption of the UE can be reduced.

The RSRQ is calculated from the RSRP and an RSSI (Received Signal Strength Indicator). Typically, the UE reports both the RSRP and the RSRQ.

CRS and Antenna Port

The CRS can be transmitted for each antenna port. Specifically, the CRS for up to four antenna ports can be transmitted for each antenna port. In this case, the CRS is transmitted at a position according to the antenna port (that is, a resource element). A specific example regarding this point will be described below with reference to FIG. 3.

Figure 3:
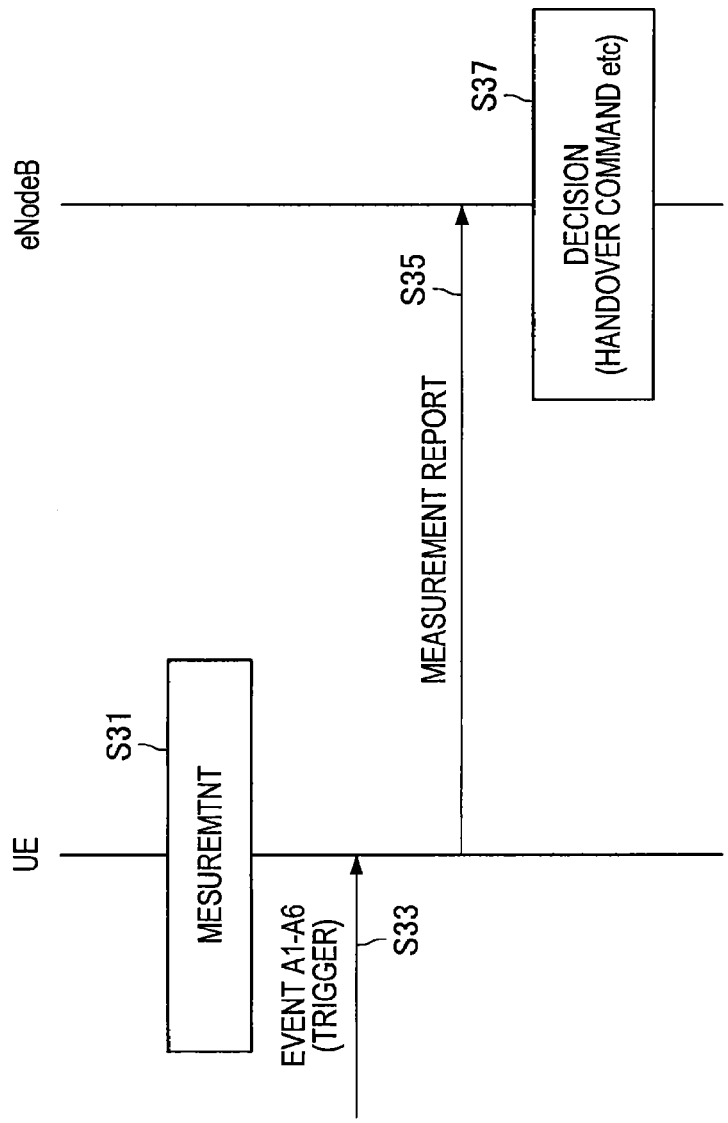
FIG. 3 is an explanatory diagram illustrating an example of a CRS of each antenna port.

FIG. 3 is an explanatory diagram illustrating an example of the CRS of each antenna port. Referring to FIG. 3, resource blocks corresponding to the respective four antenna ports (antenna ports 0 to 3) are illustrated. For example, the CRS is transmitted in a resource element 41 in a resource block 40 corresponding to each antennal port port. In addition, a resource element 43 is a DTX (Discontinuous Transmission) resource element for protecting the CRS in another antenna port. In addition, a resource element 45 is a resource element for a control signal or a data signal other than the CRS. In this manner, the CRS is transmitted in different resource elements for each antenna port.

When the UE receives such CRS according to the antenna port, a channel response between four imaginary antennas and the UE is obtained. If the UE has two antennas, a channel response of a 4×2 matrix size is obtained. Since the CRS is not multiplied by a weighting factor for beam forming on a transmitter side, a pure channel response can be obtained.

As illustrated in FIG. 3, in a case in which the CRS according to the antenna port is transmitted, the number of CRSs is increased with the increase of antennal ports. As a result, overheads are increased.

Purpose of Use of CRS

The CRS has existed since Release 8, and is used for various purposes. Firstly, as described above, the CRS is used for measurement. Secondly, as described above, the CRS is used to obtain channel information. Thirdly, the CRS is also used for feedback of a CQI (Channel Quality Indicator) to an eNode B. Fourthly, the CRS is also used for Transmit Diversity.

In Release 10 and Release 11, to obtain channel information, a CSI-RS (Channel State Information Reference Signal) is used. To perform decoding, a DMRS (Demodulation Reference Signal) is used. However, the CRS is an important reference signal (RS) for measurement.

Purpose of Use of Measurement Results

The RSRP and RSSQ are used for cell selection, cell reselection, and handover.

Case of RRC_Connected State

For example, in a case in which the UE is in an RRC_Connected state, the measurement result reported by the UE is used to decide handover, for example. That is, the eNode B decides handover on the basis of the measurement result reported by the UE. This point will be described below with reference to FIG. 4.

Figure 4:
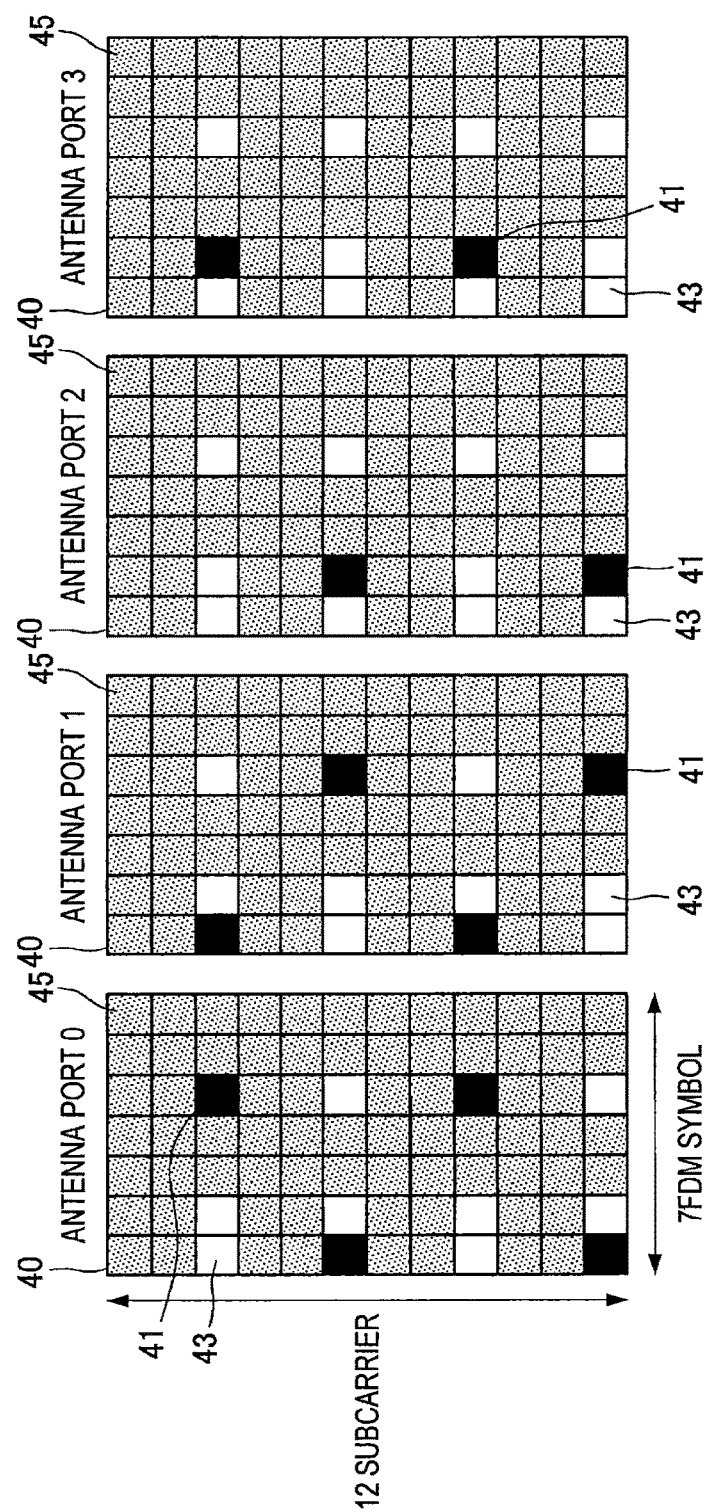
FIG. 4 is a sequence diagram illustrating an example of a process from measurement to decision of handover.

FIG. 4 is a sequence diagram illustrating an example of a process from the measurement to the decision of handover. Referring to FIG. 4, first, the UE executes measurement (S31). Then, from the result of the measurement, any event occurs for report (S33). The event triggers the report of the measurement result by the UE, and the UE reports the measurement result (S35). After that, on the basis of the reported measurement result, the eNode B determines whether or not to perform handover, and decides handover, for example (S37). As an example, on the basis of the measurement result, the eNode B decides handover of the UE from a cell to another cell. For example, a handover to a cell having the highest RSRP is decided.

Case of RRC_Idle State

Further, for example, in a case in which the UE is in an RRC_Idle state, the measurement result reported by the UE is used for cell selection, for example. That is, the UE executes measurement also in a case of an RRC (Radio Resource Control)_Idle state. Thus, it becomes possible for the UE to select an optimal cell or eNode B for reception of information in a paging channel, and to select an optimal cell or eNode B in performing a random access.

Reporting Event

A predetermined event triggers the report of the measurement result by the UE. That is, when the predetermined event occurs (conditions for the predetermined event are satisfied), the UE reports the measurement result to the eNode B. In Release 8, as the predetermined event, 5 kinds of events are defined: Events A1 to A5. In addition, as the predetermined event, Event A6 for carrier aggregation is defined.

For example, a condition for Event A1 is that the quality of a serving cell (for example, the RSRP or RSRQ) becomes higher than a threshold. A condition for Event 2 is that the quality of the serving cell becomes lower than the threshold. A condition for Event 3 is that the quality of an adjacent cell becomes higher than the quality of the serving cell by the threshold. A condition for Event 4 is that the quality of the adjacent cell becomes higher than the threshold. A condition for Event 5 is that the quality of the serving cell becomes lower than a first threshold and the quality of the adjacent cell becomes higher than a second threshold.

Figure 5:
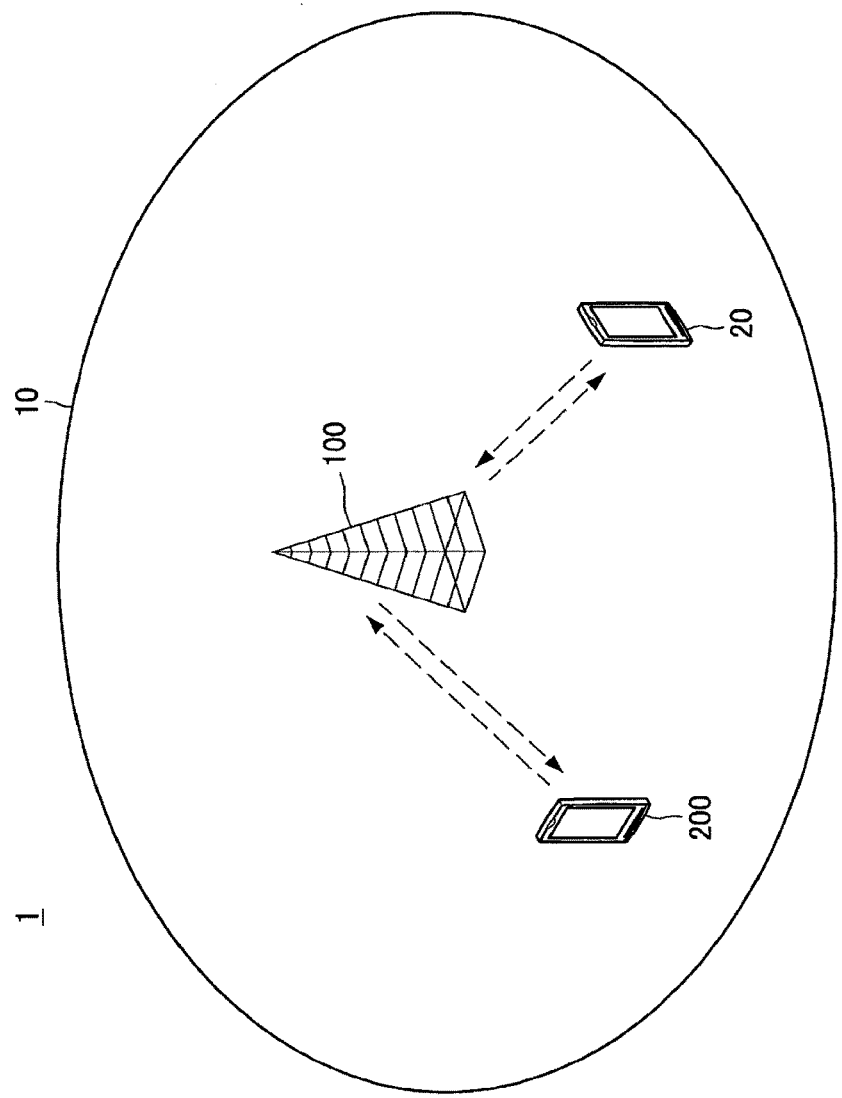
FIG. 5 is an explanatory diagram illustrating an example of a schematic configuration of a communication system according to an embodiment of the present disclosure.

2. Schematic Configuration of Communication System According to Embodiment of Present Disclosure Next, a schematic configuration of a communication system 1 according to an embodiment of the present disclosure will be described with reference to FIG. 5. FIG. 5 is an explanatory diagram illustrating an example of the schematic configuration of the communication system 1 according to an embodiment of the present disclosure. Referring to FIG. 5, the communication system 1 includes an eNode B 100, an UE 20, and an UE 200. In this example, the communication system 1 is a system complied with LTE, LET-A, or a communication standard equivalent to this.

(eNode B 100)

The eNode B 100 performs wireless communication in the frequency bands allocated to the service provider.

The frequency bands include a band of a predetermined bandwidth, and the eNode B 100 performs wireless communication in the band of the predetermined bandwidth. For example, the predetermined bandwidth is a bandwidth defined by a communication standard. More specifically, for example, the predetermined bandwidth is a bandwidth defined by the standard of the 3GPP, and the band of the predetermined bandwidth is a component carrier (CC).

In particular, in an embodiment of the present disclosure, the eNode B 100 performs wireless communication in the extension band, which is other than the CC in the frequency bands allocated to the service provider.

The eNode B 100 performs wireless communication with an UE located within a cell 10. For example, the UE 20 does not have capability of using the above extension band, and the UE 200 has capability of using the above extension band. The eNode B 100 performs wireless communication with the UE 20 and the UE 200 in the CC. In addition, the eNode B 100 performs wireless communication with the UE 200 in the above extension band.

(UE 20)

The UE 20 performs wireless communication with the eNode B 100 when located within the cell 10.

The UE 20 does not have capability of using the extension band, and performs wireless communication with the eNode B 100 in the CC in the frequency bands allocated to the service provider.

Note that the UE 20 is also referred to as a legacy terminal in this specification.

(UE 200)

The UE 200 performs wireless communication with the eNode B 100 when located within the cell 10.

The UE 200 has capability of using the extension band, and performs wireless communication with the eNode B 100 in the CC and the extension band.

3. First Embodiment

Next, a first embodiment of the present disclosure will be described with reference to FIGS. 6 to 11.

As described above, in a case in which the UE performs wireless communication also in the extension band, which is other than the component carrier (CC) in the frequency bands allocated to the service provider, since the extension band is a band to be used, the UE is considered to execute measurement also in the extension band. However, in this case, the UE also executes measurement in the CC and the extension band (that is, a broader band). As a result, a load of measurement on the UE may be increased.

Accordingly, in the first embodiment of the present disclosure, it becomes possible to suppress the load of measurement by the UE in a case in which the allocated frequency bands are utilized (that is, in a case in which the extension band is also used). Specifically, in the first embodiment, the execution of measurement by the UE in the extension band is controlled.

3.1. Configuration of eNode B

Figure 6:
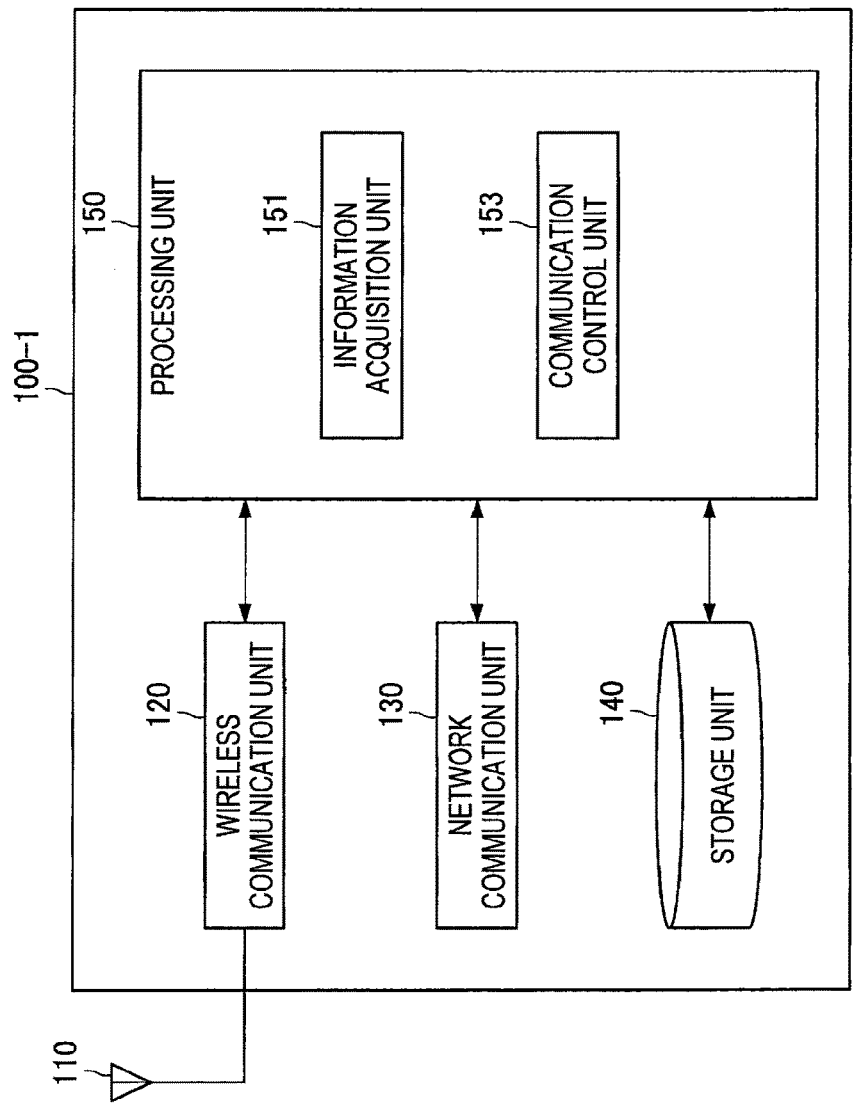
FIG. 6 is a block diagram illustrating an example of a configuration of an eNode B according to a first embodiment.

First, a configuration of an eNode B 100-1 according to the first embodiment will be described with reference to FIG. 6. FIG. 6 is a block diagram illustrating an example of the configuration of the eNode B 100-1 according to the first embodiment. Referring to FIG. 6, the eNode B 100-1 includes an antenna unit 110, a wireless communication unit 120, a network communication unit 130, a storage unit 140, and a processing unit 150.

(Antenna Unit 110)

The antenna unit 110 receives radio signals and outputs the received radio signals to the wireless communication unit 120. In addition, the antenna unit 110 transmits transmission signals outputted from the wireless communication unit 120.

(Wireless Communication Unit 120)

The wireless communication unit 120 performs wireless communication in the frequency bands allocated to the service provider.

As described above, the frequency bands include a band of a predetermined bandwidth, and the wireless communication unit 120 performs wireless communication in the band of the predetermined bandwidth. For example, the predetermined bandwidth is a bandwidth defined by the standard of the 3GPP, and the band of the predetermined bandwidth is a CC.

In particular, in an embodiment of the present disclosure, the wireless communication unit 120 performs wireless communication in the extension band, which is other than the CC in the frequency bands allocated to the service provider.

The wireless communication unit 120 performs wireless communication with an UE located within the cell 10. For example, the eNode B 100 performs wireless communication with the UE 20 and the UE 200 in the CC. In addition, the eNode B 100 performs wireless communication with the UE 200 in the above extension band.

(Network Communication Unit 130)

The network communication unit 130 communicates with another communication node. For example, the network communication unit 130 communicates with another eNode B 100. In addition, for example, the network communication unit 130 communicates with a communication node of a core network. For example, the core network is an EPC (evolved packet core), and the communication node includes an MME (mobility management entity), an S-GW (serving gateway), and the like.

(Storage Unit 140)

The storage unit 140 stores a program and data for the operation of the eNode B 100.

(Processing Unit 150)

The processing unit 150 provides various functions of the eNode B 100-1. The processing unit 150 includes an information acquisition unit 151 and a communication control unit 153.

(Information Acquisition Unit 151)

The information acquisition unit 151 acquires measurement related information related to the execution of measurement by the UE in the extension band, which is other than the component carrier (the band of the predetermined bandwidth) in the frequency bands allocated to the service provider.

In particular, in the first embodiment, the measurement related information is information related to the presence and absence of the execution of measurement by the UE in the extension band.

For example, the measurement related information is either first information corresponding to the execution of measurement in the extension band within the cell 10 or second information corresponding to non-execution of measurement in the extension band within the cell 10.

As a first example, the measurement related information is setting information of the eNode B 100-1. In addition, the first information is setting information for controlling the UE in a manner that the measurement is executed in the extension band within the cell 10, and the second information is setting information for controlling the UE in a manner that the measurement is not executed in the extension band within the cell 10. Furthermore, for example, the setting information is set by an operator of the communication system 1.

As a second example, the measurement related information may be a result of determination as to whether or not to execute measurement in the extension band within the cell 10. In addition, the first information may be a result of determination to execute measurement in the extension band within the cell 10, and the second information may be a result of determination not to execute measurement in the extension band within the cell 10. For example, the determination as to whether or not to execute measurement in the extension band within the cell 10 may be performed on the basis of the communication quality in the extension band. Furthermore, the determination may be performed by the information acquisition unit 151.

(Communication Control Unit 153)

The communication control unit 153 controls wireless communication within the cell 10.

In particular, in an embodiment of the present disclosure, on the basis of the measurement related information, the communication control unit 153 performs control related to the measurement by the UE in the extension band (hereinafter referred to as "measurement related control").

Control of Execution of Measurement

In particular, in the first embodiment, the measurement related control includes control of execution of measurement by the UE in the extension band. That is, on the basis of the measurement related information, the communication control unit 153 performs control of execution of measurement by the UE in the extension band.

Instruction to UE

For example, the measurement related control includes instruction of executing measurement or not executing measurement in the extension band to an UE 200-1.

As a first example, the measurement related control includes instructing the UE 200-1 to execute measurement in the extension band, and instructing the UE 200-1 not to execute measurement in the extension band. That is, the communication control unit 153 instructs the UE 200-1 either to execute measurement in the extension band or not to execute measurement in the extension band. In this case, for example, when instructed by the eNode B 100-1 to execute measurement in the extension band, the UE 200-1 executes measurement in the extension band. In addition, when instructed by the eNode B 100-1 not to execute measurement in the extension band, the UE 200-1 does not execute measurement in the extension band.

Specifically, for example, as described above, the measurement related information is either the first information corresponding to executing measurement in the extension band within the cell 10 or the second information corresponding to not executing measurement in the extension band within the cell 10. In this case, when the measurement related information is the first information, the communication control unit 153 instructs the UE 200-1 to execute measurement in the extension band. As a result, the UE 200-1 executes measurement in the extension band. On the other hand, when the measurement related information is the second information, the communication control unit 153 instructs the UE 200-1 not to execute measurement in the extension band. As a result, the UE 200-1 does not execute measurement in the extension band.

As a second example, the measurement related control may include instructing the UE 200-1 not to execute measurement in the extension band, and does not need to include instructing the UE 200-1 to execute measurement in the extension band. That is, the communication control unit 153 may instruct the UE 200-1 not to execute measurement in the extension band and does not need to instruct the UE 200-1 not to execute measurement in the extension band. In this case, for example, the UE 200-1 does not execute measurement in the extension band if instructed by the eNode B 100-1, and executes measurement in the extension band if not instructed by the eNode B 100-1.

Specifically, for example, as described above, the measurement related information is either the first information corresponding to executing measurement in the extension band within the cell 10 or the second information corresponding to not executing measurement in the extension band within the cell 10. In this case, when the measurement related information is the first information, the communication control unit 153 does not instruct the UE 200-1 not to execute measurement in the extension band. As a result, the UE 200-1 executes measurement in the extension band. On the other hand, when the measurement related information is the second information, the communication control unit 153 instructs the UE 200-1 not to execute measurement in the extension band. As a result, the UE 200-1 does not execute measurement in the extension band.

As a third example, the measurement related control may include instructing the UE 200-1 to execute measurement in the extension band, and does not need to include instructing the UE 200-1 not to execute measurement in the extension band. That is, the communication control unit 153 may instruct the UE 200-1 to execute measurement in the extension band and does not need to instruct the UE 200-1 not to execute measurement in the extension band. In this case, for example, the UE 200-1 executes measurement in the extension band if instructed by the eNode B 100-1, and does not execute measurement in the extension band if not instructed by the eNode B 100-1.

Specifically, for example, as described above, the measurement related information is either the first information corresponding to executing measurement in the extension band within the cell 10 or the second information corresponding to not executing measurement in the extension band within the cell 10. In this case, when the measurement related information is the first information, the communication control unit 153 instructs the UE 200-1 to execute measurement in the extension band. As a result, the UE 200-1 executes measurement in the extension band. On the other hand, when the measurement related information is the second information, the communication control unit 153 does not instruct the UE 200-1 to execute measurement in the extension band. As a result, the UE 200-1 does not execute measurement in the extension band.

Means for Instructing UE

For example, the communication control unit 153 instructs the UE 200-1 to execute or not to execute measurement by signaling the UE 200-1 individually via the wireless communication unit 120. As an example, the signaling is signaling in Connection Setup. As another example, the signaling is RRC signaling. Such individual instruction enables separate instruction for each UE. That is, it becomes possible for a UE 200-1 to execute measurement in the extension band and for another UE 200-1 not to execute measurement in the extension band.

Note that the communication control unit 153 may instruct the UEs 200-1 at once by use of system information. By giving instructions at once in this manner, the load of signaling and consumption of wireless resources by the eNode B 100-1 may be reduced.

Effects

The execution of measurement by the UE in the extension band is controlled as described above, for example. Thus, for example, in a case in which the operator determines that the measurement in the extension band is unnecessary, the UE 200-1 may omit the measurement in the extension band. Accordingly, in a case in which the allocated frequency bands are utilized (that is, in a case in which the extension band is also used), the load of measurement by the UE 200-1 can be suppressed.

As a first example, the bandwidth of the allocated frequency band may be 21 MHz and the bandwidth of the extension band may be 1 MHz. As a second example, the bandwidth of the allocated frequency band may be 6 MHz and the bandwidth of the extension band may be 1 MHz. For example, in the first example, omission of measurement in the extension band does not give a large impact to the whole, and thus the operator may determine that the measurement in the extension band is unnecessary. Then, the measurement in the extension band may be omitted. In addition, for example, in the second example, omission of measurement in the extension band may give a large impact to the whole, and thus the operator may determine that the measurement in the extension band is necessary. Then, the measurement in the extension band may be executed.

Other Control

For example, the communication control unit 153 reports information related to the extension band to the UE 200-1. Specifically, for example, the information related to the extension band includes information of the bandwidth of the extension band and/or the center frequency thereof. For example, the communication control unit 153 reports the above information related to the extension band to the UE 200-1 by use of system information. Note that the communication control unit 153 may report the above information related to the extension band to the UE 200-1 by use of any signaling (signaling in Connection Setup, RRC signaling, or the like).

3.2. Configuration of UE

First, a configuration of the UE 200-1 according to the first embodiment will be described with reference to FIG. 7.

Figure 7:
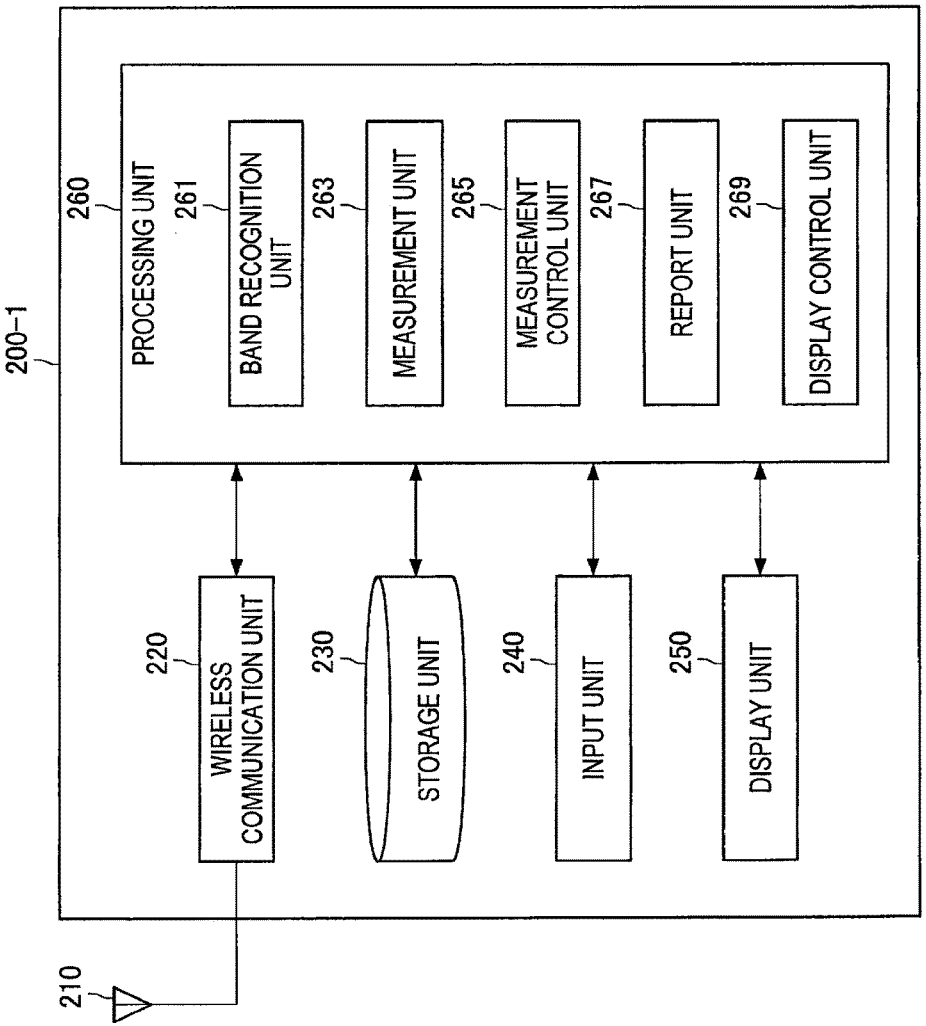
FIG. 7 is a block diagram illustrating an example of a configuration of a UE according to the first embodiment.

FIG. 7 is a block diagram illustrating an example of the configuration of the UE 200-1 according to the first embodiment. Referring to FIG. 7, the UE 200-1 includes an antenna unit 210, a wireless communication unit 220, a storage unit 230, an input unit 240, a display unit 250, and a processing unit 260.

(Antenna Unit 210)

The antenna unit 210 receives radio signals and outputs the received radio signals to the wireless communication unit 220. In addition, the antenna unit 210 transmits transmission signals outputted from the wireless communication unit 220.

(Wireless Communication Unit 220)

The wireless communication unit 220 performs wireless communication with the eNode B 100 in a case in which the UE 200 is located within the cell 10.

In addition, the UE 200 has capability of using the extension band, and the wireless communication unit 220 performs wireless communication with the eNode B 100 in the predetermined bandwidth and the extension band.

(Storage Unit 230)

The storage unit 230 stores a program and data for the operation of the UE 200.

(Input Unit 240)

The input unit 240 receives inputs from a user of the UE 200. The input unit 240 provides an input result to the processing unit 260.

(Display Unit 250)

The display unit 250 displays an output screen (i.e., an output image) outputted from the UE 200. For example, the display unit 250 displays the output screen in response to control by the processing unit 260 (a display control unit 269).

(Processing Unit 260)

The processing unit 260 provides various functions of the UE 200-1. The processing unit 260 includes a band recognition unit 261, a measurement unit 263, a measurement control unit 265, a report unit 267, and the display control unit 269.

(Band Recognition Unit 261)

The band recognition unit 261 recognizes the extension band, which is other than the component carrier (the band of the predetermined bandwidth) in the frequency bands allocated to the service provider.

For example, the eNode B 100-1 reports information related to the extension band to the UE 200-1. Then, the band recognition unit 261 acquires the information through the wireless communication unit 220, and recognizes the extension band. More specifically, for example, as described above, the information related to the extension band includes the bandwidth of the extension band and/or the center frequency thereof, and the band recognition unit 261 recognizes the bandwidth of the extension band and/or the center frequency thereof, for example.

(Measurement Unit 263)

The measurement unit 263 executes measurement in the frequency bands allocated to the service provider.

For example, the measurement is measurement of the quality of a transmission path. More specifically, for example, the measurement is measurement of the RSRP and/or the RSSQ. In this case, the measurement unit 263 measures the RSRP by use of a control signal. That is, the measurement unit 263 measures the RSRP by averaging the reception power of the control signal. For example, the control signal includes the CRS and/or a CSI-RS.

In addition, the measurement unit 263 executes the measurement in response to control by the measurement control unit 265. For example, the measurement unit 263 executes measurement in the band designated by the measurement control unit 265. For example, the measurement unit 263 executes measurement in the CC (the band of the predetermined bandwidth). In addition, for example, the measurement unit 263 executes measurement in the CC and the extension band.

(Measurement Control Unit 265)

The measurement control unit 265 controls the execution of measurement by the UE 200-1.

In particular, in the first embodiment, the measurement control unit 265 controls the execution of measurement so as not to execute part of the measurement in the extension band or to execute none of the measurement in the extension band. Thus, in a case in which the allocated frequency bands are utilized (that is, in a case in which the extension band is also used), the load of measurement by the UE 200-1 can be suppressed.

Also, in particular, in the first embodiment, the measurement control unit 265 controls the execution of measurement in the extension band in response to the measurement related control (that is, the control related to measurement by the UE in the extension band) by the eNode B 100-1. Then, the measurement control unit 265 controls the execution of measurement so as not to execute part of the measurement in the extension band or to execute none of the measurement in the extension band.

For example, the eNode B 100-1 instructs the UE 200-1 to execute or not to execute measurement in the extension band. Then, in response to the instruction by the eNode B 100-1, the measurement control unit 265 causes the measurement unit 263 to execute measurement in the extension band, or does not cause the measurement unit 263 to execute measurement in the extension band.

As a first example, the eNode B 100-1 instructs the UE 200-1 to execute measurement in the extension band and instructs the UE 200-1 not to execute measurement in the extension band. In this case, when the eNode B 100-1 instructs the UE 200-1 to execute measurement in the extension band, the measurement control unit 265 causes the measurement unit 263 to execute measurement in the extension band. On the other hand, when the eNode B 100-1 instructs the UE 200-1 not to execute measurement in the extension band, the measurement control unit 265 does not cause the measurement unit 263 to execute measurement in the extension band.

As a second example, the eNode B 100-1 may instruct the UE 200 not to execute measurement in the extension band and does not need to instruct the UE 200 to execute measurement in the extension band. In this case, when the eNode B 100-1 instructs the UE 200-1 not to execute measurement in the extension band, the measurement control unit 265 does not cause the measurement unit 263 to execute measurement in the extension band. On the other hand, when the eNode B 100-1 does not instruct the UE 200-1 not to execute measurement in the extension band, the measurement control unit 265 causes the measurement unit 263 to execute measurement in the extension band.

As a third example, the eNode B 100-1 may instruct the UE 200 to execute measurement in the extension band and does not need to instruct the UE 200 not to execute measurement in the extension band. In this case, when the eNode B 100-1 instructs the UE 200-1 to execute measurement in the extension band, the measurement control unit 265 causes the measurement unit 263 to execute measurement in the extension band. On the other hand, when the eNode B 100-1 does not instruct the UE 200-1 to execute measurement in the extension band, the measurement control unit 265 does not cause the measurement unit 263 to execute measurement in the extension band.

(Report Unit 267)

The report unit 267 reports a result of measurement by the UE 200-1 to the eNode B 100-1.

For example, the measurement result includes the RSRP and/or the RSSQ. That is, the report unit 267 reports the RSRP and/or the RSSQ, for example, to the eNode B 100-1 through the wireless communication unit 220.

(Display Control Unit 269)

The display control unit 269 controls display of the output screen by the display unit 250. For example, the display control unit 269 generates the output screen to be displayed by the display unit 250 and causes the display unit 250 to display the output screen.

3.3. Flow of Process

Next, an example of a communication control process according to the first embodiment will be described with reference to FIGS. 8 and 9.

(Communication Control Process on eNode B Side)

Figure 8:
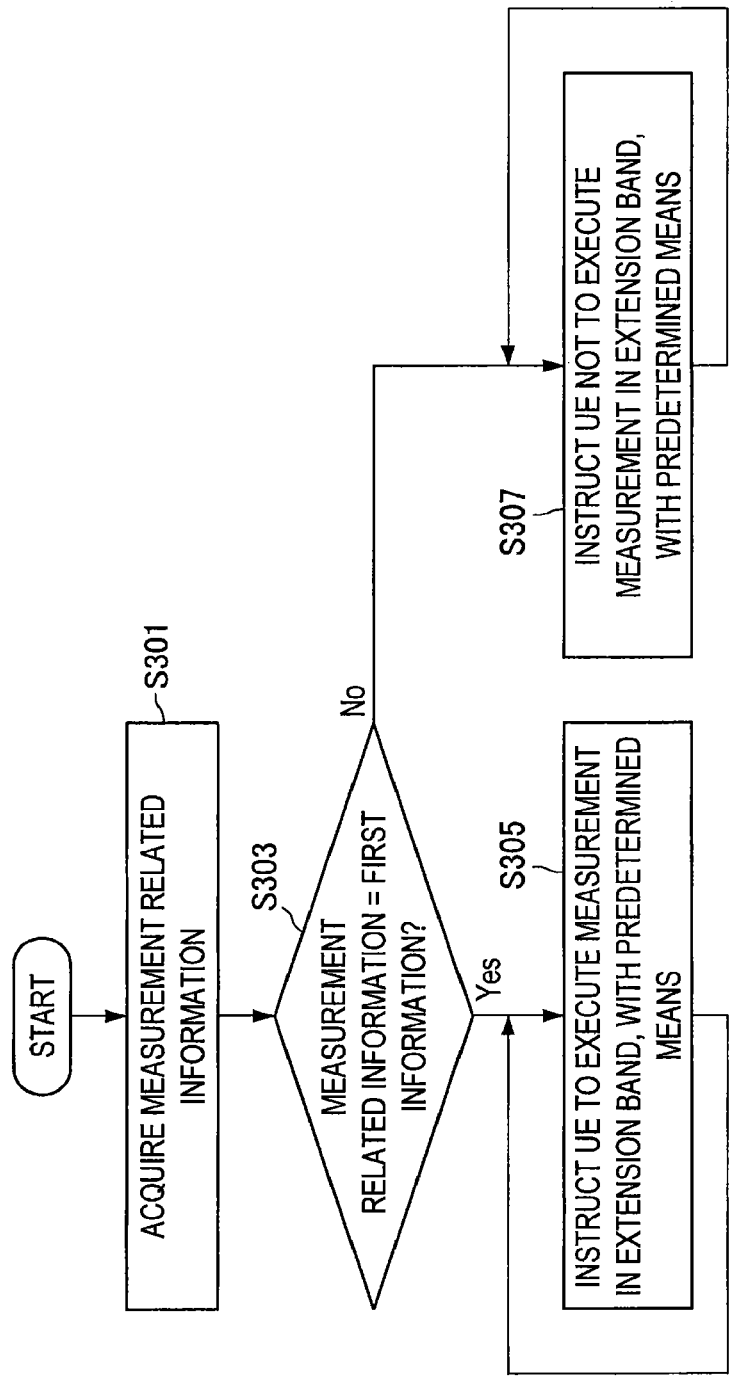
FIG. 8 is a flowchart illustrating an example of a schematic flow of a communication control process on an eNode B side according to the first embodiment.

FIG. 8 is a flowchart illustrating an example of a schematic flow of a communication control process on the eNode B 100-1 side according to the first embodiment. For example, the communication control process on the eNode B 100-1 side starts when the operation of the eNode B 100-1 starts or restarts.

First, in step S301, the information acquisition unit 151 acquires measurement related information related to the execution of measurement by the UE in the extension band, which is other than the CC (the band of the predetermined bandwidth) in the frequency bands allocated to the service provider. The measurement related information is either the first information corresponding to the execution of measurement in the extension band within the cell 10 or the second information corresponding to non-execution of measurement in the extension band within the cell 10.

Next, in step S303, the communication control unit 153 determines whether or not the measurement related information is the first information. When the measurement related information is the first information, the process proceeds to step S305. Otherwise (that is, when the measurement related information is the second information), the process proceeds to step S307.

In step S305, the communication control unit 153 instructs the UE 200-1 to execute measurement in the extension band, with a predetermined means, via the wireless communication unit 120. Then, the process repeats step S305.

In step S307, the communication control unit 153 instructs the UE 200-1 not to execute measurement in the extension band, with a predetermined means, via the wireless communication unit 120. Then, the process repeats step S307.

Note that the predetermined means may be signaling to the individual UEs 200-1 or system information.

(Communication Control Process on UE side)

Figure 9:
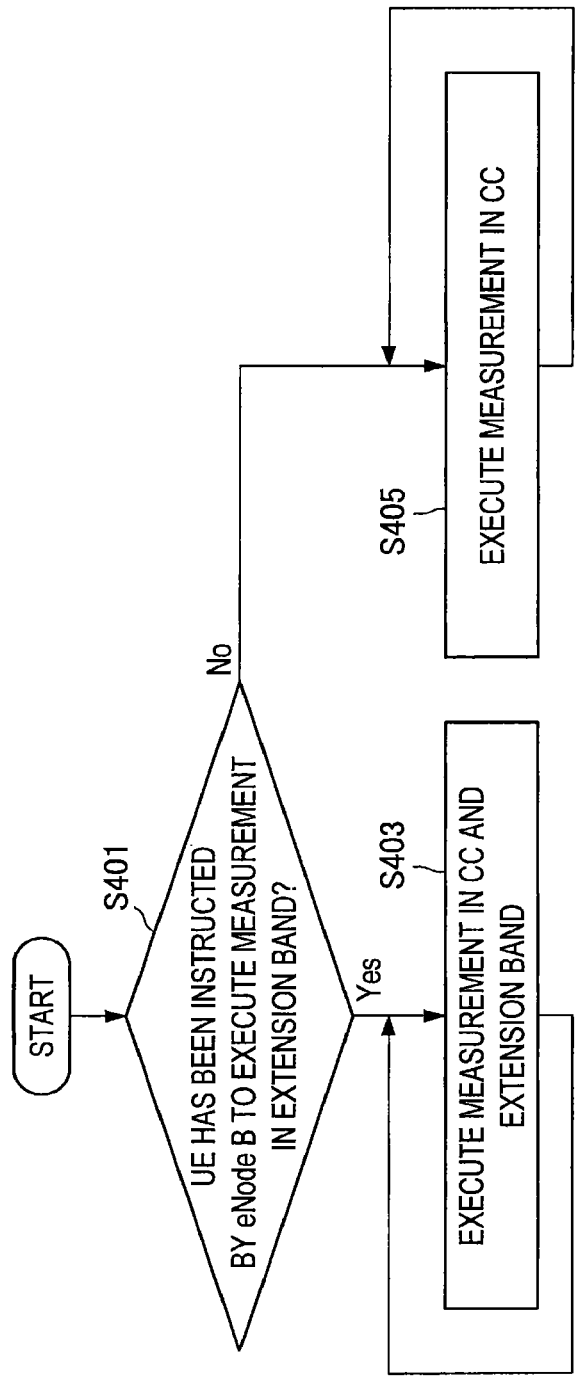
FIG. 9 is a flowchart illustrating an example of a schematic flow of a communication control process on a UE side according to the first embodiment.

FIG. 9 is a flowchart illustrating an example of a schematic flow of a communication control process on the UE 200-1 side according to the first embodiment. For example, the communication control process on the UE 200-1 side starts when the eNode B 100-1 instructs the UE 200-1 to execute measurement in the extension band.

First, in step S401, the measurement control unit 265 determines whether or not the UE 200-1 has been instructed by the eNode B 100-1 to execute measurement in the extension band. In a case in which the UE 200-1 has been instructed by the eNode B 100-1 to execute measurement in the extension band, the process proceeds to step S403. Otherwise, the process proceeds to step S405.

In step S403, the measurement control unit 265 causes the measurement unit 263 to execute measurement in the extension band. Then, the measurement unit 263 executes measurement in the CC and the extension band. Then, the process repeats step S403.

In step S405, the measurement control unit 265 does not cause the measurement unit 263 to execute measurement in the extension band. Then, the measurement unit 263 executes measurement in the CC. Then, the process repeats step S405.

3.4. Modification Example

Next, a modification example of the first embodiment will be described with reference to FIGS. 10 and 11.

In the modification example of the first embodiment, the execution of measurement is controlled in a manner that, of the UEs 200-1, an UE 200-1 that uses the frequency bands allocated to the service provider for communication does not execute measurement in the extension band in the frequency bands.

(Configuration of eNode B: Communication Control Unit 153)

Instruction to UE

In particular, in the modification example of the first embodiment, the measurement related control includes instructing the UE 200-1 to execute or not to execute measurement in the extension band in order that the UE 200-1 that uses the above frequency bands for communication does not execute measurement in the extension band.

For example, the measurement related control includes instructing the UE 200-1 to execute measurement also in the extension band in the frequency bands used and instructing the UE 200-1 not to execute measurement in the extension band in the frequency bands used. That is, the communication control unit 153 instructs the UE 200-1 either to execute measurement in the extension band in the frequency bands used or not to execute measurement in the extension band in the frequency bands used. In this case, for example, when instructed by the eNode B 100-1 to execute measurement also in the extension band in the frequency bands used, the UE 200-1 executes measurement also in the extension band in the frequency bands used. In addition, when instructed by the eNode B 100-1 not to execute measurement in the extension band in the frequency bands used, the UE 200-1 does not execute measurement in the extension band in the frequency bands used.

As another example, the measurement related control may include instructing the UE 200-1 not to execute measurement also in the extension band in the frequency bands used and does not need to include instructing the UE 200-1 to execute measurement in the extension band in the frequency bands used. As further another example, the measurement related control may include instructing the UE 200-1 to execute measurement also in the extension band in the frequency bands used and does not need include instructing the UE 200-1 not to execute measurement in the extension band in the frequency bands used.

(Configuration of UE: Measurement Control Unit 265)

In particular, in the modification example of the first embodiment, in response to the measurement related control (that is, control related to measurement by the UE in the extension band) by the eNode B 100-1, the measurement control unit 265 controls the execution of measurement in the extension band. Then, in a case in which the UE 200-1 uses the above frequency bands for communication, the measurement control unit 265 controls the execution of measurement in a manner that measurement in the extension band is not executed.

For example, the eNode B 100-1 instructs the UE 200-1 to execute or not to execute measurement in the extension band in the frequency bands used. Then, in response to the instruction by the eNode B 100-1, the measurement control unit 265 causes the measurement unit 263 to execute measurement in the extension band in the frequency bands used and does not cause the measurement unit 263 to execute measurement in the extension band in the frequency bands used.

For example, the eNode B 100-1 instructs the UE 200-1 to execute measurement in the extension band of the frequency bands used and instructs the UE 200-1 not to execute measurement in the extension band of the frequency bands used. In this case, when the eNode B 100-1 instructs the UE 200-1 to execute measurement in the extension band of the frequency bands used, the measurement control unit 265 causes the measurement unit 263 to execute measurement in the extension band of the frequency bands used. On the other hand, when the eNode B 100-1 instructs the UE 200-1 not to execute measurement in the extension band of the frequency bands used, the measurement control unit 265 does not cause the measurement unit 263 to execute measurement in the extension band of the frequency bands used.

(Flow of Process: Communication Control Process on eNode B Side)

Figure 10:
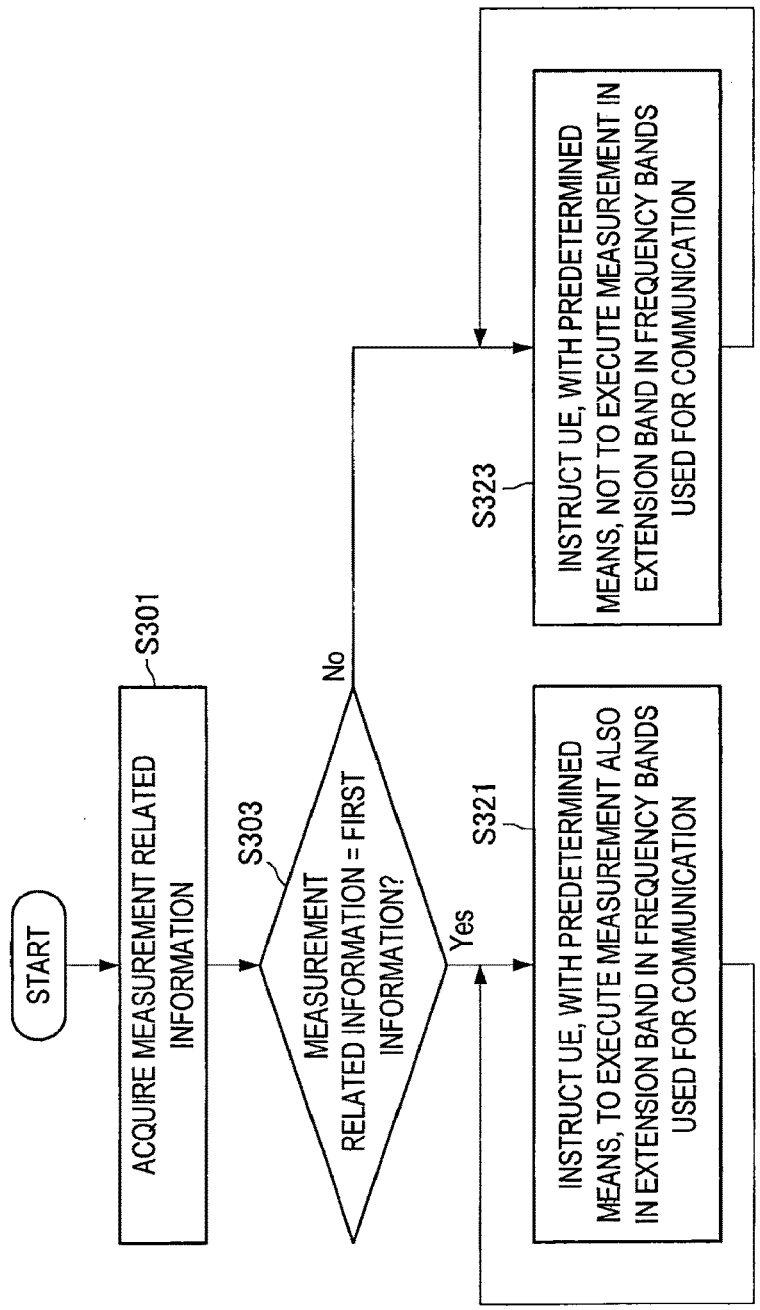
FIG. 10 is a flowchart illustrating an example of a schematic flow of a communication control process on an eNode B side according to a modification example of the first embodiment.

FIG. 10 is a flowchart illustrating an example of a schematic flow of a communication control process on the eNode B 100-1 side according to the modification example of the first embodiment.

Here, only steps S321 and S323, which are different between the example according to the modification example of the first embodiment illustrated in FIG. 10 and the example according to the first embodiment illustrated in FIG. 8, will be described.

In step S321, the communication control unit 153 instructs the UE 200-1, with a predetermined means, to execute measurement also in the extension band in the frequency bands used, via the wireless communication unit 120. The process repeats step S321.

In step S323, the communication control unit 153 instructs the UE 200-1, with a predetermined means, not to execute measurement also in the extension band in the frequency bands used, via the wireless communication unit 120. The process repeats step S323.

(Flow of Process: Communication Control Process on UE Side)

Figure 11:
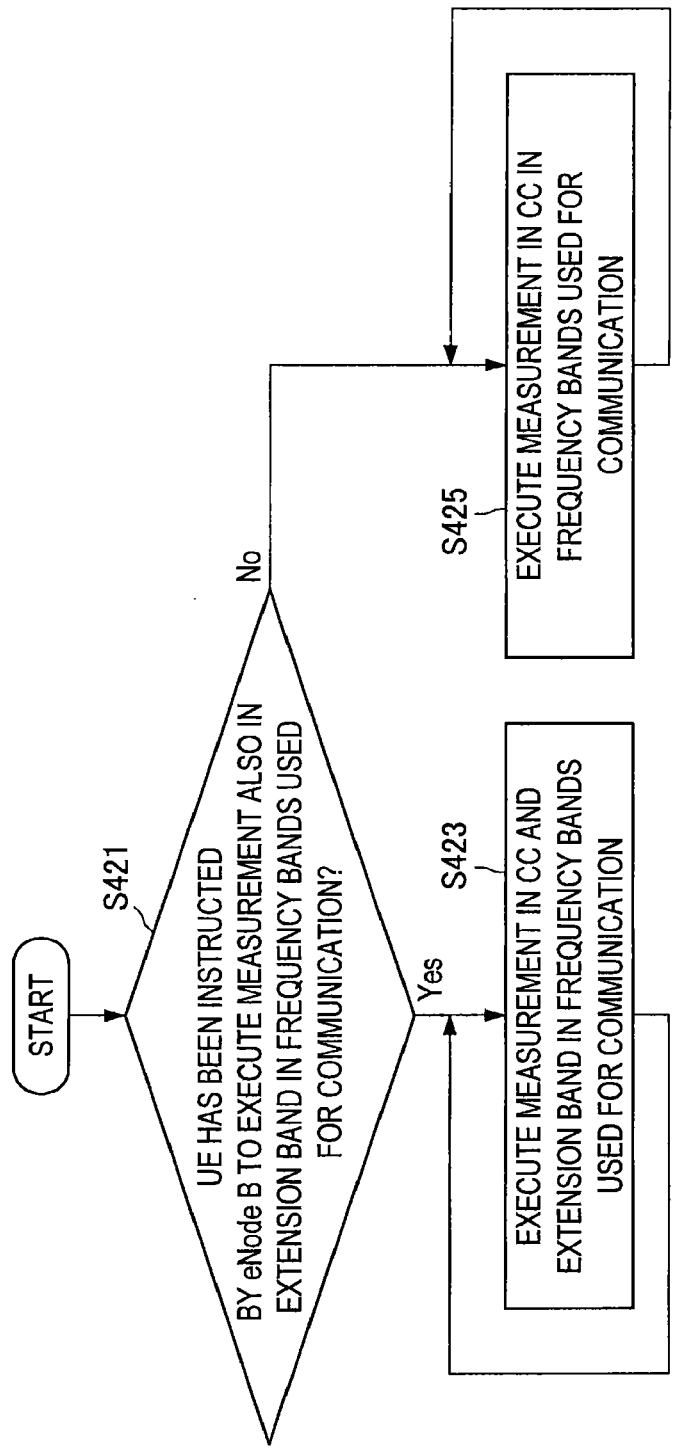
FIG. 11 is a flowchart illustrating an example of a schematic flow of a communication control process on a UE side according to a modification example of the first embodiment.

FIG. 11 is a flowchart illustrating an example of a schematic flow of a communication control process on the UE 200-1 side according to a modification example of the first embodiment.

First, in step S421, the measurement control unit 265 determines whether or not the UE 200-1 has been instructed by the eNode B 100-1 to execute measurement also in the extension band in the frequency bands used. In a case in which the UE 200-1 has been instructed by the eNode B 100-1 to execute measurement also in the extension band the frequency bands used, the process proceeds to step S423. Otherwise, the process proceeds to step S425.

In step S423, the measurement control unit 265 causes the measurement unit 263 to execute measurement in the extension band in the frequency bands used. Then, the measurement unit 263 executes measurement in the CC and the extension band in the frequency bands used. Then, the process repeats step S423.

In step S425, the measurement control unit 265 does not cause the measurement unit 263 to execute measurement in the extension band in the frequency bands used. Then, the measurement unit 263 executes measurement in the CC in the frequency bands used. Then, the process repeats step S425.

The modification example of the first embodiment has been described above. According to this modification example, it becomes possible to suppress the load of measurement by the UE. More specifically, for example, the frequency of handover (inter-cell handover) in the same frequency band is higher than the frequency of handover between different frequency bands. Thus, the load of measurement for handover in the same frequency band (that is, measurement in the frequency band used by the UE) is larger than the load of measurement for handover between different frequency bands (that is, measurement in the frequency bands not used by the UE). Accordingly, in particular, by reducing measurement in the frequency band used by the UE, it becomes possible to suppress the load of measurement by the UE more effectively.

Note that the result of measurement in the frequency band that is already used is continuously acquired, and thus, the measurement in the CC is considered to be sufficient in many cases without executing measurement in the extension band. On the other hand, since the bandwidth of the frequency band that is not used may be different from the bandwidth of the frequency band used (the CC and/or the extension band may be different in some cases), it would be desirable to obtain a result of measurement of the band including the extension band in addition to the CC. Therefore, as described above, it would be more desirable to omit measurement in the extension band in the frequency band used by the UE, than to omit measurement in the extension band in the frequency band not used by the UE.

Although the first embodiment has been described above, the first embodiment is not limited to the above-described examples.

For example, the example has been illustrated in which whether or not to execute measurement by the UE in the extension band is decided by the unit of the cell 10; however, the first embodiment is not limited to this example. For example, whether or not to execute measurement by the UE in the extension band may be decided by the unit of the UE 200-1. As an example, it is possible to decide whether or not to execute measurement by the UE in the extension band in accordance with the communication quality for each UE 200-1 in the extension band.

4. Second Embodiment

Figure 12:
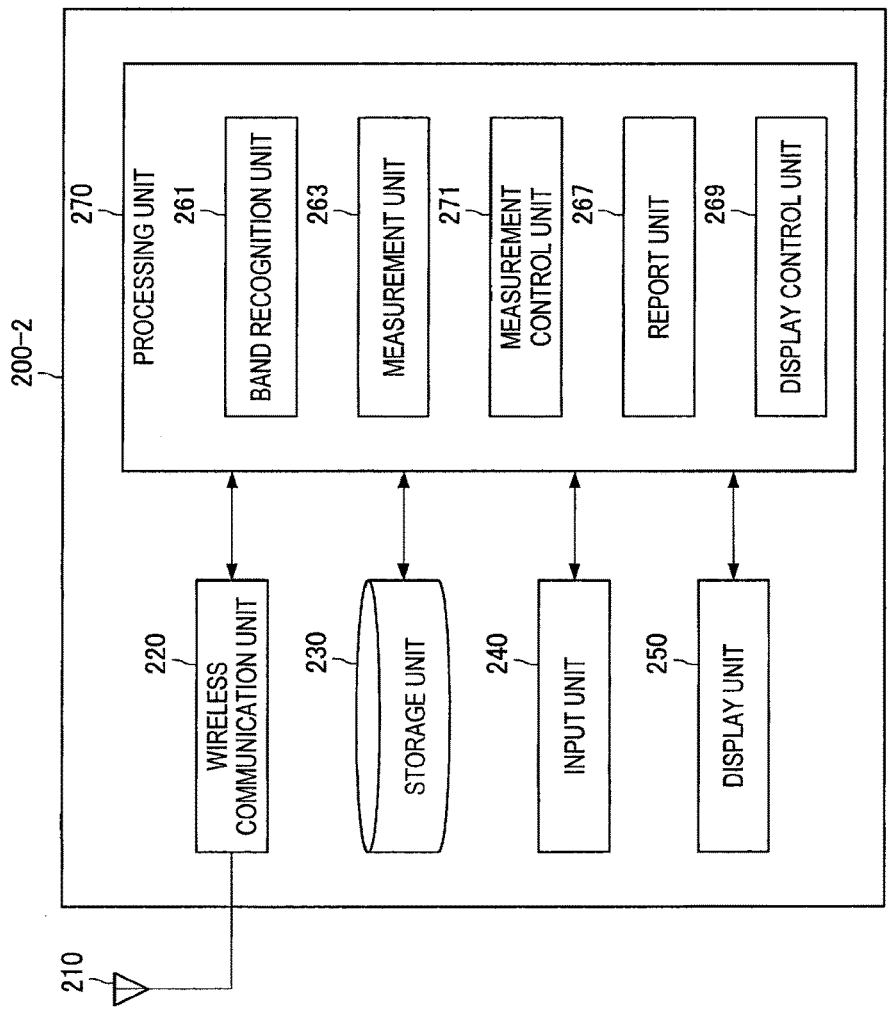
FIG. 12 is a block diagram illustrating an example of a configuration of a UE according to a second embodiment.
Figure 13:
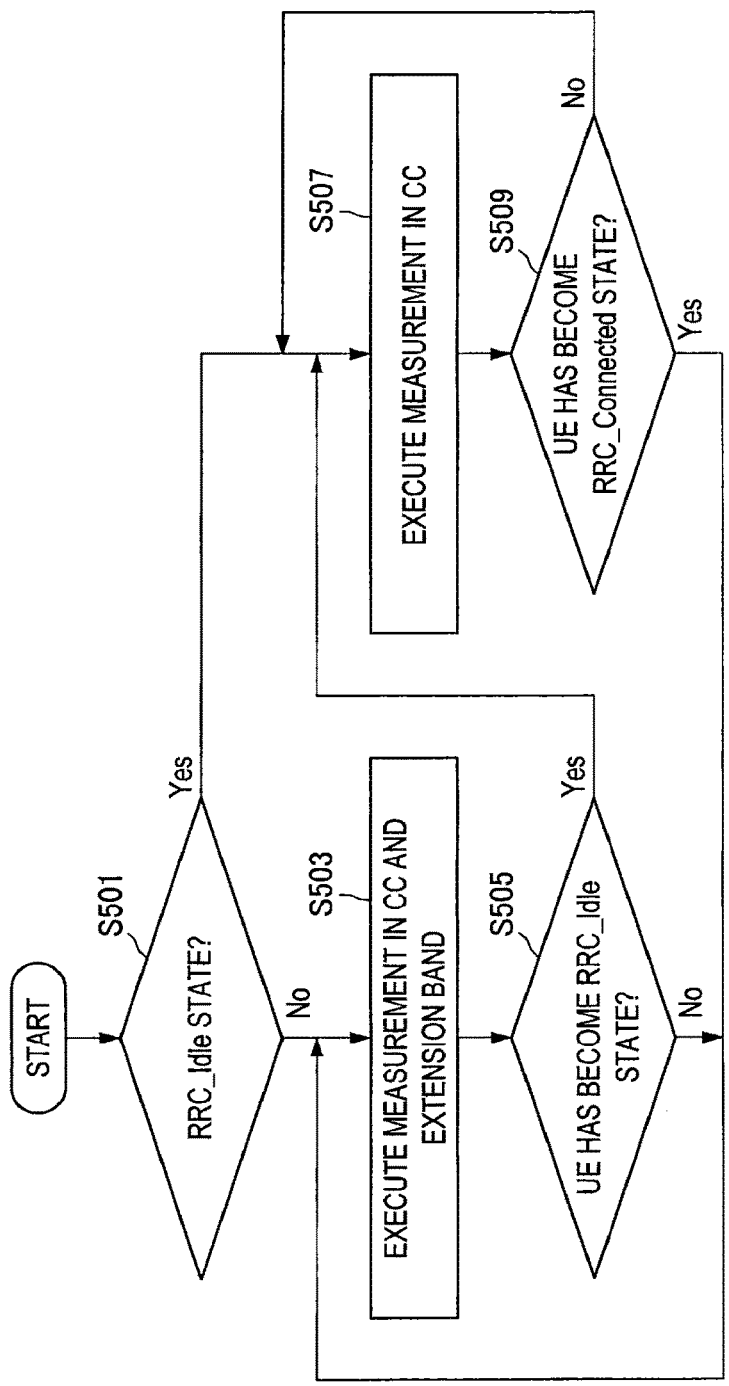
FIG. 13 is a flowchart illustrating an example of a schematic flow of a communication control process on a UE according to the second embodiment.

Next, a second embodiment of the present disclosure will be described with reference to FIGS. 12 and 13.

As described above, in a case in which a UE performs wireless communication also in the extension band, which is other than the component carrier (CC) in the frequency bands allocated to a service provider, since the extension band is also used, the UE may execute measurement also in the extension band. However, in this case, the UE executes measurement in the CC and the extension band (that is, a wider band). As a result, a load of measurement on the UE may be increased.

Accordingly, in the first embodiment of the present disclosure, it becomes possible to suppress the load of measurement by the UE in a case in which the allocated frequency bands are utilized (that is, in a case in which the extension band is also used). Specifically, in the second embodiment, the UE 200 does not execute measurement in the extension band in an idle state.

4.1. Configuration of UE

First, a schematic configuration of an UE 200-2 according to the second embodiment will be described with reference to FIG. 12. FIG. 12 is a block diagram illustrating an example of the configuration of the UE 200-2 according to the second embodiment. Referring to FIG. 12, the UE 200-2 includes the antenna unit 210, the wireless communication unit 220, the storage unit 230, the input unit 240, the display unit 250, and a processing unit 270.

Here, the antenna unit 210, the wireless communication unit 220, the storage unit 230, the input unit 240, the display unit 250, and the following units included in the processing unit 270, which are the band recognition unit 261, the measurement unit 263, the report unit 267, and the display control unit 269, in the second embodiment are not different from those in the first embodiment. Therefore, a measurement control unit 271 in the processing unit 270 will be described here.

(Measurement Control Unit 271)

The measurement control unit 271 controls the execution of measurement by the UE 200-2.

In particular, in the second embodiment, in a case in which the UE 200-2 is in an idle state for a radio resource, the measurement control unit 271 controls the execution of measurement in a manner that measurement is not executed in the extension band, which is other than the CC (the band of the predetermined bandwidth) in the frequency bands allocated to the service provider.

More specifically, for example, in a case in which the UE 200-2 is in an RRC_Connected state, the measurement control unit 271 causes the measurement unit 263 to execute measurement in the above extension band. That is, the measurement control unit 271 causes the measurement unit 263 to execute measurement in the CC and the extension band in the frequency bands allocated to the service provider. On the other hand, in a case in which the UE 200-2 is in an RRC_Idle state, the measurement control unit 271 does not cause the measurement unit 263 to perform measurement in the extension band. That is, the measurement control unit 271 causes the measurement unit 263 to execute measurement in the CC in the frequency bands allocated to the service provider.

Thus, it becomes possible to suppress the load of measurement by the UE in a case in which the allocated frequency bands are utilized (that is, in a case in which the extension band is also used).

More specifically, for example, there is a demand of suppression of power consumption by the UE as much as possible in a case in which the UE is in the RRC_Idle state, in particular. Accordingly, by omitting measurement in a case of the RRC_Idle state in this manner, the load of measurement by the UE in the RRC_Idle state can be suppressed, resulting in suppression of power consumption.

In addition, for example, information in a paging channel is considered to be transmitted in the CC (the band of the predetermined bandwidth), not in the extension band. In this case, since the quality in the CC is more important than the quality in the extension band, by omitting measurement in a case of the RRC_Idle state, useless measurement can be reduced.

4.2. Flow of Process

Next, an example of a communication control process according to the second embodiment will be described with reference to FIG. 13. FIG. 13 is a flowchart illustrating an example of a schematic flow of a communication control process on the UE 200-2 side according to the second embodiment.

First, in step S501, the measurement control unit 265 determines whether or not the UE 200-2 is in the RRC_Idle state. If the UE 200-2 is in the RRC_Idle state, the process proceeds to step S507. Otherwise, the process proceeds to step S503.

In step S503, the measurement control unit 265 causes the measurement unit 263 to execute measurement in the CC and the extension band in the frequency bands allocated to the service provider.

In step S505, the measurement control unit 265 determines whether or not the UE 200-2 has become the RRC_Idle state. If the UE 200-2 has become the RRC_Idle state, the process proceeds to step S507. Otherwise, the process proceeds to step S503.

In step S507, the measurement control unit 265 causes the measurement unit 263 to execute measurement in the CC in the frequency bands allocated to the service provider.

In step S509, the measurement control unit 265 determines whether or not the UE 200-2 has become the RRC_Connected state. If the UE 200-2 has become the RRC_Connected state, the process proceeds to step S503. Otherwise, the process proceeds to step S507.

5. Third Embodiment

Next, a third embodiment of the present disclosure will be described with reference to FIGS. 14 to 25.

In a case in which the UE performs wireless communication also in the extension band, which is other than the component carrier (CC) in the frequency bands allocated to the service provider, measurement is assumed to be executed in all the bands including the CC and the extension band. However, if measurement is executed in all the bands and the measurement is reported, the eNode B cannot check the quality of each of the CC and extension band. As a result, fine communication control by the eNode B may be difficult. For example, it may become difficult to appropriately determine whether or not to cause the UE to perform wireless communication in the extension band.

Accordingly, in the third embodiment of the present disclosure, it becomes possible to control wireless communication in consideration of the communication quality in each of the CC (the band of the predetermined bandwidth) and the extension band. Specifically, in the third embodiment, the result of measurement in the CC (the band of the predetermined bandwidth) and the result of measurement in the extension band are each reported.

5.1. Configuration of eNode B

Figure 14:
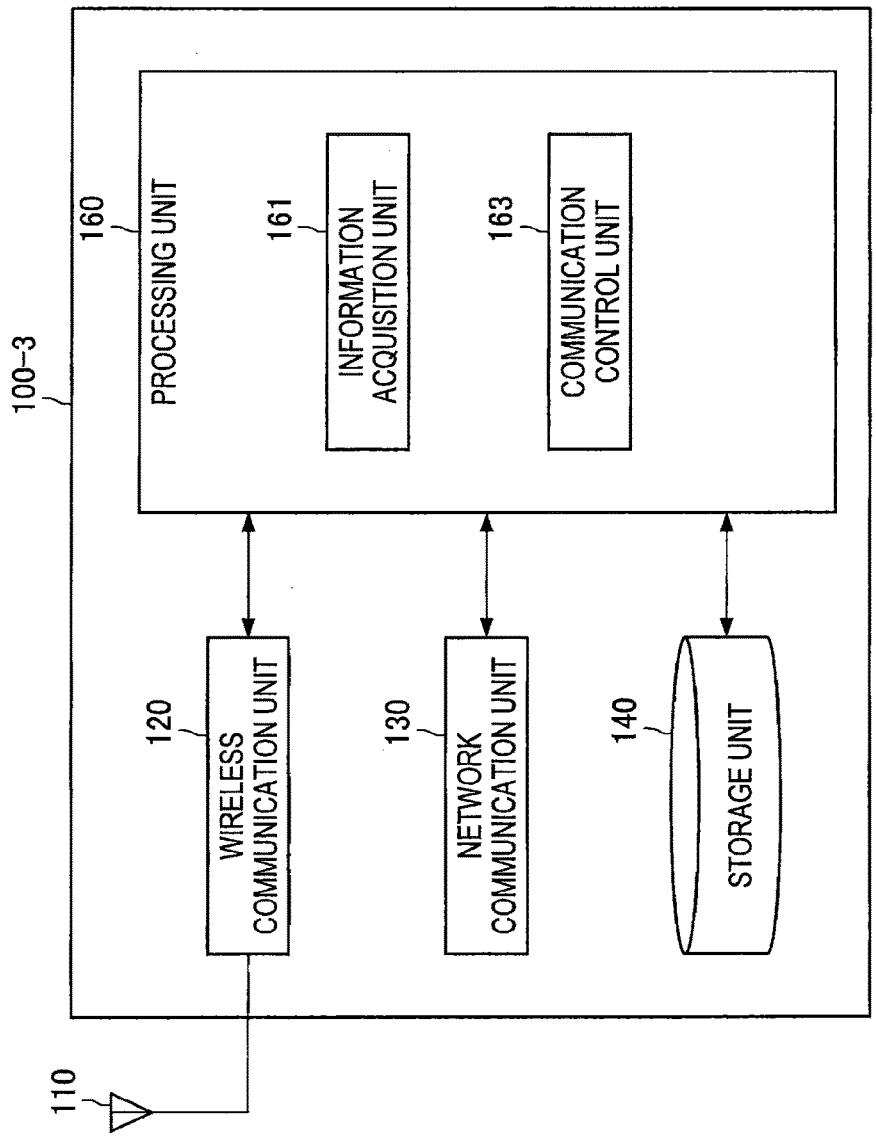
FIG. 14 is a block diagram illustrating an example of a configuration of an eNode B according to a third embodiment.

First, a schematic configuration of an eNode B 100-3 according to the third embodiment will be described with reference to FIG. 14. FIG. 14 is a block diagram illustrating an example of a configuration of the eNode B 100-3 according to the third embodiment. Referring to FIG. 6, the eNode B 100-1 includes the antenna unit 110, the wireless communication unit 120, the network communication unit 130, the storage unit 140, and a processing unit 160.

Here, the antenna unit 110, the wireless communication unit 120, the network communication unit 130, and the storage unit 140 in the third embodiment are not different from those in the first embodiment. Therefore, the processing unit 160 will be described here.

(Processing Unit 160)

The processing unit 160 provides various functions of the eNode B 100-3. The processing unit 160 includes an information acquisition unit 161 and a communication control unit 163.

(Information Acquisition Unit 161)

The information acquisition unit 161 acquires a result of measurement by the UE.

For example, the information acquisition unit 161 acquires a result of measurement by the UE 20 in the CC (the band of the predetermined bandwidth) in the frequency bands allocated to the service provider.

Specifically, for example, the UE 20 executes measurement in the CC, and reports the measurement result to the eNode B 100-3. Then, the information acquisition unit 161 acquires the measurement result via the wireless communication unit 120.

In addition, for example, the information acquisition unit 161 acquires the result of measurement by the UE 200 in the CC (the band of the predetermined bandwidth) and the extension band in the frequency bands allocated to the service provider. In particular, in the third embodiment, the information acquisition unit 161 acquires each of a first measurement result being a result of measurement by an UE 200-3 in the CC and a second measurement result being a result of measurement by the UE 200-3 in the extension band.

Specifically, for example, the UE 200-3 executes measurement in the CC, and reports the measurement result to the eNode B 100-3. In addition, the UE 200-3 executes measurement in the extension band, and reports the measurement result to the eNode B 100-3.

Thus, it becomes possible to control wireless communication in consideration of the communication quality in each of the CC (the band of the predetermined bandwidth) and the extension band. As an example, it becomes possible to appropriately determine whether or not to cause the UE 200 to perform wireless communication in the extension band.

Note that the information acquisition unit 161 may acquire measurement related information that relates to the execution of measurement by the UE in the extension band, as in the information acquisition unit 151 according to the first embodiment.

(Communication Control Unit 163)

The communication control unit 163 controls wireless communication within the cell 10.

In particular, in the third embodiment, the communication control unit 163 controls wireless communication within the cell 10 on the basis of the first measurement result being a result of measurement by the UE 200-3 in the CC and the second measurement result being a result of measurement by the UE 200-3 in the extension band.

As an example, the communication control unit 163 determines whether or not to cause the UE 200-3 to perform wireless communication in the extension band on the basis of the second measurement result being a result of measurement by the UE 200-3 in the extension band.

Note that, as in the communication control unit 153 according to the first embodiment (or a communication control unit 173 according to a fourth embodiment described later), the communication control unit 163 may perform control related to measurement by the UE in the extension band (that is, the measurement related control) on the basis of the above measurement related information.

5.2. Configuration of UE

Figure 15:
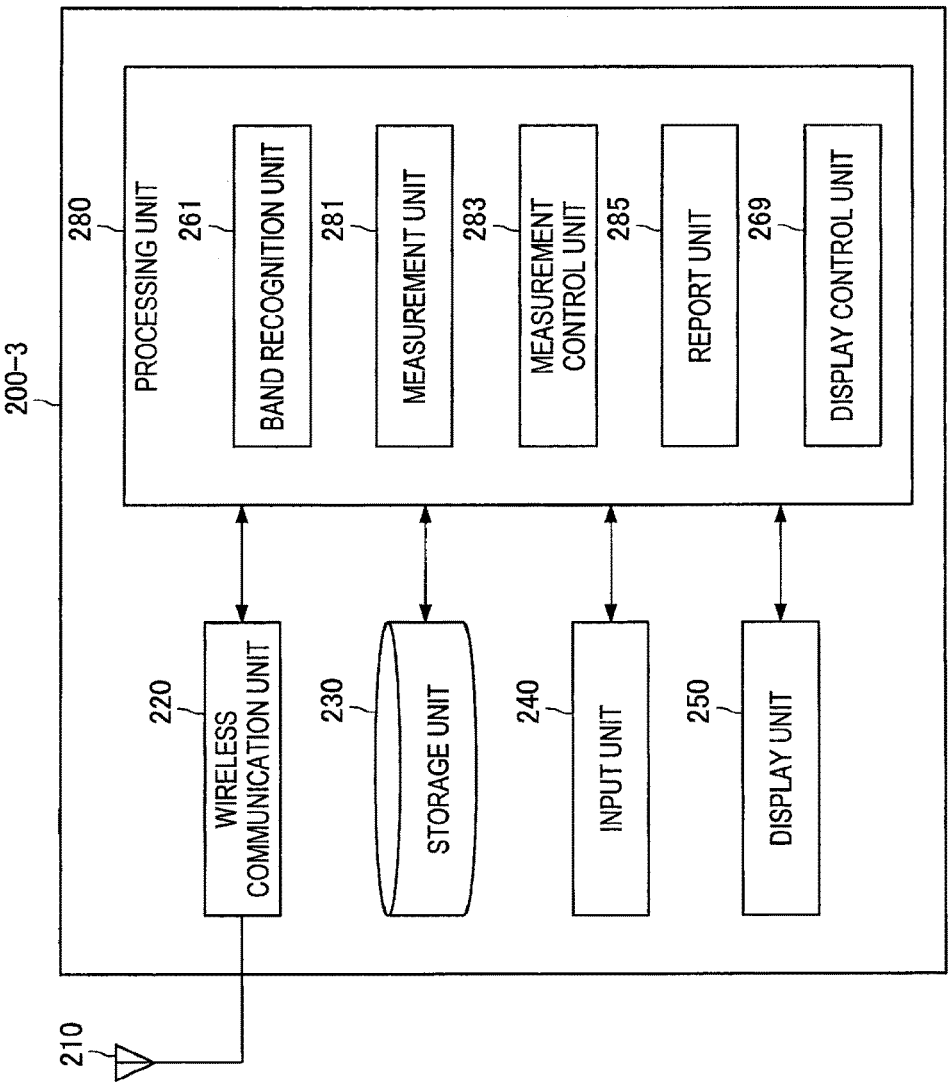
FIG. 15 is a block diagram illustrating an example of a configuration of a UE according to the third embodiment.

First, a schematic configuration of the UE 200-3 according to the third embodiment will be described with reference to FIGS. 15 to 18. FIG. 15 is a block diagram illustrating an example of the configuration of the UE 200-3 according to the third embodiment. Referring to FIG. 15, the UE 200-3 includes the antenna unit 210, the wireless communication unit 220, the storage unit 230, the input unit 240, the display unit 250, and a processing unit 280.

Here, the antenna unit 210, the wireless communication unit 220, the storage unit 230, the input unit 240, and the display unit 250, and the following units included in the processing unit 280, which are the band recognition unit 261 and the display control unit 269, in the third embodiment are not different from those in the first embodiment. Therefore, a measuring unit 281, a measurement control unit 283, and a report unit 285 included in the processing unit 280 will be described here.

(Measuring Unit 281)

The measuring unit 281 executes measurement in the frequency bands allocated to the service provider.

For example, the measurement is measurement of the quality of a transmission path. More specifically, for example, the measurement is measurement of the RSRP and/or the RSSQ. In this case, the measuring unit 281 measures the RSRP by use of a control signal. That is, the measuring unit 281 measures the RSRP by averaging the reception power of the control signal. For example, the control signal includes the CRS and/or a CSI-RS.

In addition, the measuring unit 281 executes the measurement in response to control by the measurement control unit 283. For example, the measuring unit 281 executes measurement in the band designated by the measurement control unit 283. For example, the measuring unit 281 executes measurement in the CC (the band of the predetermined bandwidth). In addition, for example, the measurement unit 263 executes measurement in the CC and the extension band.

Measurement in CC and Extension Band

In particular, in the third embodiment, the measuring unit 281 executes measurement in the CC and measurement in the extension band separately in a case of executing measurement in the CC and the extension band.

More specifically, for example, the measuring unit 281 measures the RSRP and/or the RSSQ in the CC and the RSRP and/or the RSSQ in the extension band. As a result, the first measurement result being a result of measurement by the UE in the CC and the second measurement result being a result of measurement by the UE in the extension band are obtained.

Measurement Period

For example, the first measurement result is a result obtained by measurement executed over a first period in the CC, and the second measurement result is a result obtained by measurement executed over a second period in the extension band. In addition, the second period is longer than the first period. That is, the measuring unit 281 executes measurement in the first period in the CC, and executes measurement in the second period (which is longer than the first period) in the extension band.

Specifically, for example, the measuring unit 281 measures the RSRP and/or the RSRQ using a control signal over the first period in the CC. In addition, the measuring unit 281 measures the RSRP and/or the RSRQ using a control signal over the second period, which is longer, in the extension band. A specific example of this point will be described below with reference to FIG. 16.

Figure 16:
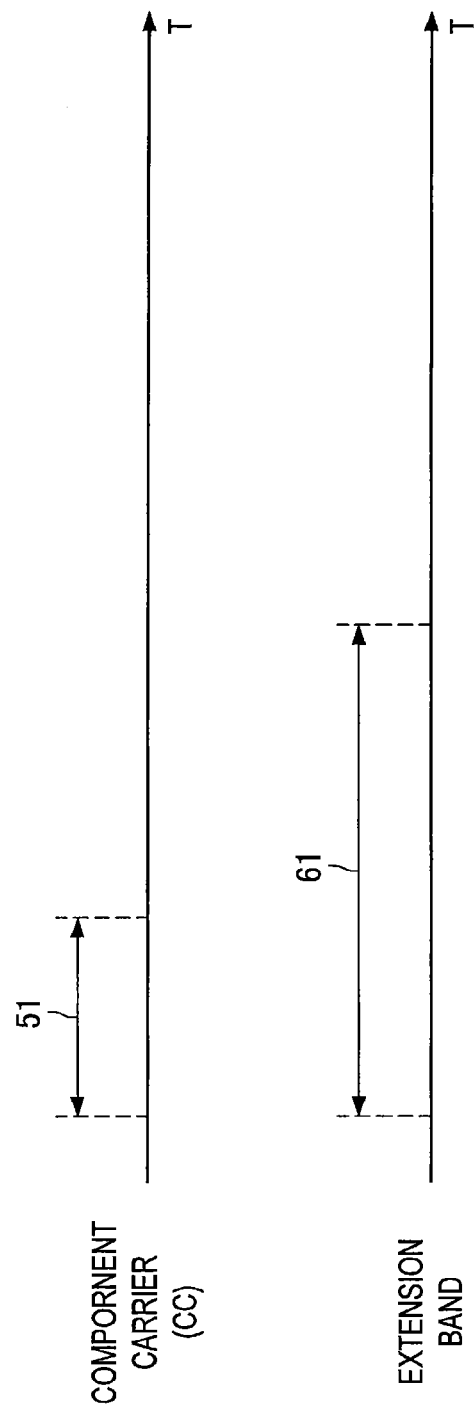
FIG. 16 is an explanatory diagram illustrating an example of a period of measurement in each of a component carrier (CC) and an extension band.

FIG. 16 is an explanatory diagram illustrating an example of a period of measurement in each of the component carrier (CC) and the extension band. Referring to FIG. 16, for example, in the CC, the RSRP and/or the RSRQ are/is measured using a control signal (for example, the CRS and/or the CSI-RS) over a first period 51. On the other hand, in the extension band, the RSRP and/or the RSRQ are/is measured using a control signal (for example, the CRS and/or the CSI-RS) over a second period 61, which is longer than the first period 51.

Such measurement periods make it possible to obtain a highly reliable measurement result also in the extension band, which has a narrower bandwidth (that is, the amount of control signal that can be used for measurement is smaller) than the CC. For example, it becomes possible to obtain a more reliable RSRP and/or RSRQ by averaging the reception power of more control signals (for example, the CRS and/or the CSI-RS).

(Measurement Control Unit 283)

The measurement control unit 283 controls the execution of measurement by the UE 200-3.

Note that, for example, similarly to the measurement control unit 265 according to the first embodiment, the measurement control unit 283 may control the execution of measurement in a manner that part of the measurement in the extension band is not executed or none of the measurement in the extension band is executed.

(Report Unit 285)

The report unit 285 reports the result of measurement by the UE 200-3 to the eNode B 100-3. The report unit 285 repots the measurement result via the wireless communication unit 220.

For example, the measurement result includes the RSRP and/or the RSSQ. That is, the report unit 285 reports the RSRP and/or the RSSQ, for example, to the eNode B 100-1 via the wireless communication unit 220.

In particular, in the third embodiment, the report unit 285 reports each of the first measurement result being a result of measurement by the UE in the CC and the second measurement result being a result of measurement by the UE in the extension band.

In addition, for example, a condition for the report of the second measurement result is different from a condition for the report of the first measurement result. Thus, for example, it becomes possible to report the measurement result in the CC and the measurement result in the extension band at more appropriate timing for each.

Condition for Report

First Example

As a first example, the report of the first measurement result is a report that is triggered by each of one or more kinds of events. In addition, the report of the second measurement result is a report that is triggered by each of at least one kind of event including another kind of event, which is not included in the one or more kinds of events. Thus, for example, it becomes possible to report the measurement result in the extension band at unique and more appropriate timing.

Specifically, for example, the one or more kinds of events that trigger the report of the first measurement result includes one or more of Events A1 to A6 defined by Release 8.

In addition, for example, the other kind of event that triggers the report of the second measurement result is that the relation between the first measurement result and the second measurement result satisfies a predetermined condition. As an example, the other kind of event is that the difference between the first measurement result and the second measurement result satisfies a predetermined condition. A specific example of an event in terms of this point will be described below with reference to FIGS. 17 and 18.

Figure 17:
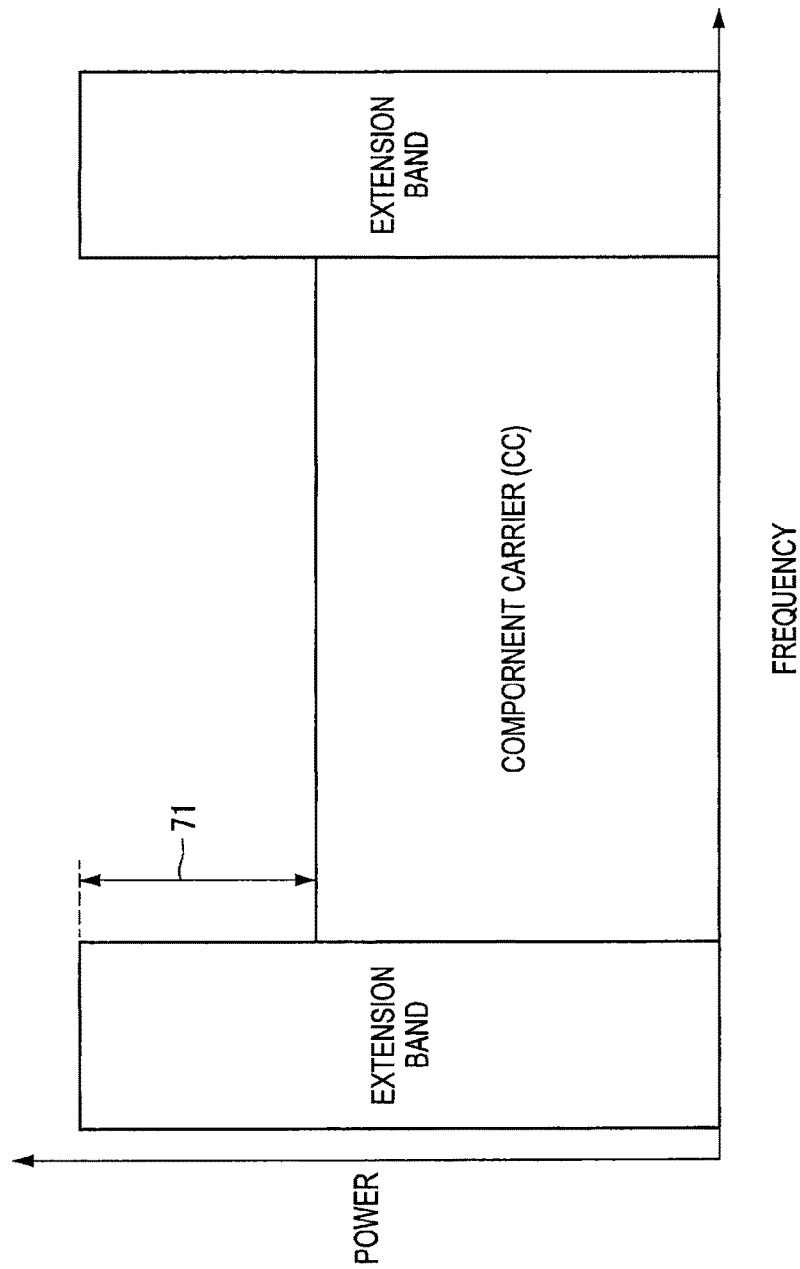
FIG. 17 is an explanatory diagram illustrating a first example of another kind of event that triggers a report of a measurement result in an extension band (a second measurement result).

FIG. 17 is an explanatory diagram illustrating a first example of the other kind of event that triggers the report of the measurement result in the extension band (the second measurement result). Referring to FIG. 17, the RSRP for each of the extension band and the CC is illustrated. For example, the other kind of event is that a difference 71 that is obtained by subtracting the RSRP in the CC from the RSRP in the extension band exceeds a predetermined threshold. That is, when the RSRP in the extension band becomes larger than the RSRP in the CC by the predetermined threshold or more, the report unit 285 reports the measurement result in the extension band (for example, the RSRP) to the eNode B 100-3.

Figure 18:
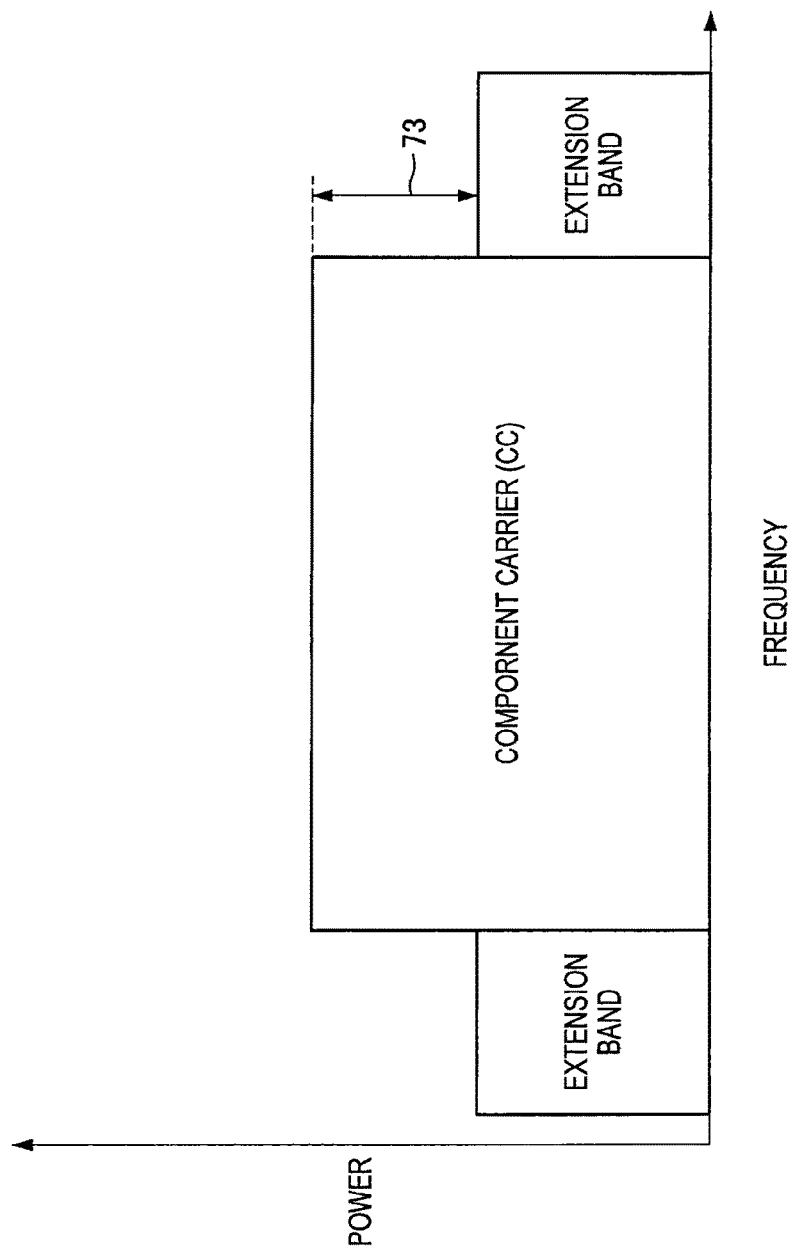
FIG. 18 is an explanatory diagram illustrating a second example of another kind of event that triggers a report of a second measurement result (a measurement result in an extension band).

FIG. 18 is an explanatory diagram illustrating a second example of the other kind of event that triggers the report of the measurement result in the extension band (the second measurement result). Referring to FIG. 18, the RSRP for each of the extension band and the CC is illustrated. For example, the other kind of event is that a difference 73 that is obtained by subtracting the RSRP in the extension band from the RSRP in the CC exceeds a predetermined threshold. That is, when the RSRP in the extension band becomes smaller than the RSRP in the CC by the predetermined threshold or more, the report unit 285 reports the measurement result in the extension band (for example, the RSRP) to the eNode B 100-3.

With such conditions for the reports, for example, in a case in which a predetermined difference is generated between the communication quality in the extension band and the communication quality in the CC, the measurement report in the extension band may be reported. That is, only in a case in which a characteristic that is different from that in the measurement result in the CC appears in the measurement result in the extension band, the measurement result in the extension band may be reported. As a result, for example, it becomes possible to limit the report of the measurement result in the extension band and to reduce the load of report.

Note that the at least one kind of event that triggers the report of the second measurement result may include one or more of Events A1 to A6 defined by Release 8.

Condition for Report

Second Example

As a second example, the report of the first measurement result and the report of the second measurement result may be a report that is triggered by at least one event of the same kind. In addition, part or all of the at least one event of the same kind may have a first threshold for the report of the first measurement result and a second threshold for the report of the second measurement result.

Specifically, for example, the at least one event of the same kind includes one or more of Events A1 to A6 defined by Release 8. That is, the report of the first measurement result and the report of the second measurement result are a report that is triggered by the one or more of Events A1 to A6. Furthermore, the one or more events have a first threshold for the report of the first measurement result (the measurement result in the CC) and a second threshold for the report of the second measurement result (the measurement result in the extension band).

Thus, for example, it becomes possible to report the measurement result in the CC and the measurement result in the extension band at more appropriate timing for each. As an example, it becomes possible to report the first measurement result (the measurement result in the CC) of more importance more frequently than the second measurement result (the measurement result in the extension band).

Condition for Report

Third Example

As a third example, the report of the first measurement result may be a report made in a first cycle and the report of the second measurement result may be a report made in a second cycle that is different from the first cycle.

Specifically, for example, the report unit 285 reports the measurement result periodically. Furthermore, the report unit 285 reports the first measurement result in the first cycle and reports the second measurement result in the second cycle. As an example, the second cycle is longer than the first cycle.

Thus, for example, it becomes possible to report the measurement result in the CC and the measurement result in the extension band at more appropriate timing for each. As an example, by reporting the second measurement result (the measurement result in the extension band) in a cycle longer than the cycle for the first measurement result, it becomes possible to secure a longer period as a period of measurement in the extension band. As a result, it becomes possible to report a more reliable measurement result.

5.3. Flow of Process

Next, an example of a communication control process according to the third embodiment will be described with reference to FIGS. 19 to 21.
(Communication Control Process on eNode B Side)

Figure 19:
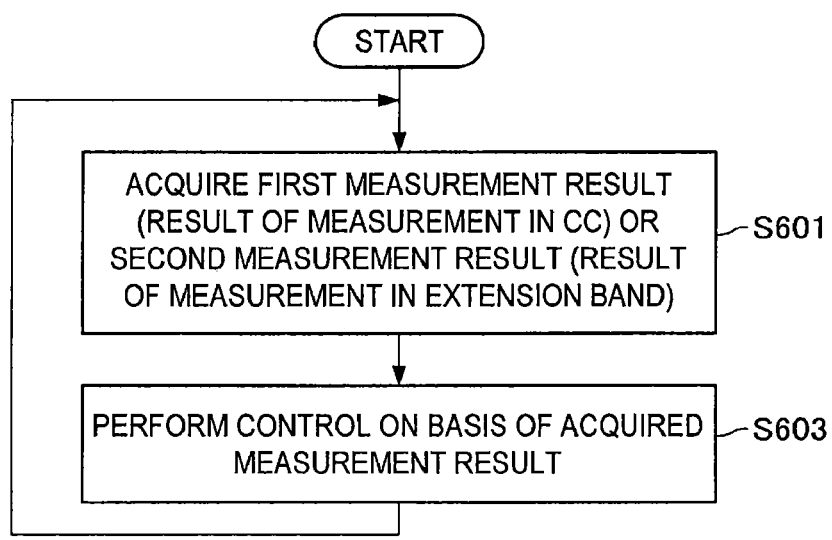
FIG. 19 is a flowchart illustrating an example of a schematic flow of a communication control process on an eNode B side according to the third embodiment.

FIG. 19 is a flowchart illustrating an example of a schematic flow of a communication control process on the eNode B 100-3 side according to the third embodiment.

In step S601, the information acquisition unit 161 acquires the first measurement result being a result of measurement by the UE 200-3 in the CC or the second measurement result being a result of measurement by the UE 200-3 in the extension band.

In step S603, on the basis of the acquired measurement result, the communication control unit 163 controls wireless communication within the cell 10. Then, the process returns to step S601.
(First Communication Control Process on UE Side)

Figure 20:
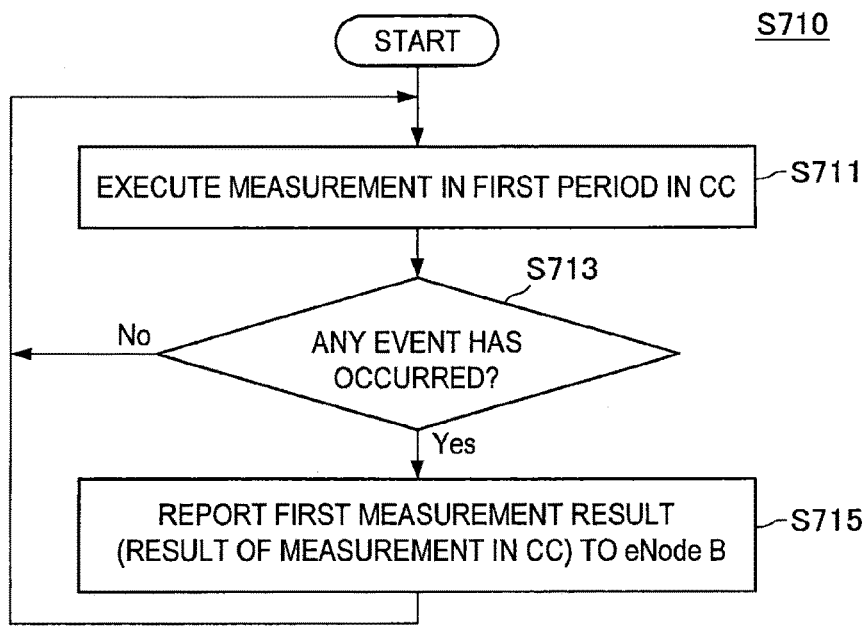
FIG. 20 is a flowchart illustrating an example of a schematic flow of a first communication control process on a UE side according to the third embodiment.

FIG. 20 is a flowchart illustrating an example of a schematic flow of a first communication control process on the UE 200-3 side according to the third embodiment. The first communication control process is a process related to measurement in the CC.

In step S711, the measuring unit 281 executes measurement in a first period in the CC.

In step S713, the report unit 285 determines whether or not any event that triggers a report of the first measurement result (the measurement result in the CC) has occurred. If any event has occurred, the process proceeds to step S715. Otherwise, the process returns to step S711.

In step S715, the report unit 285 reports the first measurement result (the measurement result in the CC) to the eNode B 100-3 via the wireless communication unit 220. Then, the process returns to step S711.
(Second Communication Control Process on UE Side)

Figure 21:
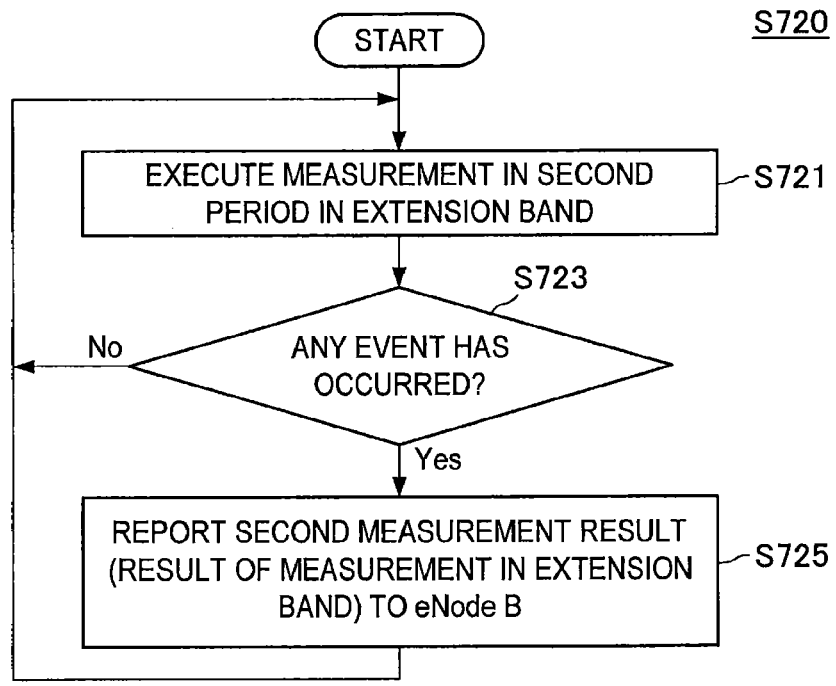
FIG. 21 is a flowchart illustrating an example of a schematic flow of a second communication control process on a UE side according to the third embodiment.

FIG. 21 is a flowchart illustrating an example of a schematic flow of a second communication control process on the UE 200-3 side according to the third embodiment. The second communication control process is a process related to measurement in the extension band.

In step S721, the measuring unit 281 executes measurement in a second period in the extension band.

In step S723, the report unit 285 determines whether or not any event that triggers a report of the second measurement result (the measurement result in the extension band) has occurred. If any event has occurred, the process proceeds to step S725 Otherwise, the process returns to step S721.

In step S725, the report unit 285 reports the second measurement result (the measurement result in the extension band) to the eNode B 100-3 via the wireless communication unit 220. Then, the process returns to step S721.

5.4. Modification Example

Next, a modification example of the third embodiment will be described with reference to FIGS. 22 to 25.

In the modification example of the third embodiment, in response to the control by the eNode B 100-3, the UE 200-1 reports each of the measurement result in the CC and the measurement result in the extension band, or reports the result of measurement in the band including the CC and the extension band.
(Configuration of eNode B: Information Acquisition Unit 161)

In particular, in the modification example of the third embodiment, the information acquisition unit 161 acquires information related to a report unit of the measurement result related to the CC and the extension band (hereinafter referred to as "report unit information").

For example, the report unit information is either third information or fourth information, the third information corresponding to a report of the measurement result in the CC (the first measurement result) and the measurement result in the extension band (the second measurement result), the fourth information corresponding to a report of the measurement result in the band including the CC and the extension band (hereinafter referred to as "integrated measurement result").

For example, the report unit information is setting information of the eNode B 100-3. In addition, the third information is setting information for control of the UE in a manner that the measurement result in the CC (the first measurement result) and the measurement result in the extension band (the second measurement result) are reported. Furthermore, the fourth information is setting information for control of the UE in a manner that the measurement result in the band including the CC and the extension band (the integrated measurement result) is reported. In addition, for example, the setting information is set by the operator of the communication system 1.

(Configuration of eNode B: Communication Control Unit 163)

In particular, in the modification example of the third embodiment, the communication control unit 163 gives an instruction of the report unit of measurement to the UE 200-3. For example, the communication control unit 163 instructs the UE 200-3 to report each of the measurement result in the CC and the measurement result in the extension band, and/or to report the measurement result in the band including the CC and the extension band.

For example, the communication control unit 163 instructs the UE 200-3 either to report each of the measurement result in the CC and the measurement result in the extension band, or to report the measurement result in the band including the CC and the extension band. More specifically, for example, in a case in which the report unit information is the third information, the communication control unit 163 instructs the UE 200-3 to report each of the measurement result in the CC (the first measurement result) and the measurement result in the extension band (the second measurement result). In addition, in a case in which the report unit information is the fourth information, the communication control unit 163 instructs the UE 200-3 to report the measurement result in the band including the CC and the extension band (the integrated measurement result).

(Configuration of UE: Measuring Unit 281)

In particular, in the modification example of the third embodiment, in response to the control by the measurement control unit 283, the measuring unit 281 executes each of the measurement in the CC and measurement in the extension band, or executes measurement in the band including the CC and the extension band. In a case in which the measuring unit 281 executes each of the measurement in the CC and the measurement in the extension band, the measurement result in the CC (the first measurement result) and the measurement result in the extension band (the second measurement result) are obtained. In addition, in a case in which the measuring unit 281 executes measurement in the band including the CC and the extension band, the measurement result in the band including the CC and the extension band (the integrated measurement result) is obtained.

(Configuration of UE: Measurement Control Unit 283)

In particular, in the modification example of the third embodiment, in response to the control by the eNode B 100-3, the measurement control unit 283 controls the execution of measurement.

Specifically, for example, the eNode B 100-3 instructs the UE 200-3 to report each of the measurement result in the CC (the first measurement result) and the measurement result in the extension band (the second measurement result). Then, the measurement control unit 283 controls the measuring unit 281 in a manner that each of the measurement in the CC and measurement in the extension band is executed. In addition, for example, the eNode B 100-3 instructs the UE 200-3 to report the measurement result in the band including the CC and the extension band (the integrated measurement result). Then, the measurement control unit 283 controls the measuring unit 281 in a manner that the measurement in the band including the CC and the extension band is executed.

(Configuration of UE: Report Unit 285)

In particular, in the modification example of the third embodiment, in response to the control by the eNode B 100-3, the report unit 285 reports the result of measurement by the UE 200-3 to the eNode B 100-3.

Specifically, for example, the eNode B 100-3 instructs the UE 200-3 to report each of the measurement result in the CC (the first measurement result) and the measurement result in the extension band (the second measurement result). Then, the report unit 285 reports each of the first measurement result and the second measurement result to the eNode B 100-3. In addition, for example, the eNode B 100-3 instructs the UE 200-3 to report the measurement result in the band including the CC and the extension band (the integrated measurement result). Then, the report unit 285 reports the integrated measurement result to the eNode B 100-3.

(Flow of Process: First Communication Control Process on eNode B Side)

Figure 22:
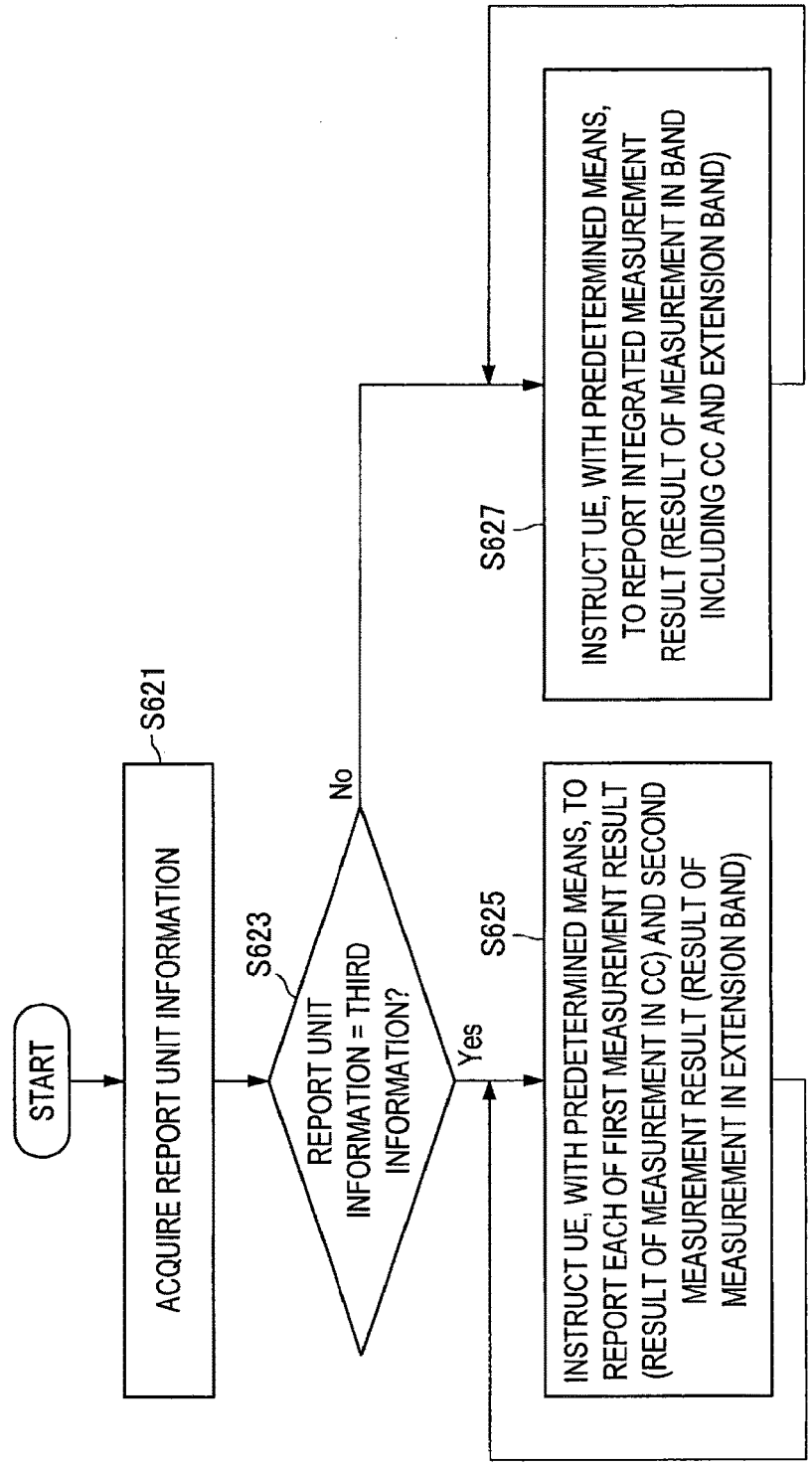
FIG. 22 is a flowchart illustrating an example of a schematic flow of a first communication control process on an eNode B side according to a modification example of the third embodiment.

FIG. 22 is a flowchart illustrating an example of a schematic flow of a first communication control process on the eNode B 100-3 side according to the modification example of the third embodiment. The first communication control process is a process related to the instruction of the report unit of measurement.

In step S621, the information acquisition unit 161 acquires the report unit information (information related to the report unit of the measurement result related to the CC and the extension band). The report unit information is either the third information or the fourth information, the third information corresponding to a report of the measurement result in the CC (the first measurement result) and the measurement result in the extension band (the second measurement result), the fourth information corresponding to a report of the measurement result in the band including the CC and the extension band (the integrated measurement result).

In step S623, the communication control unit 163 determines whether or not the report unit information is the third information. If the report unit information is the third information, the process proceeds to step S625. Otherwise (that is, if the report unit information is the fourth information), the process proceeds to step S627.

In step S625, the communication control unit 163 instructs the UE 200-3, with a predetermined means via the wireless communication unit 120, to report each of the first measurement result and the second measurement result, the first measurement result being a result of measurement in the CC, the second measurement result being a result of measurement in the extension band. Then, the process repeats step S625.

In step S627, the communication control unit 163 instructs the UE 200-3, via the wireless communication unit 120, to report the integrated measurement result being a result of measurement in the band including the CC and the extension band. Then, the process repeats step S627.

(Flow of Process: Second Communication Control Process on eNode B Side)

Figure 23:
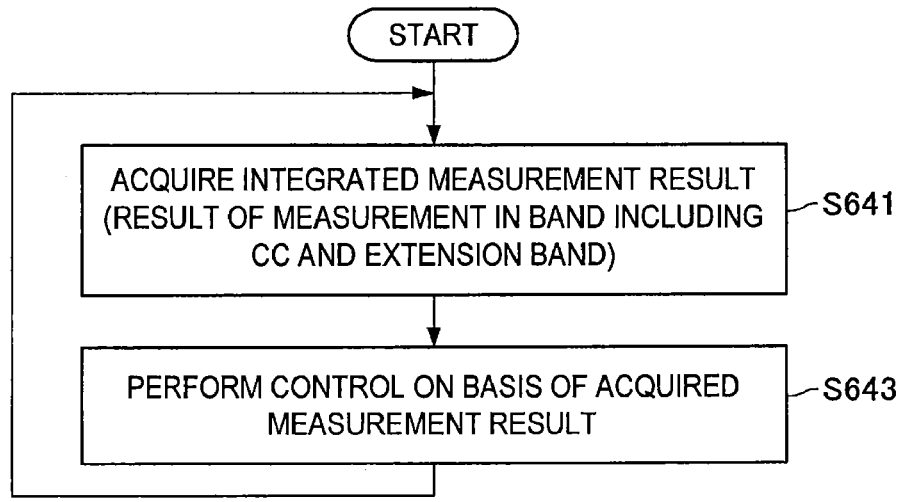
FIG. 23 is a flowchart illustrating an example of a schematic flow of a second communication control process on an eNode B side according to a modification example of the third embodiment.

FIG. 23 is a flowchart illustrating an example of a schematic flow of a second communication control process on the eNode B 100-3 side according to the modification example of the third embodiment. The second communication control process is a process of a case in which the integrated measurement result is reported by the UE 200-3 to the eNode B 100-3. Note that the process of a case in which the first measurement result and the second measurement result are reported is as described above with reference to FIG. 19.

In step S641, the information acquisition unit 161 acquires the integrated measurement result being a result of measurement by the UE 200-3 in the band including the CC and the extension band.

In step S643, on the basis of the acquired measurement result, the communication control unit 163 controls wireless communication within the cell 10. Then, the process returns to step S641.

(Flow of Process: Second Measurement Report Process on UE Side)

Figure 24:
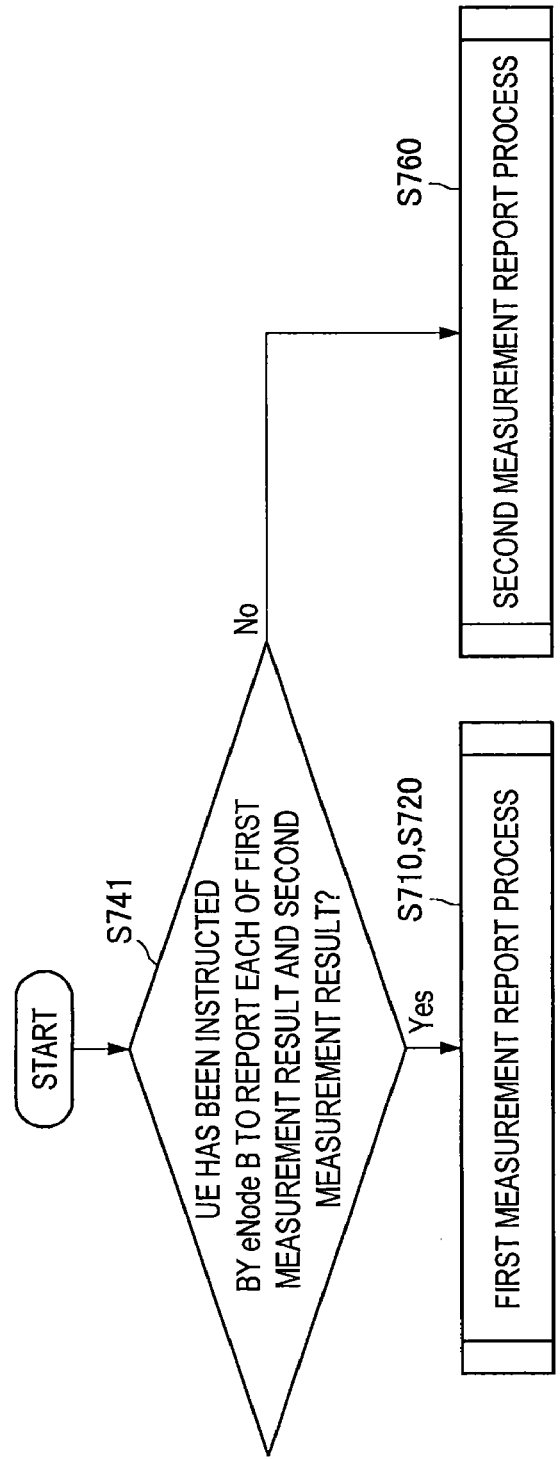
FIG. 24 is a flowchart illustrating an example of a schematic flow of a communication control process on a UE side according to a modification example of the third embodiment.

FIG. 24 is a flowchart illustrating an example of a schematic flow of a communication control process on the UE 200-3 side according to the modification example of the third embodiment.

In step S741, the measurement control unit 283 and/or the report unit 285 determine(s) whether or not the UE 200-3 has been instructed by the eNode B 100-3 to report each of the first measurement result being the measurement result in the CC and the second measurement result being the measurement result in the extension band. In a case in which the UE 200-3 has been instructed by the eNode B 100-3 to report the first measurement result and the second measurement result, the process proceeds to steps S710 and S720. Otherwise, the process proceeds to step S760.

In steps S710 and S720, a first measurement report process is performed. Step S710 is the process described above with reference to FIG. 20, and step S720 is the process described above with reference to FIG. 21.

In step S760, a second measurement report process is performed.

(Flow of Process: Second Measurement Report Process on UE Side)

Figure 25:
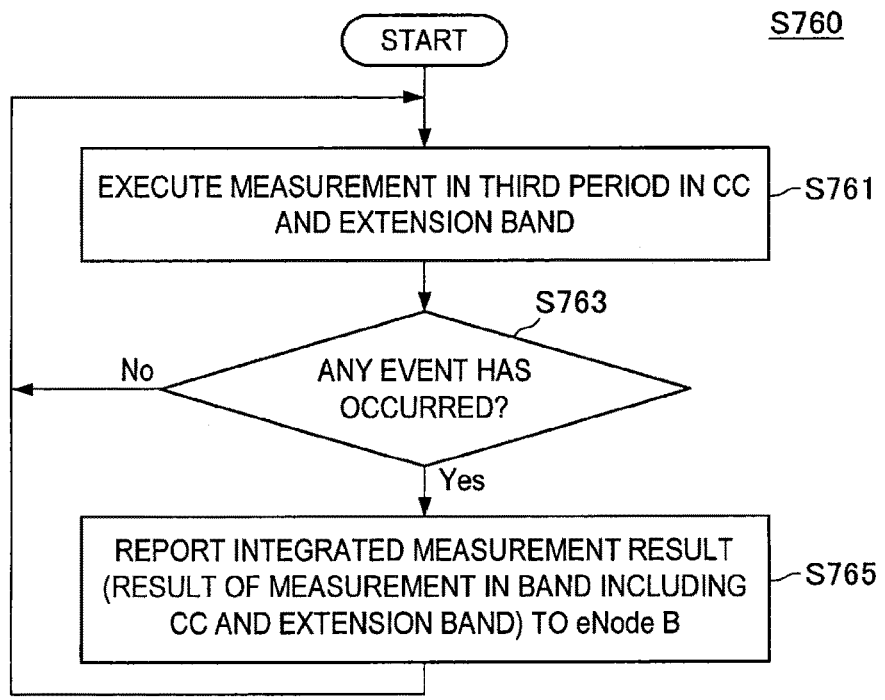
FIG. 25 is a flowchart illustrating an example of a schematic flow of a second measurement report process on a UE side according to a modification example of the third embodiment.

FIG. 25 is a flowchart illustrating an example of a schematic flow of the second measurement report process on the UE 200-3 side according to the modification example of the third embodiment.

In step S761, the measuring unit 281 executes measurement in a third period in the band including the CC and the extension band.

In step S763, the report unit 285 determines whether or not any event that triggers a report of the integrated measurement result (the measurement result in the band including the CC and the extension band) has occurred. If any event has occurred, the process proceeds to step S765. Otherwise, the process returns to step S761.

In step S765, the report unit 285 reports the integrated measurement result (the measurement result in the band including the CC and the extension band) to the eNode B 100-3 via the wireless communication unit 220. Then, the process returns to step S761.

Note that the third period is similar to the first period, for example. In addition, any event that triggers a report of the integrated measurement result is similar to any event that triggers a report of the first measurement result, for example.

The modification example of the third embodiment has been described above. According to the modification example, by controlling the eNode B 100-1, the unit of report can be changed. Accordingly, it becomes possible to employ a method of report more flexibly, for example.

6. Fourth Embodiment

Next, a fourth embodiment of the present disclosure will be described with reference to FIGS. 26 to 34.

As described above, in a case in which a UE performs wireless communication also in the extension band, which is other than the component carrier (CC) in the frequency bands allocated to a service provider, since the extension band is also used, the UE may execute measurement also in the extension band.

However, in this case, the UE executes measurement in the CC and the extension band (that is, a wider band). As a result, a load of measurement on the UE may be increased.

Accordingly, in the first embodiment of the present disclosure, it becomes possible to suppress the load of measurement by the UE in a case in which the allocated frequency bands are utilized (that is, in a case in which the extension band is also used). Specifically, in the first embodiment, the transmission of the control signal in the extension band is controlled.

6.1. Configuration of eNode B

Figure 26:
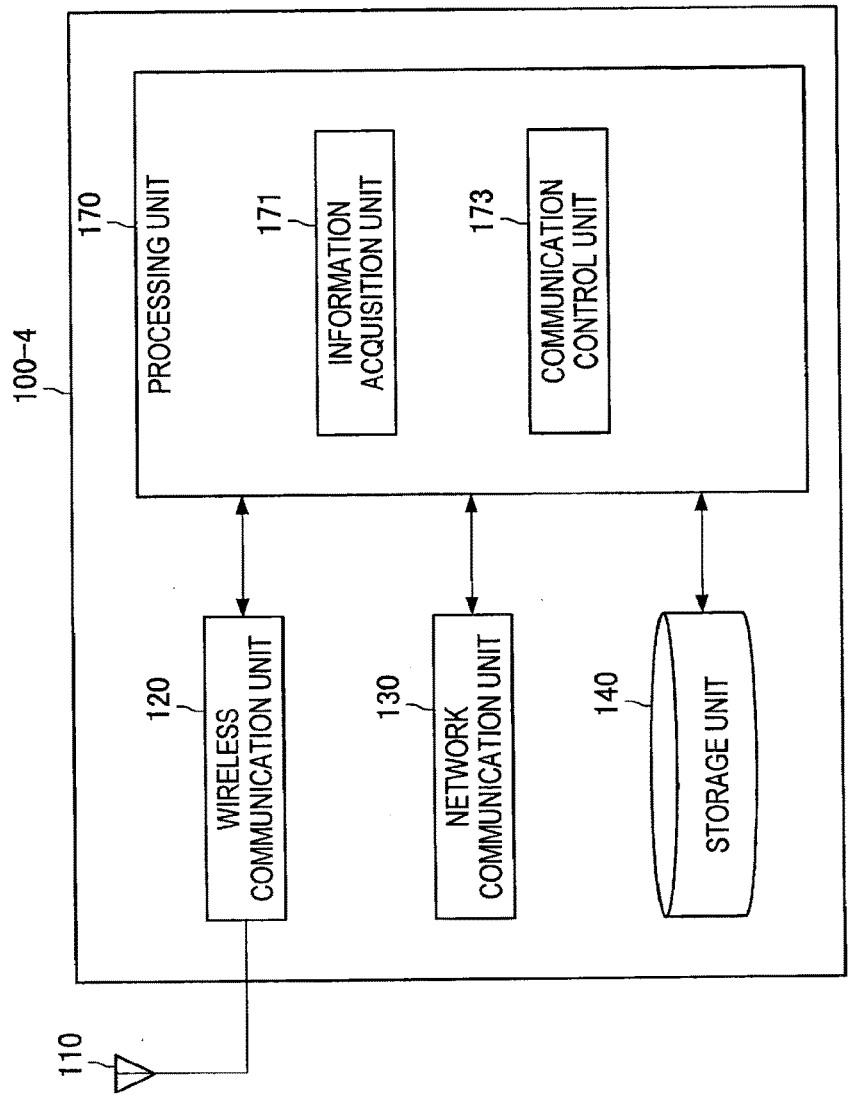
FIG. 26 is a block diagram illustrating an example of a configuration of an eNode B according to a fourth embodiment.

First, a schematic configuration of an eNode B 100-4 according to the fourth embodiment will be described with reference to FIGS. 26 and 27. FIG. 26 is a block diagram illustrating an example of the configuration of the eNode B 100-4 according to the fourth embodiment. Referring to FIG. 26, the eNode B 100-4 includes the antenna unit 110, the wireless communication unit 120, the network communication unit 130, the storage unit 140, and a processing unit 170.

Here, the antenna unit 110, the wireless communication unit 120, the network communication unit 130, and the storage unit 140 in the third embodiment are not different from those in the first embodiment. Therefore, the processing unit 170 will be described here.

(Processing Unit 170)

The processing unit 170 provides various functions of the eNode B 100-4. The processing unit 170 includes an information acquisition unit 171 and the communication control unit 173.

(Information Acquisition Unit 171)

The information acquisition unit 151 acquires measurement related information related to the execution of measurement by the UE in the extension band, which is other than the component carrier (the band of the predetermined bandwidth) in the frequency bands allocated to the service provider.

In particular, in the fourth embodiment, the measurement related information is setting information related to the transmission of a control signal used for measurement by the UE. For example, the control signal includes the CRS and/or the CSI-RS.

For example, the measurement related information is setting information indicating the position at which the control signal is transmitted (the radio resource). As an example, the measurement related information is information indicating an antenna port with which the control signal is transmitted in the CC and an antenna port with which the control signal is transmitted in the extension band.

(Communication Control Unit 173)

The communication control unit 173 controls wireless communication within the cell 10.

In particular, in an embodiment of the present disclosure, on the basis of the measurement related information, the communication control unit 173 performs control related to the measurement by the UE in the extension band (hereinafter referred to as "measurement related control").

Control of Transmission of Control Signal

In addition, in particular, in the fourth embodiment, the measurement related control includes control of the transmission of the control signal in the extension band (hereinafter referred to as "control signal transmission control").

That is, the communication control unit 173 performs control of the transmission of the control signal in the extension band (i.e., the control signal transmission control). For example, on the basis of the measurement related information, the communication control unit 173 performs the control signal transmission control.

In addition, for example, the control signal transmission control includes control of the transmission of the control signal in a manner that the density of the control signal transmitted in the extension band is different from the density of the control signal transmitted in the CC. More specifically, for example, the control signal transmission control includes control of the transmission of the control signal in a manner that the density of the control signal transmitted in the extension band is lower than the density of the control signal transmitted in the CC.

Even more specifically, for example, the control signal transmission control includes control of the transmission of the control signal in a manner that the control signal is transmitted in the extension band with a smaller number of antenna ports than a number of antenna ports with which the control signal is transmitted in the CC. That is, the communication control unit 173 controls the transmission of the control signal in a manner that the control signal is transmitted in the CC with a first number of antenna ports and the control signal is transmitted in the extension band with a second number of antenna ports, the second number being smaller than the first number. For example, the communication control unit 173 causes the wireless communication unit 120 to transmit the control signal in this manner. A specific example regarding this point will be described below with reference to FIG. 27.

Figure 27:
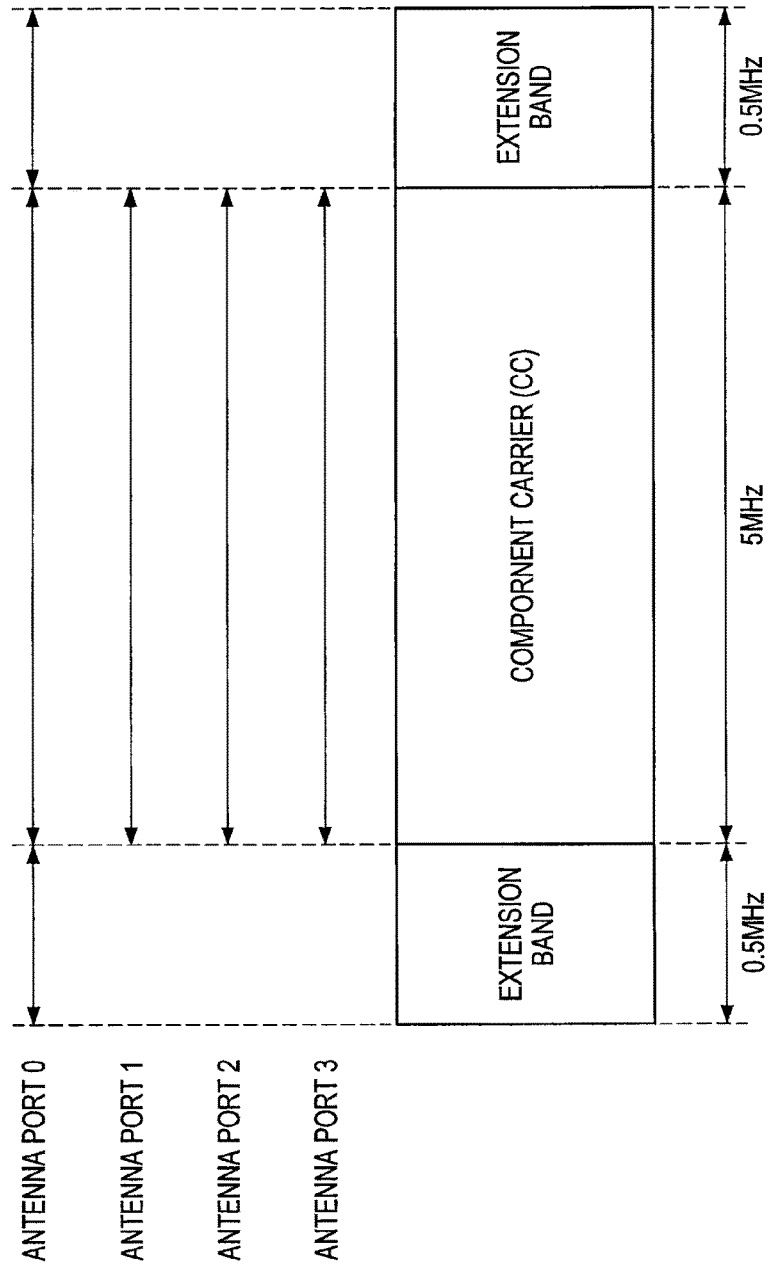
FIG. 27 is an explanatory diagram illustrating examples of antenna ports that transmit a control signal in bands.

FIG. 27 is an explanatory diagram illustrating examples of antenna ports that transmit the control signal in each band. Referring to FIG. 27, a CC of 5 MHz and two extension bands of 0.5 MHz are illustrated. In this example, in the CC, the control signal is transmitted with four antenna ports: Antenna Ports 0 to 3. In the extension band, the control signal is transmitted only with Antenna Port 0. In this manner, in the extension band, the control signal is transmitted with a smaller number of antenna ports.

By such control of the transmission of the control signal, the number of control signals used for measurement is reduced. Thus, for example, it becomes possible to suppress the load of measurement by the UE in a case in which the extension band is also used. In addition, for example, an overhead due to the control signal used for measurement is suppressed.

Other Control

For example, the communication control unit 173 reports, to an UE 200-4, information indicating the position (a radio resource) at which the control signal is transmitted. As an example, the above information is information indicating an antenna port with which the control signal is transmitted in the CC and an antenna port with which the control signal is transmitted in the extension band. For example, the communication control unit 173 reports the information to the UE 200-4 using system information. Note that the communication control unit 173 may report the information to the UE 200-4 by any signaling (signaling in Connection Setup, RRC signaling, or the like).

6.2. Configuration of UE

Figure 28:
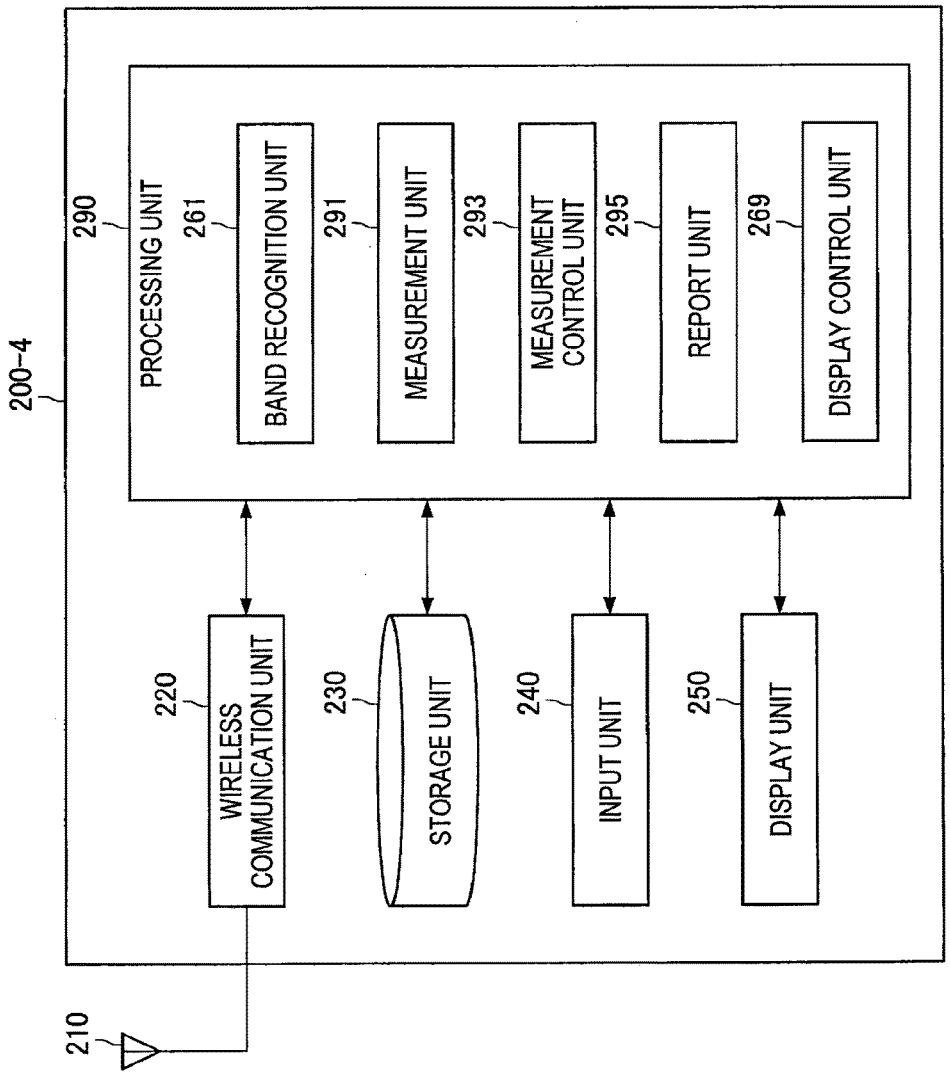
FIG. 28 is a block diagram illustrating an example of a configuration of a UE according to the fourth embodiment.

First, a schematic configuration of the UE 200-4 according to the fourth embodiment will be described with reference to FIG. 28. FIG. 28 is a block diagram illustrating an example of the configuration of the UE 200-4 according to the fourth embodiment. Referring to FIG. 28, the UE 200-4 includes the antenna unit 210, the wireless communication unit 220, the storage unit 230, the input unit 240, the display unit 250, and a processing unit 290.

Here, the antenna unit 210, the wireless communication unit 220, the storage unit 230, the input unit 240, and the display unit 250, and the following units included in the processing unit 290, which are the band recognition unit 261 and the display control unit 269, in the fourth embodiment are not different from those in the first embodiment. Therefore, a measurement unit 291, a measurement control unit 293, and a report unit 295 included in the processing unit 290 will be described here.

(Measurement Unit 291)

The measurement unit 291 executes measurement in the frequency bands allocated to the service provider.

For example, the measurement is measurement of the quality of a transmission path. More specifically, for example, the measurement is measurement of the RSRP and/or the RSSQ. In this case, the measurement unit 291 measures the RSRP by use of a control signal. That is, the measurement unit 291 measures the RSRP by averaging the reception power of the control signal. For example, the control signal includes the CRS and/or a CSI-RS.

In addition, the measurement unit 291 executes measurement in accordance with control by the measurement control unit 293. For example, the measurement unit 291 executes measurement using the control signal transmitted in a radio resource designated by the measurement control unit 293.

(Measurement Control Unit 293)

The measurement control unit 293 controls the execution of measurement by the UE 200-4.

In particular, in the fourth embodiment, the density of the control signal transmitted in the extension band is different from the density of the control signal transmitted in the CC. More specifically, for example, the density of the control signal transmitted in the extension band is lower than the density of the control signal transmitted in the CC. In addition, the measurement control unit 293 controls the execution of measurement by the UE 200-4 in a manner that at least measurement is performed in the CC by use of the control signal transmitted in the CC.

Even more specifically, for example, the control signal is transmitted in the extension band with a smaller number of antenna ports than the number of antenna ports with which the control signal is transmitted in the CC. In addition, the measurement control unit 293 controls the execution of measurement by the UE 200-4 in a manner that measurement is executed in the CC by use of the control signal transmitted in the CC and measurement is executed in the extension band by use of the control signal transmitted in the extension band. That is, the measurement control unit 293 controls the measurement unit 291 to execute such measurement.

Note that, for example, the eNode B 100-4 reports, to the UE 200-4, information indicating the position (a radio resource) at which the control signal is transmitted. As an example, the information is information indicating an antenna port with which the control signal is transmitted in the CC and an antenna port with which the control signal is transmitted in the extension band. Then, the measurement control unit 293 acquires the information via the wireless communication unit 220, and recognizes the antenna port with which the control signal is transmitted in the CC and the antenna port with which the control signal is transmitted in the extension band. Then, the measurement control unit 293 causes the measurement unit 291 to execute measurement by designating a radio resource corresponding to the antenna port with which the control signal is transmitted in the CC and the radio resource corresponding to the antenna port with which the control signal is transmitted in the extension band.

(Report Unit 295)

The report unit 295 reports a result of measurement by the UE 200-4 to the eNode B 100-4.

For example, the measurement result includes the RSRP and/or the RSSQ. That is, the report unit 267 reports the RSRP and/or the RSSQ, for example, to the eNode B 100-4 via the wireless communication unit 220.

Note that the report unit 295 may report the measurement result for each antenna port to the eNode B 100-4. In this case, the measurement result for the antenna port with which the control signal is transmitted in the CC and the extension band may be the measurement result in the band including the CC and the extension band (the integrated measurement result), or may be the measurement result in the CC (the first measurement result) and the measurement result in the extension band (the second measurement result).

In addition, the report unit 295 may report each of the measurement result in the CC and the measurement result in the extension band to the eNode B 100-4. In this case, the measurement result in the CC may be a measurement result for each antenna port or may be a measurement result for all of the antenna ports. For example, in a case in which measurement is not executed in the extension band, the measurement result in the CC may be the measurement result for all of the antenna ports.

6.3. Flow of Process

Next, an example of a communication control process according to the fourth embodiment will be described with reference to FIGS. 29 to 31.

(First Communication Control Process on eNode B Side)

Figure 29:
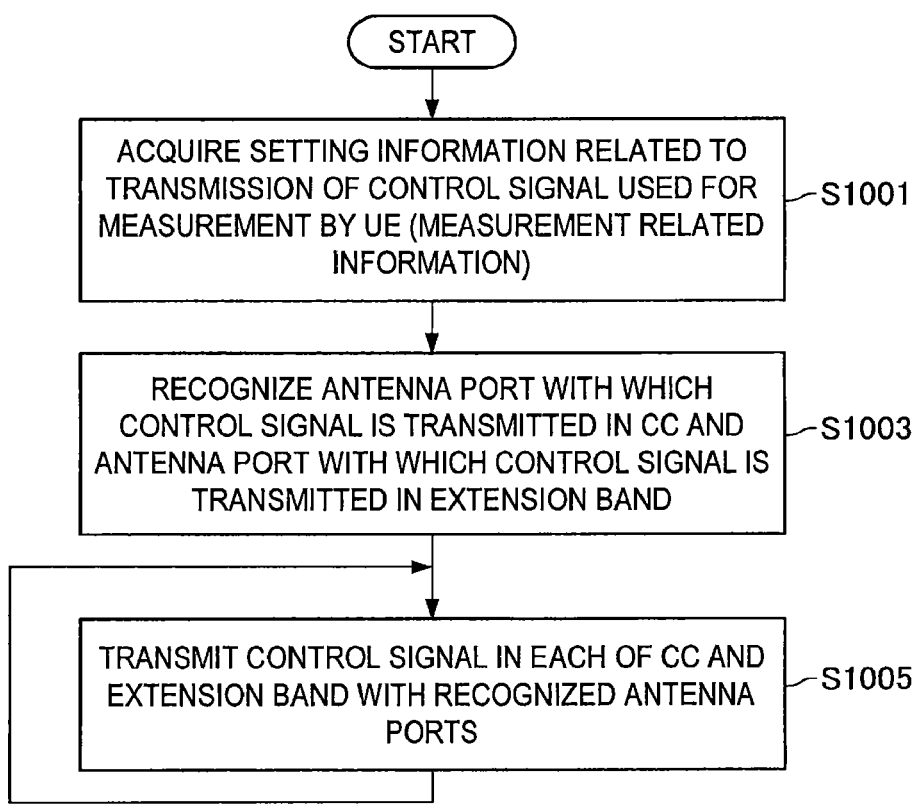
FIG. 29 is a flowchart illustrating an example of a schematic flow of a first communication control process on an eNode B side according to the fourth embodiment.

FIG. 29 is a flowchart illustrating an example of a schematic flow of a first communication control process on the eNode B 100-4 side according to the fourth embodiment. The first communication control process is a process related to the transmission of the control signal.

In step S1001, the information acquisition unit 171 acquires setting information related to the transmission of the control signal used for measurement by the UE (the measurement related information). The setting information is information indicating the antenna port with which the control signal is transmitted in the CC and the antenna port with which the control signal is transmitted in the extension band.

In step S1003, from the setting information, the communication control unit 173 recognizes the antenna port with which the control signal is transmitted in the CC and the antenna port with which the control signal is transmitted in the extension band.

In step S1005, the communication control unit 173 causes the wireless communication unit 120 to transmit the control signal in each of the CC and the extension band with the recognized antenna ports. Then, the process repeats step S1005.

(Second Communication Control Process on eNode B Side)

Figure 30:
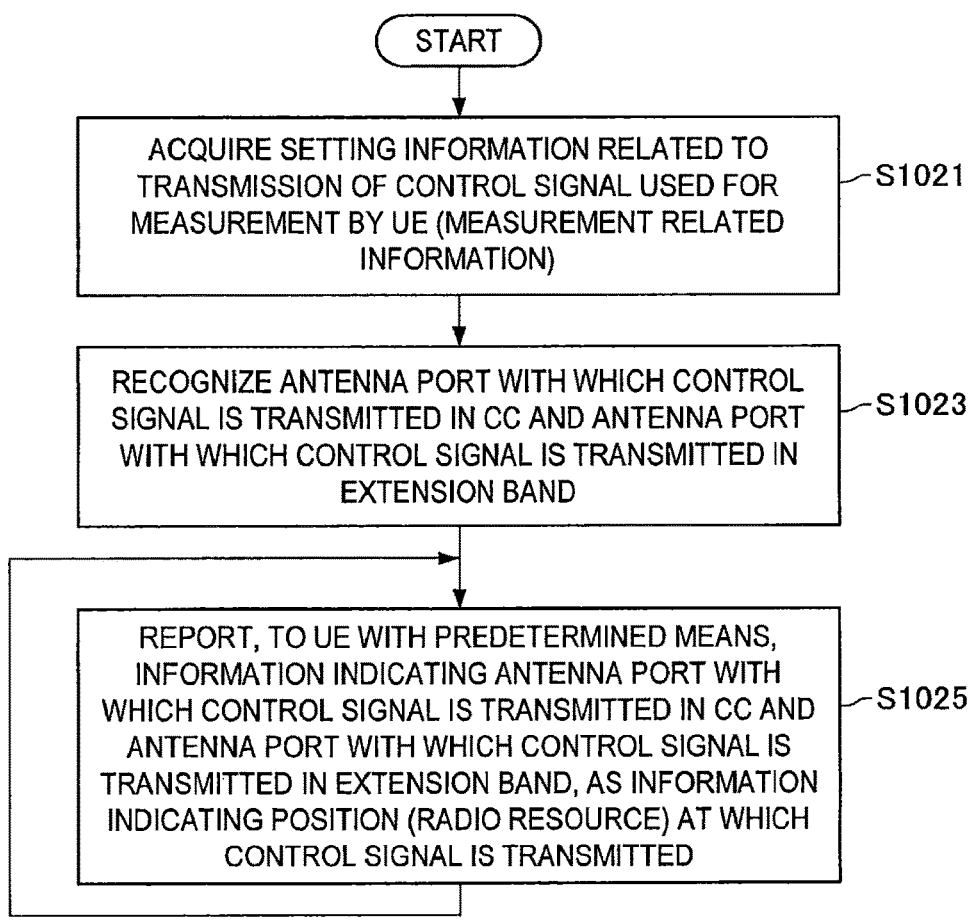
FIG. 30 is a flowchart illustrating an example of a schematic flow of a second communication control process on an eNode B side according to the fourth embodiment.

FIG. 30 is a flowchart illustrating an example of a schematic flow of a second communication control process on the eNode B 100-4 side according to the fourth embodiment. The second communication control process is a process related to a report of information indicating the position (a radio resource) at which the control signal is transmitted.

In step S1021, the information acquisition unit 171 acquires setting information related to the transmission of the control signal used for measurement by the UE (the measurement related information). The setting information is information indicating the antenna port with which the control signal is transmitted in the CC and the antenna port with which the control signal is transmitted in the extension band.

In step S1023, from the setting information, the communication control unit 173 recognizes the antenna port with which the control signal is transmitted in the CC and the antenna port with which the control signal is transmitted in the extension band.

In step S1025, the communication control unit 173 reports, to the UE 200-4, the antenna port with which the control signal is transmitted in the CC and the antenna port with which the control signal is transmitted in the extension band, as the information indicating the position (a radio resource) at which the control signal is transmitted. Then, the process repeats step S1025.

(Communication Control Process on UE Side)

Figure 31:
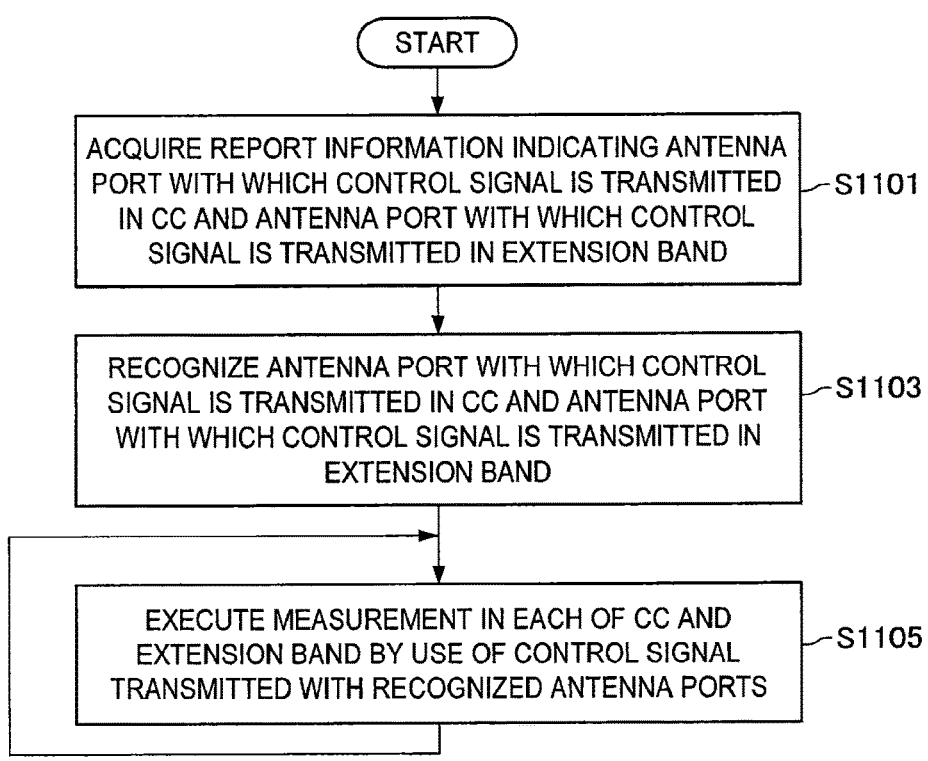
FIG. 31 is a flowchart illustrating an example of a schematic flow of a communication control process on a UE side according to the fourth embodiment.

FIG. 31 is a flowchart illustrating an example of a schematic flow of a communication control process on the UE 200-4 side according to the fourth embodiment.

In step S1101, the measurement control unit 293 acquires, as the information indicating the position (a radio resource) at which the control signal is transmitted, report information indicating the antenna port with which the control signal is transmitted in the CC and the antenna port with which the control signal is transmitted in the extension band.

In step S1103, the measurement control unit 293 recognizes the antenna port with which the control signal is transmitted in the CC and the antenna port with which the control signal is transmitted in the extension band.

In step S1105, the measurement control unit 293 controls the measurement unit 291 in a manner that measurement is executed in each of the CC and the extension band by use of the control signal transmitted with the recognized antenna ports. Then, the process repeats step S1105. Note that, in a case in which an event that triggers a report of the measurement result, the measurement result is reported.

6.4. Modification Example

Next, a modification example of the fourth embodiment will be described with reference to FIGS. 32 to 34.

In the modification example of the fourth embodiment, the control signal used for measurement is not transmitted in the extension band.

(Configuration of eNode B: Information Acquisition Unit 171)

As described above, the measurement related information is setting information related to the transmission of the control signal used for measurement by the UE.

In addition, as described above, for example, the measurement related information is setting information indicating the position (a radio resource) at which the control signal is transmitted. In particular, in the modification example of the fourth embodiment, as an example, the measurement related information is information indicating the band in which the control signal is transmitted. In this case, for example, the measurement related information is either information indicating the CC or information indicating the CC and the extension band.

(Configuration of eNode B: Communication Control Unit 173)

Control of Transmission of Control Signal

As described above, in particular, in the fourth embodiment, the measurement related control includes control of the transmission of the control signal in the extension band (hereinafter referred to as "control signal transmission control"). That is, the communication control unit 173 performs control of the transmission of the control signal in the extension band (i.e., the control signal transmission control). For example, on the basis of the measurement related information, the communication control unit 173 performs the control signal transmission control.

In addition, as described above, for example, the control signal transmission control includes control of the transmission of the control signal in a manner that the density of the control signal transmitted in the extension band is lower than the density of the control signal transmitted in the CC.

In particular, in the modification example of the fourth embodiment, the control signal transmission control includes control of the transmission of the control signal in a manner that the control signal is not transmitted in the extension band. That is, the communication control unit 173 controls the transmission of the control signal in a manner that the control signal is transmitted in the CC and the control signal is not transmitted in the extension band. For example, the communication control unit 173 causes the wireless communication unit 120 to transmit the control signal in this manner.

By control of the transmission of the control signal in this manner, measurement is not executed in the extension band. Thus, for example, it becomes possible to suppress the load of measurement by the UE in a case in which the extension band is also used. In addition, for example, an overhead due to the control signal used for measurement is suppressed.

Other Control

For example, the communication control unit 173 reports, to the UE 200-4, information indicating the band in which the control signal is transmitted. For example, the information is either information indicating the CC or information indicating the CC and the extension band. For example, the communication control unit 173 reports the above information to the UE 200-4 using system information. Note that the communication control unit 173 may report the above information to the UE 200-4 by any signaling (signaling in Connection Setup, RRC signaling, and the like).

(Configuration of UE: Measurement Unit 291)

As described above, the measurement unit 291 executes measurement in accordance with control by the measurement control unit 293.

In particular, in the modification example of the fourth embodiment, for example, the measurement unit 291 executes measurement in the band designated by the measurement control unit 293. Specifically, the measurement unit 291 executes measurement in the CC or executes measurement in the CC and the extension band.

(Configuration of UE: Measurement Control Unit 293)

As described above, the density of the control signal transmitted in the extension band is lower than the density of the control signal transmitted in the CC. In addition, the measurement control unit 293 controls the execution of measurement by the UE 200-4 in a manner that at least measurement is executed in the CC by use of the control signal transmitted in the CC.

In particular, in the modification example of the fourth embodiment, for example, the control signal is not transmitted in the extension band so that the control signal is not transmitted in the extension band. In this case, the measurement control unit 293 controls the execution of measurement by the UE 200-4 in a manner that measurement is executed in the CC by use of the control signal transmitted in the CC and measurement is not executed in the extension band. That is, the measurement control unit 293 controls the measurement unit 291 to execute such measurement.

Note that, for example, the eNode B 100-4 reports, to the UE 200-4, information indicating the band in which the control signal is transmitted. As an example, the information is information indicating the CC or information indicating the CC and the extension band. In addition, the measurement control unit 293 acquires the information via the wireless communication unit 220, and recognizes whether the band in which the control signal is transmitted is the CC or the CC and the extension band. Furthermore, the measurement control unit 293 designates the band in which the control signal is transmitted (the CC or the CC and the extension band) to cause the measurement unit 291 to execute measurement.

(Configuration of UE: Report Unit 295)

In particular, in a modification example of the fourth embodiment, the report unit 295 reports the measurement result in the CC in a case in which measurement is not executed in the extension band.

In a case in which measurement is executed in the extension band, the measurement result in the CC and the extension band is reported. In this case, each of the measurement result in the CC (the first measurement result) and the measurement result in the extension band (the second measurement result) may be reported, and the measurement result in the band including the CC and the extension band (the integrated measurement result) may be reported.

(Flow of Process: First Communication Control Process on eNode B Side)

Figure 32:
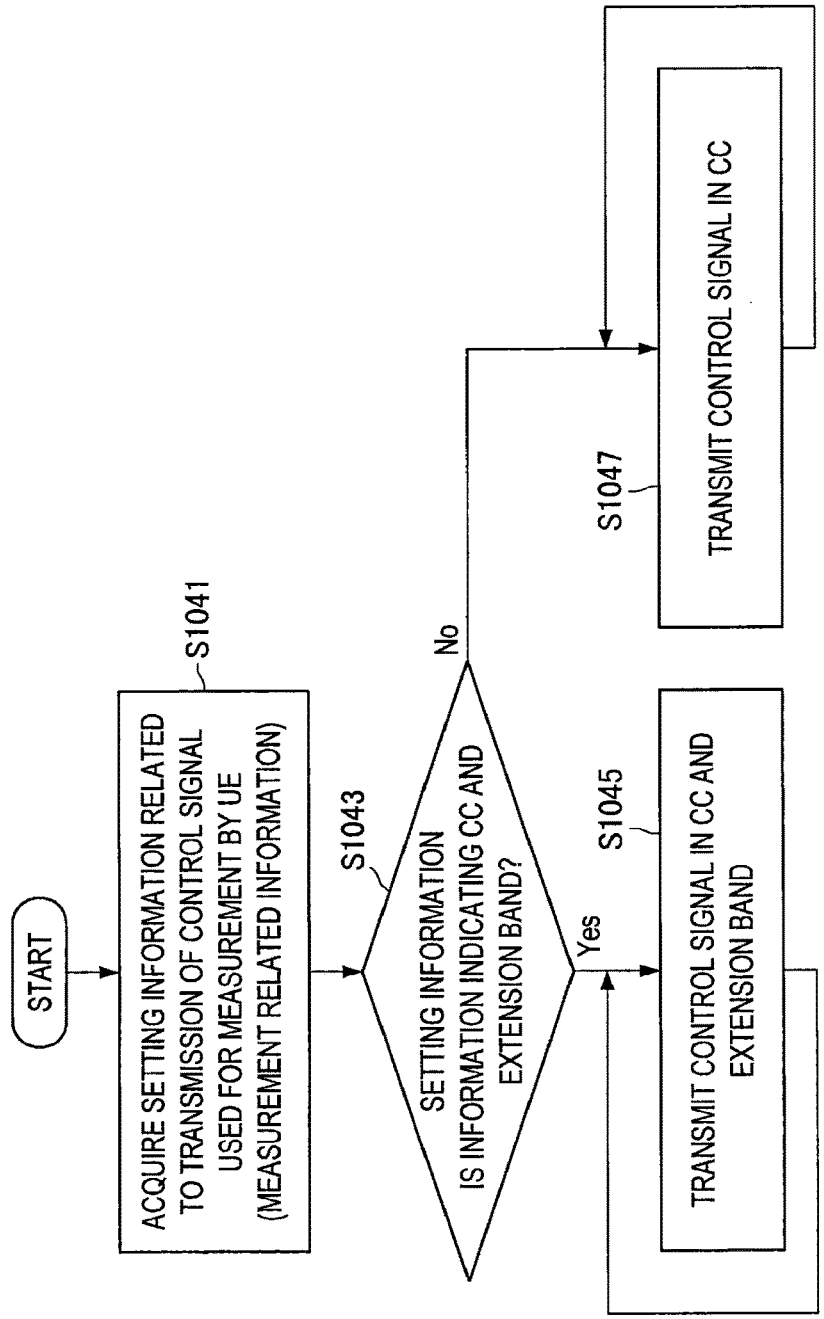
FIG. 32 is a flowchart illustrating an example of a schematic flow of a first communication control process on an eNode B side according to a modification example of the fourth embodiment.

FIG. 32 is a flowchart illustrating an example of a schematic flow of a first communication control process on the eNode B 100-4 side according to the modification example of the fourth embodiment. The first communication control process is a process related to the transmission of the control signal.

In step S1041, the information acquisition unit 171 acquires setting information related to the transmission of the control signal used for measurement by the UE (the measurement related information). The setting information is information indicating the band in which the control signal is transmitted. In this case, for example, the measurement related information is either information indicating the CC or information indicating the CC and the extension band.

In step S1043, the communication control unit 173 determines whether or not the measurement related information is information indicating the CC and the extension band. In a case in which the measurement related information is information indicating the CC and the extension band, the process proceeds to step S1045. Otherwise, the process proceeds to step S1047.

In step S1045, the communication control unit 173 causes the wireless communication unit 120 to transmit the control signal in the CC and the extension band. Then, the process repeats step S1045.

In step S1047, the communication control unit 173 causes the wireless communication unit 120 to transmit the control signal in the CC. Note that the communication control unit 173 does not cause the wireless communication unit 120 to transmit the control signal in the extension band. Then, the process repeats step S1047.

(Flow of Process: Second Communication Control Process on eNode B Side)

Figure 33:
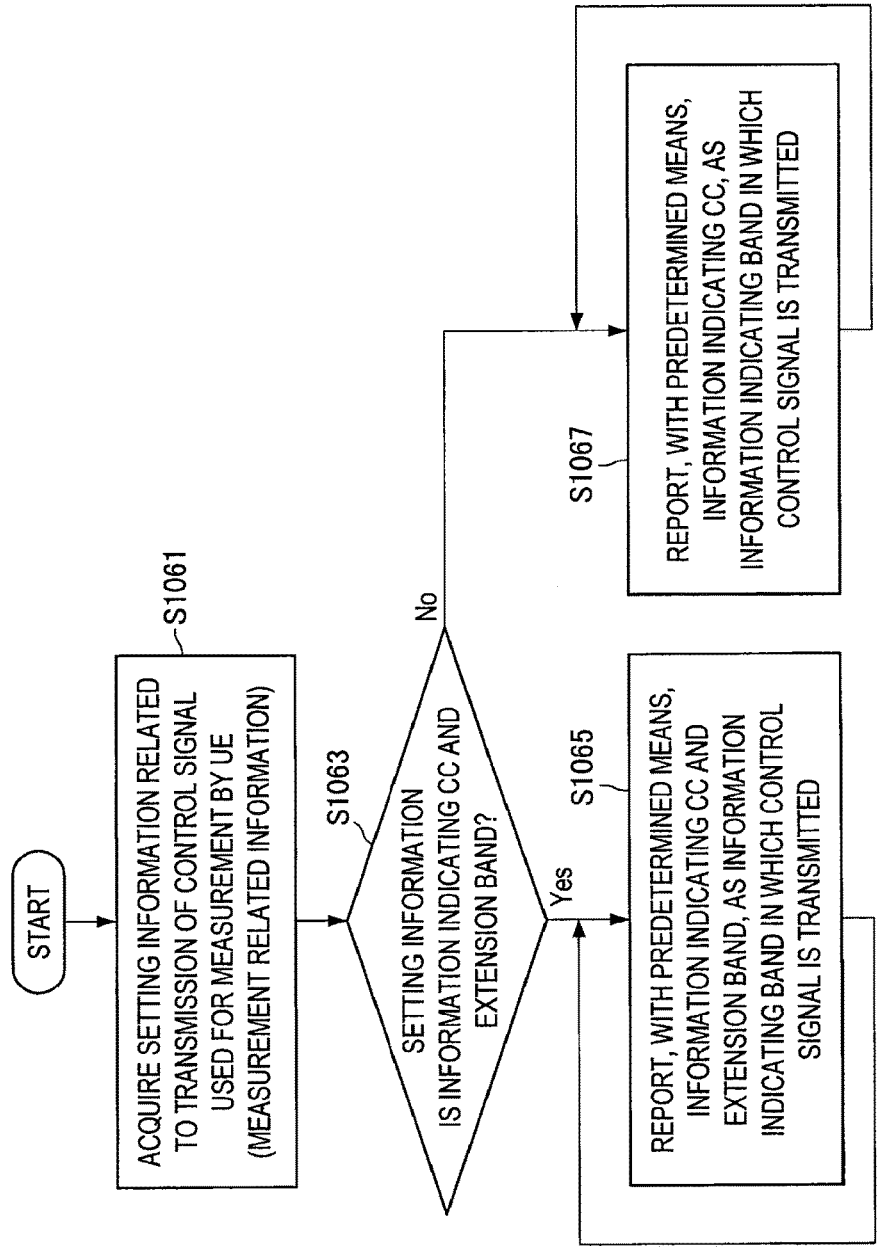
FIG. 33 is a flowchart illustrating an example of a schematic flow of a second communication control process on an eNode B side according to a modification example of the fourth embodiment.

FIG. 33 is a flowchart illustrating an example of a schematic flow of a second communication control process on the eNode B 100-4 side according to the modification example of the fourth embodiment. The second communication control process is a process related to a report of information indicating the band in which the control signal is transmitted.

In step S1061, the information acquisition unit 171 acquires setting information related to the transmission of the control signal used for measurement by the UE (the measurement related information). The setting information is information indicating the band in which the control signal is transmitted. In this case, for example, the measurement related information is either information indicating the CC or information indicating the CC and the extension band.

In step S1063, the communication control unit 173 determines whether or not the measurement related information is information indicating the CC and the extension band. When the measurement related information is information indicating the CC and the extension band, the process proceeds to step S1065. Otherwise, the process proceeds to step S1067.

In step S1065, the communication control unit 173 reports, with a predetermined means, information indicating the CC and the extension band, as information indicating the band in which the control signal is transmitted. Then, the process repeats step S1065.

In step S1067, the communication control unit 173 reports, with a predetermined means, information indicating the CC, as information indicating the band in which the control signal is transmitted. Then, the process repeats step S1067.

(Flow of Process: Communication Control Process on UE Side)

Figure 34:
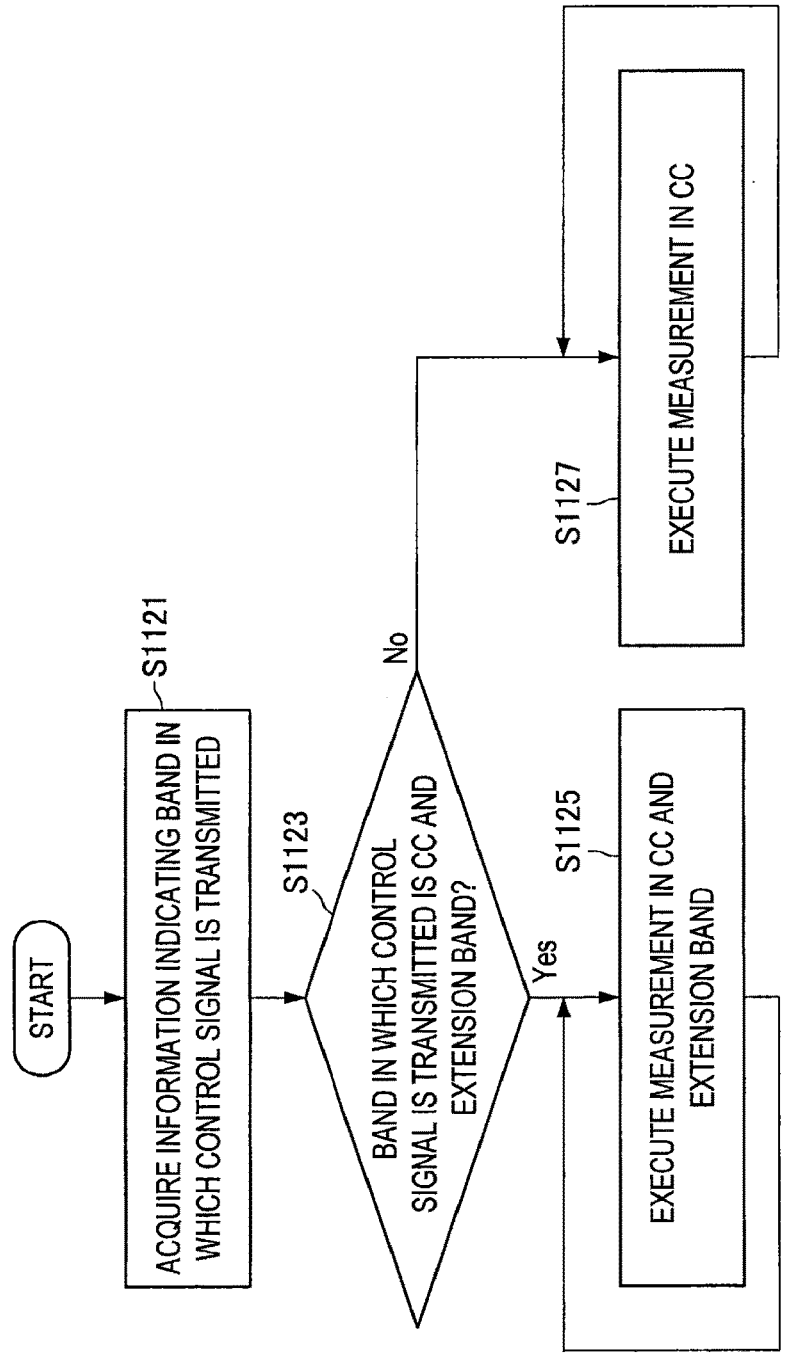
FIG. 34 is a flowchart illustrating an example of a schematic flow of a communication control process on a UE side according to a modification example of the fourth embodiment.

FIG. 34 is a flowchart illustrating an example of a schematic flow of a communication control process on the UE 200-4 side according to the modification example of the fourth embodiment.

In step S1121, the measurement control unit 293 acquires information indicating the band in which the control signal is transmitted. The information is information indicating the CC or information indicating the CC and the extension band.

In step S1123, the measurement control unit 293 determines whether or not the band in which the control signal is transmitted is the CC and the extension band. When the band in which the control signal is transmitted is the CC and the extension band, the process proceeds to step S1125. Otherwise, the process proceeds to step S1127.

In step S1125, the measurement control unit 293 controls the measurement unit 291 in a manner that measurement is executed in the CC and the extension band. Then, the process repeats step S1125.

In step S1127, the measurement control unit 293 controls the measurement unit 291 in a manner that measurement is executed in the CC. Then, the process repeats step S1127.

The fourth embodiment has been described above; however, the fourth embodiment is not limited to the above-described examples.

For example, the example has been described in which the density of the control signal transmitted in the extension band is different from the density of the control signal transmitted in the CC. In addition, as an example, the example has been described in which the number of antenna ports with which the control signal is transmitted in the extension band is smaller than the number of antenna ports with which the control signal is transmitted in the CC. However, the fourth embodiment is not limited to such examples. For example, the density of the control signal transmitted in the extension band with one antenna port may be lower than in the CC. The density may be the density in the frequency direction, the density in the time direction, or the density in the frequency direction and the time direction.

Furthermore, for example, the example has been described in which the density of the control signal transmitted in the extension band is lower than the density of the control signal transmitted in the CC; however, the fourth embodiment is not limited to this example. For example, the transmission of the control signal may be controlled in a manner that the density of the control signal transmitted in the extension band is higher than the density of the control signal transmitted in the CC. Thus, it becomes possible to increase the number of control signals in the extension band with a narrower bandwidth, resulting in obtaining a more reliable measurement result in a shorter time.

7. Application Example

The technology related to the present disclosure can be applied to various products. For example, the eNodeB 100 may be realized as one kind of eNodeB such as a macro eNodeB or a small eNodeB. The small eNodeB may be an eNodeB that covers a smaller cell, such as a pico eNodeB, a micro eNodeB, or a home (femto) eNodeB, than a macro cell. The eNodeB 100 may include a main body (also referred to as a base station device) controlling wireless communication and at least one remote radio head (RRH) disposed at a different location from the main body. The various kinds of terminals described below may perform a base station function temporarily or semi-permanently to operate as the eNodeB 100.

The UE 200 may be realized as, for example, a mobile terminal such as a smartphone, a tablet personal computer (PC), a notebook PC, a portable game console, a portable/dongle-style mobile router, or a digital camera, or as an in-vehicle terminal such as a car navigation device. In addition, the UE 200 may also be realized as a terminal that conducts machine-to-machine (M2M) communication (also called a machine-type communication (MTC) terminal). Furthermore, at least one part of structural elements of the UE 200 may be realized as a module mounted onboard these terminals (for example, an integrated circuit module configured on a single die).

7.1. Application Example of eNodeB

First Application Example

Figure 35:
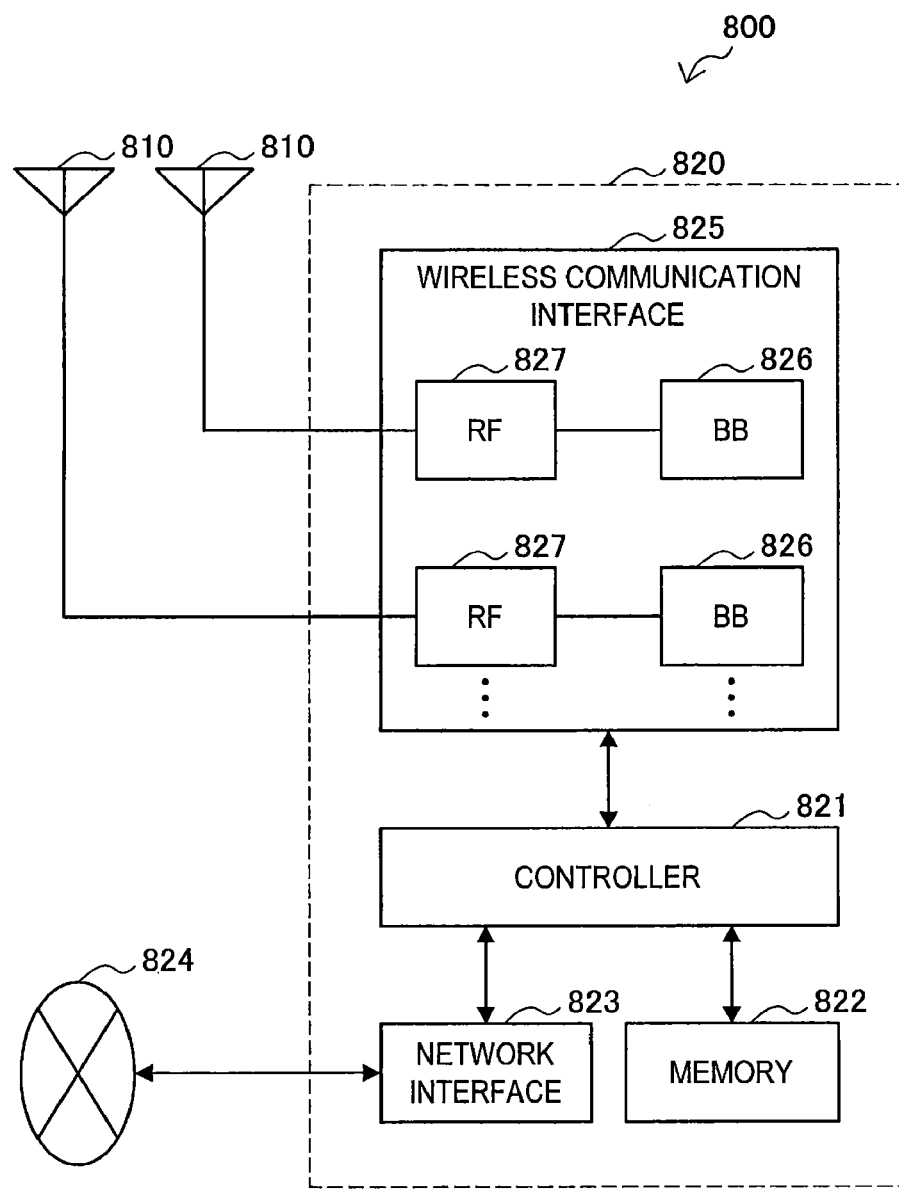
FIG. 35 is a block diagram illustrating a first example of a schematic configuration of an eNB.

FIG. 35 is a block diagram illustrating a first example of a schematic configuration of an eNode B to which the technology according to the present disclosure may be applied. An eNode B 800 includes one or more antennas 810, and a base station device 820. The respective antennas 810 and the base station device 820 may be connected to each other via an RF cable.

Each antenna 810 includes a single or a plurality of antenna elements (for example, a plurality of antenna elements constituting a MIMO antenna), and is used by the base station device 820 to transmit and receive radio signals. The eNode B 800 may include a plurality of antennas 810 as illustrated in FIG. 35, and the plurality of antennas 810 may respectively correspond to a plurality of frequency bands used by the eNode B 800, for example. Note that although FIG. 35 illustrates an example of the eNode B 800 including a plurality of antennas 810, the eNode B 800 may also include a single antenna 810.

The base station device 820 is equipped with a controller 821, memory 822, a network interface 823, and a wireless communication interface 825.

The controller 821 may be a CPU or DSP, for example, and causes various higher-layer functions of the base station device 820 to operate. For example, the controller 821 generates a data packet from data inside a signal processed by the wireless communication interface 825, and forwards the generated packet via the network interface 823. The controller 821 may also generate a bundled packet by bundling data from a plurality of baseband processors, and forward the generated bundled packet. In addition, the controller 821 may also include logical functions that execute controls such as radio resource control (RRC), radio bearer control, mobility management, admission control, or scheduling. Also, such controls may also be executed in coordination with a nearby eNode B or core network node. The memory 822 includes RAM and ROM, and stores programs executed by the controller 821 as well as various control data (such as a terminal list, transmit power data, and scheduling data, for example).

The network interface 823 is a communication interface for connecting the base station device 820 to a core network 824. The controller 821 may also communicate with a core network node or another eNode B via the network interface 823. In this case, the eNode B 800 and the core network node or other eNode B may be connected to each other by a logical interface (for example, the Si interface or the X2 interface). The network interface 823 may also be a wired communication interface, or a wireless communication interface for wireless backhaul. In the case in which the network interface 823 is a wireless communication interface, the network interface 823 may use a higher frequency band for wireless communication than the frequency band used by the wireless communication interface 825.

The wireless communication interface 825 supports a cellular communication scheme such as Long Term Evolution (LTE) or LTE-Advanced, and provides a radio connection to a terminal positioned inside the cell of the eNode B 800 via an antenna 810. Typically, the wireless communication interface 825 may include a baseband (BB) processor 826, an RF circuit 827, and the like. The BB processor 826 may conduct processes such as encoding/decoding, modulation/demodulation, and multiplexing/demultiplexing, for example, and executes various signal processing in respective layers (for example, L1, Medium Access Control (MAC), Radio Link Control (RLC), and Packet Data Convergence Protocol (PDCP)). The BB processor 826 may also include some or all of the logical functions discussed earlier instead of the controller 821. The BB processor 826 may be a module including memory that stores a communication control program, a processor that executes such a program, and related circuits. The functions of the BB processor 826 may also be modifiable by updating the program. Also, the module may be a card or a blade inserted into a slot of the base station device 820, or a chip mounted onboard the card or the blade. Meanwhile, the RF circuit 827 may include components such as a mixer, a filter, and an amp, and transmits or receives a radio signal via an antenna 810.

The wireless communication interface 825 may also include a plurality of BB processors 826 as illustrated in FIG. 35, and the plurality of BB processors 826 may respectively correspond to a plurality of frequency bands used by the eNode B 800, for example. In addition, the wireless communication interface 825 may also include a plurality of RF circuits 827 as illustrated in FIG. 35, and the plurality of RF circuits 827 may respectively correspond to a plurality of antenna elements, for example. Note that although FIG. 35 illustrates an example of the wireless communication interface 825 including a plurality of BB processors 826 and a plurality of RF circuits 827, the wireless communication interface 825 may also include a single BB processor 826 or a single RF circuit 827.

In the eNode B 800 illustrated in FIG. 35, the information acquisition unit 151 and the communication control unit 153 described with reference to FIG. 6 may be implemented in the wireless communication interface 825. Alternatively, at least a part of these components may be implemented in the controller 821. As one example, the eNode B 800 is equipped with a module including a part (for example, the BB processor 826) or all of the wireless communication interface 825 and/or the controller 821, and the information acquisition unit 151 and the communication control unit 153 may be implemented in the module. In this case, the above module may store a program for causing the processor to function as the information acquisition unit 151 and the communication control unit 153 (in other words, a program for causing the processor to execute the operation of the information acquisition unit 151 and the communication control unit 153) and execute the program. As another example, a program for causing the processor to function as the information acquisition unit 151 and the communication control unit 153 is installed in the eNode B 800, and the wireless communication interface 825 (for example, the BB processor 826) and/or the controller 821 may execute the program. As described above, the eNode B 800, the base station device 820, or the above module may be provided as the device including the information acquisition unit 151 and the communication control unit 153, and the program for causing the processor to function as the information acquisition unit 151 and the communication control unit 153 may be provided. Also, a readable storage medium storing the above program may be provided. With respect to these points, the information acquisition unit 161 and the communication control unit 163 described with reference to FIG. 14, the information acquisition unit 171 and the communication control unit 173 described with reference to FIG. 26, are the same as the information acquisition unit 151 and the communication control unit 153.

Also, in the eNode B 800 illustrated in FIG. 35, the wireless communication unit 120 described with reference to FIG. 6 may be implemented in the wireless communication interface 825 (for example, the RF circuit 827). Also, the antenna unit 110 described with reference to FIG. 6 may be implemented in the antenna 810. Also, the network communication unit 130 described with reference to FIG. 6 may be implemented in the controller 821 and/or the network interface 823.

Second Application Example

Figure 36:
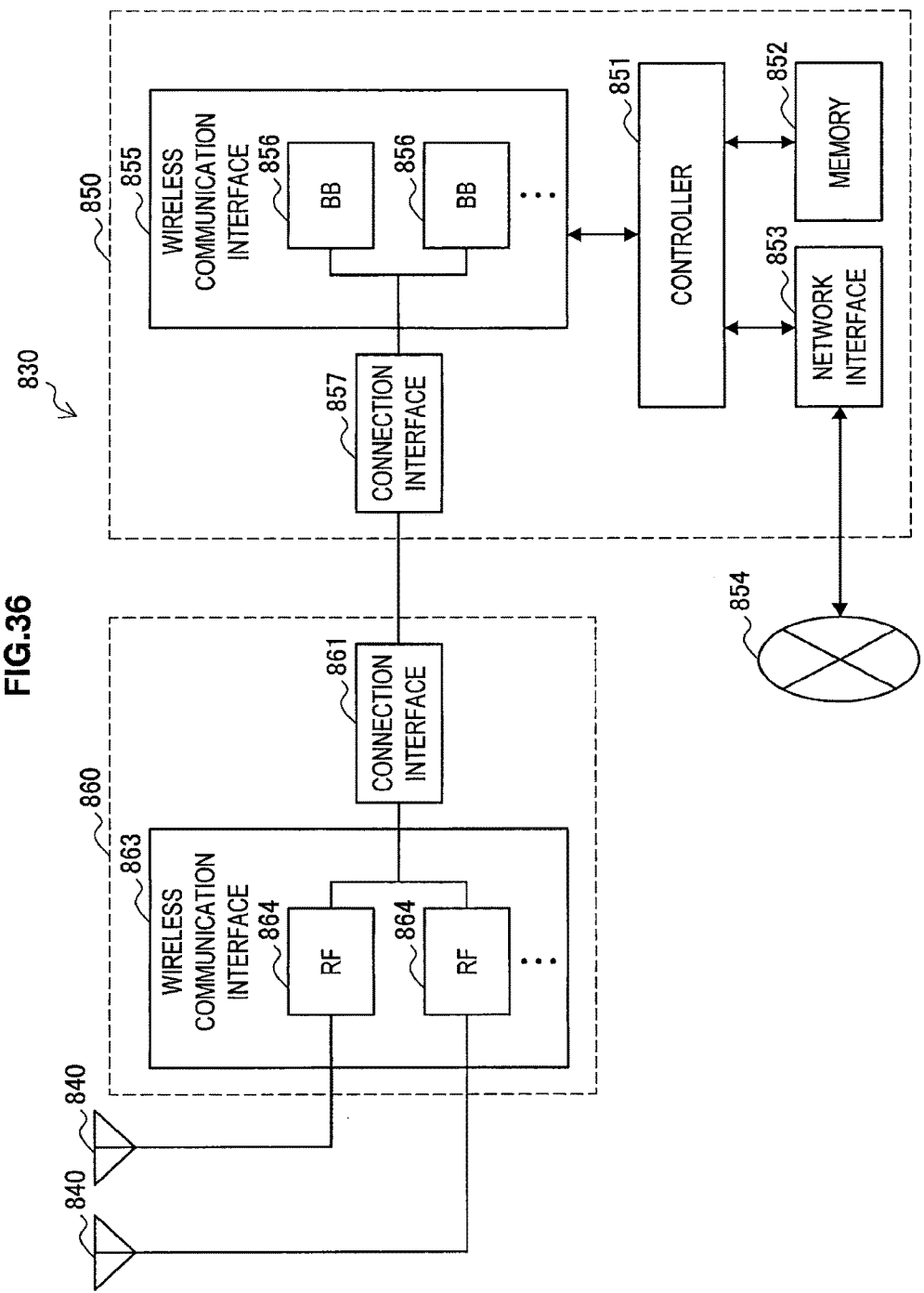
FIG. 36 is a block diagram illustrating a second example of a schematic configuration of an eNB.

FIG. 36 is a block diagram illustrating a second example of a schematic configuration of an eNode B to which the technology according to the present disclosure may be applied. An eNode B 830 includes one or more antennas 840, a base station device 850, and an RRH 860. The respective antennas 840 and the RRH 860 may be connected to each other via an RF cable. Also, the base station device 850 and the RRH 860 may be connected to each other by a high-speed link such as an optical fiber cable.

Each antenna 840 includes a single or a plurality of antenna elements (for example, a plurality of antenna elements constituting a MIMO antenna), and is used by the RRH 860 to transmit and receive radio signals. The eNode B 830 may include a plurality of antennas 840 as illustrated in FIG. 36, and the plurality of antennas 840 may respectively correspond to a plurality of frequency bands used by the eNode B 830, for example. Note that although FIG. 36 illustrates an example of the eNode B 830 including a plurality of antennas 840, the eNode B 830 may also include a single antenna 840.

The base station device 850 is equipped with a controller 851, memory 852, a network interface 853, a wireless communication interface 855, and a connection interface 857. The controller 851, the memory 852, and the network interface 853 are similar to the controller 821, the memory 822, and the network interface 823 described with reference to FIG. 35.

The wireless communication interface 855 supports a cellular communication scheme such as LTE or LTE-Advanced, and provides a radio connection to a terminal positioned inside a sector corresponding to the RRH 860 via the RRH 860 and an antenna 840. Typically, the wireless communication interface 855 may include a BB processor 856 and the like. The BB processor 856 is similar to the BB processor 826 described with reference to FIG. 35, except for being connected to an RF circuit 864 of the RRH 860 via the connection interface 857. The wireless communication interface 855 may also include a plurality of BB processors 856 as illustrated in FIG. 36, and the plurality of BB processors 856 may respectively correspond to a plurality of frequency bands used by the eNode B 830, for example. Note that although FIG. 36 illustrates an example of the wireless communication interface 855 including a plurality of BB processors 856, the wireless communication interface 855 may also include a single BB processor 856.

The connection interface 857 is an interface for connecting the base station device 850 (wireless communication interface 855) to the RRH 860. The connection interface 857 may also be a communication module for communication on the high-speed link connecting the base station device 850 (wireless communication interface 855) and the RRH 860.

In addition, the RRH 860 is equipped with a connection interface 861 and a wireless communication interface 863.

The connection interface 861 is an interface for connecting the RRH 860 (wireless communication interface 863) to the base station device 850. The connection interface 861 may also be a communication module for communication on the high-speed link.

The wireless communication interface 863 transmits and receives a radio signal via an antenna 840. Typically, the wireless communication interface 863 may include an RF circuit 864. The RF circuit 864 may include components such as a mixer, a filter, and an amp, and transmits or receives a radio signal via an antenna 840. The wireless communication interface 863 may also include a plurality of RF circuits 864 as illustrated in FIG. 36, and the plurality of RF circuits 864 may respectively correspond to a plurality of antenna elements, for example. Note that although FIG. 36 illustrates an example of the wireless communication interface 863 including a plurality of RF circuits 864, the wireless communication interface 863 may also include a single RF circuit 864.

In the eNode B 830 illustrated in FIG. 36, the information acquisition unit 151 and the communication control unit 153 described with reference to FIG. 6 may be implemented in the wireless communication interface 855 and/or the wireless communication interface 863. Alternatively, at least a part of these components may be implemented in the controller 851. As one example, the eNode B 830 is equipped with a module including a part (for example, the BB processor 856) or all of the wireless communication interface 855 and/or the controller 851, and the information acquisition unit 151 and the communication control unit 153 may be implemented in the module. In this case, the above module may store a program for causing the processor to function as the information acquisition unit 151 and the communication control unit 153 (in other words, a program for causing the processor to execute the operation of the information acquisition unit 151 and the communication control unit 153) and execute the program. As another example, a program for causing the processor to function as the information acquisition unit 151 and the communication control unit 153 is installed in the eNode B 830, and the wireless communication interface 855 (for example, the BB processor 856) and/or the controller 851 may execute the program. As described above, the eNode B 830, the base station device 850, or the above module may be provided as the device including the information acquisition unit 151 and the communication control unit 153, and the program for causing the processor to function as the information acquisition unit 151 and the communication control unit 153 may be provided. Also, a readable storage medium storing the above program may be provided. With respect to these points, the information acquisition unit 161 and the communication control unit 163 described with reference to FIG. 14, and the information acquisition unit 171 and the communication control unit 173 described with reference to FIG. 26 are the same as the information acquisition unit 151 and the communication control unit 153.

Also, in the eNode B 830 illustrated in FIG. 36, for example, the wireless communication unit 120 described with reference to FIG. 6 may be implemented in the wireless communication interface 863 (for example, the RF circuit 864). Also, the antenna unit 110 described with reference to FIG. 6 may be implemented in the antenna 840. Also, the network communication unit 130 described with reference to FIG. 6 may be implemented in the controller 851 and/or the network interface 853.

7.2. Application Example of UE

First Application Example

Figure 37:
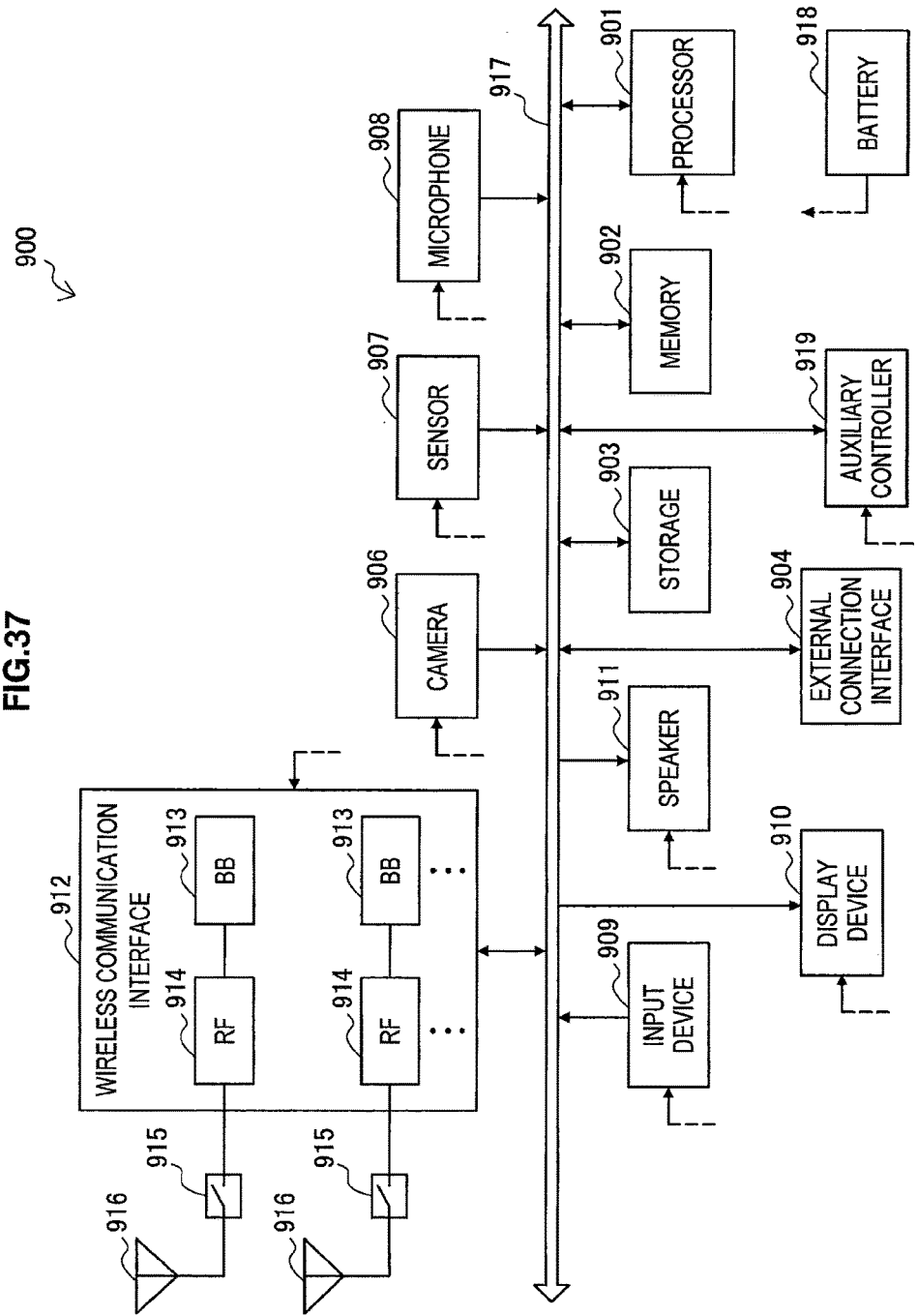
FIG. 37 is a block diagram illustrating an example of a schematic configuration of a smartphone.

FIG. 37 is a block diagram illustrating an example of a schematic configuration of a smartphone 900 to which the technology according to the present disclosure may be applied. The smartphone 900 is equipped with a processor 901, memory 902, storage 903, an external connection interface 904, a camera 906, a sensor 907, a microphone 908, an input device 909, a display device 910, a speaker 911, a wireless communication interface 912, one or more antenna switches 915, one or more antennas 916, a bus 917, a battery 918, and an auxiliary controller 919.

The processor 901 may be a CPU or system-on-a-chip (SoC), for example, and controls functions in the application layer and other layers of the smartphone 900. The memory 902 includes RAM and ROM, and stores programs executed by the processor 901 as well as data. The storage 903 may include a storage medium such as semiconductor memory or a hard disk. The external connection interface 904 is an interface for connecting an externally attached device, such as a memory card or Universal Serial Bus (USB) device, to the smartphone 900.

The camera 906 includes an image sensor such as a charge-coupled device (CCD) or complementary metal-oxide-semiconductor (CMOS) sensor, and generates a captured image. The sensor 907 may include a sensor group including a positioning sensor, a gyro sensor, a geomagnetic sensor, and an acceleration sensor, for example. The microphone 908 converts audio input into the smartphone 900 into an audio signal. The input device 909 includes devices such as a touch sensor that detects touches on a screen of the display device 910, a keypad, a keyboard, buttons, or switches, and receives operations or information input from a user. The display device 910 includes a screen such as a liquid crystal display (LCD) or an organic light-emitting diode (OLED) display, and displays an output image of the smartphone 900. The speaker 911 converts an audio signal output from the smartphone 900 into audio.

The wireless communication interface 912 supports a cellular communication scheme such as LTE or LTE-Advanced, and executes wireless communication. Typically, the wireless communication interface 912 may include a BB processor 913, an RF circuit 914, and the like. The BB processor 913 may conduct processes such as encoding/decoding, modulation/demodulation, and multiplexing/de-multiplexing, for example, and executes various signal processing for wireless communication. Meanwhile, the RF circuit 914 may include components such as a mixer, a filter, and an amp, and transmits or receives a radio signal via an antenna 916. The wireless communication interface 912 may also be a one-chip module integrating the BB processor 913 and the RF circuit 914. The wireless communication interface 912 may also include a plurality of BB processors 913 and a plurality of RF circuits 914 as illustrated in FIG. 37. Note that although FIG. 37 illustrates an example of the wireless communication interface 912 including a plurality of BB processors 913 and a plurality of RF circuits 914, the wireless communication interface 912 may also include a single BB processor 913 or a single RF circuit 914.

Furthermore, in addition to a cellular communication scheme, the wireless communication interface 912 may also support other types of wireless communication schemes such as a short-range wireless communication scheme, a near field wireless communication scheme, or a wireless local area network (LAN) scheme. In this case, a BB processor 913 and an RF circuit 914 may be included for each wireless communication scheme.

Each antenna switch 915 switches the destination of an antenna 916 among a plurality of circuits included in the wireless communication interface 912 (for example, circuits for different wireless communication schemes).

Each antenna 916 includes a single or a plurality of antenna elements (for example, a plurality of antenna elements constituting a MIMO antenna), and is used by the wireless communication interface 912 to transmit and receive radio signals. The smartphone 900 may also include a plurality of antennas 916 as illustrated in FIG. 37. Note that although FIG. 37 illustrates an example of the smartphone 900 including a plurality of antennas 916, the smartphone 900 may also include a single antenna 916.

Furthermore, the smartphone 900 may also be equipped with an antenna 916 for each wireless communication scheme. In this case, the antenna switch 915 may be omitted from the configuration of the smartphone 900.

The bus 917 interconnects the processor 901, the memory 902, the storage 903, the external connection interface 904, the camera 906, the sensor 907, the microphone 908, the input device 909, the display device 910, the speaker 911, the wireless communication interface 912, and the auxiliary controller 919. The battery 918 supplies electric power to the respective blocks of the smartphone 900 illustrated in FIG. 37 via power supply lines partially illustrated with dashed lines in the drawing. The auxiliary controller 919 causes minimal functions of the smartphone 900 to operate while in a sleep mode, for example.

In the smartphone 900 illustrated in FIG. 37, one or more structural elements (for example, the band recognition unit 261, the measurement unit 263, the measurement control unit 265, and/or the report unit 267) included in the processing unit 260 described with reference to FIG. 7 may be implemented in the wireless communication interface 912. Alternatively, at least part of the one or more structural elements may be implemented in the processor 901 or the auxiliary controller 919. As an example, the smartphone 900 may mount a module including part (for example, the BB processor 913) or all of the wireless communication interface 912, the processor 901, and/or the auxiliary controller 919, and the one or more structural elements may be implemented in the module. In this case, the module may store a program for causing a processor to function as the one or more structural elements (in other words, a program for causing a processor to execute the operations of the one or more structural elements), and may execute the program. As another example, a program for causing a processor to function as the one or more structural elements may be installed in the smartphone 900, and the wireless communication interface 912 (for example, the BB processor 913), the processor 901, and/or the auxiliary controller 919 may execute the program. In the above manner, the smartphone 900 or the module may be provided as a device including the one or more structural elements, and a program for causing a processor to function as the one or more structural elements may be provided. In addition, a readable storage medium having the program stored therein may be provided. These points of the one or more structural elements included in the processing unit 260 similarly apply to one or more structural elements (for example, the band recognition unit 261, the measurement unit 263, the measurement control unit 271, and/or the report unit 267) included in the processing unit 270 described with reference to FIG. 12, one or more structural elements (for example, the band recognition unit 261, the measuring unit 281, the measurement control unit 283, and/or the report unit 285) included in the processing unit 280 described with reference to FIG. 15, and one or more structural elements (for example, the band recognition unit 261, the measurement unit 291, the measurement control unit 293, and/or the report unit 295) included in the processing unit 290 described with reference to FIG. 28.

In the smartphone 900 illustrated in FIG. 37, the wireless communication unit 220 described with reference to FIG. 7 may be implemented in the wireless communication interface 912 (for example, the RF circuit 914). Also, the antenna unit 210 may also be implemented in the antenna 916.

Second Application Example

Figure 38:
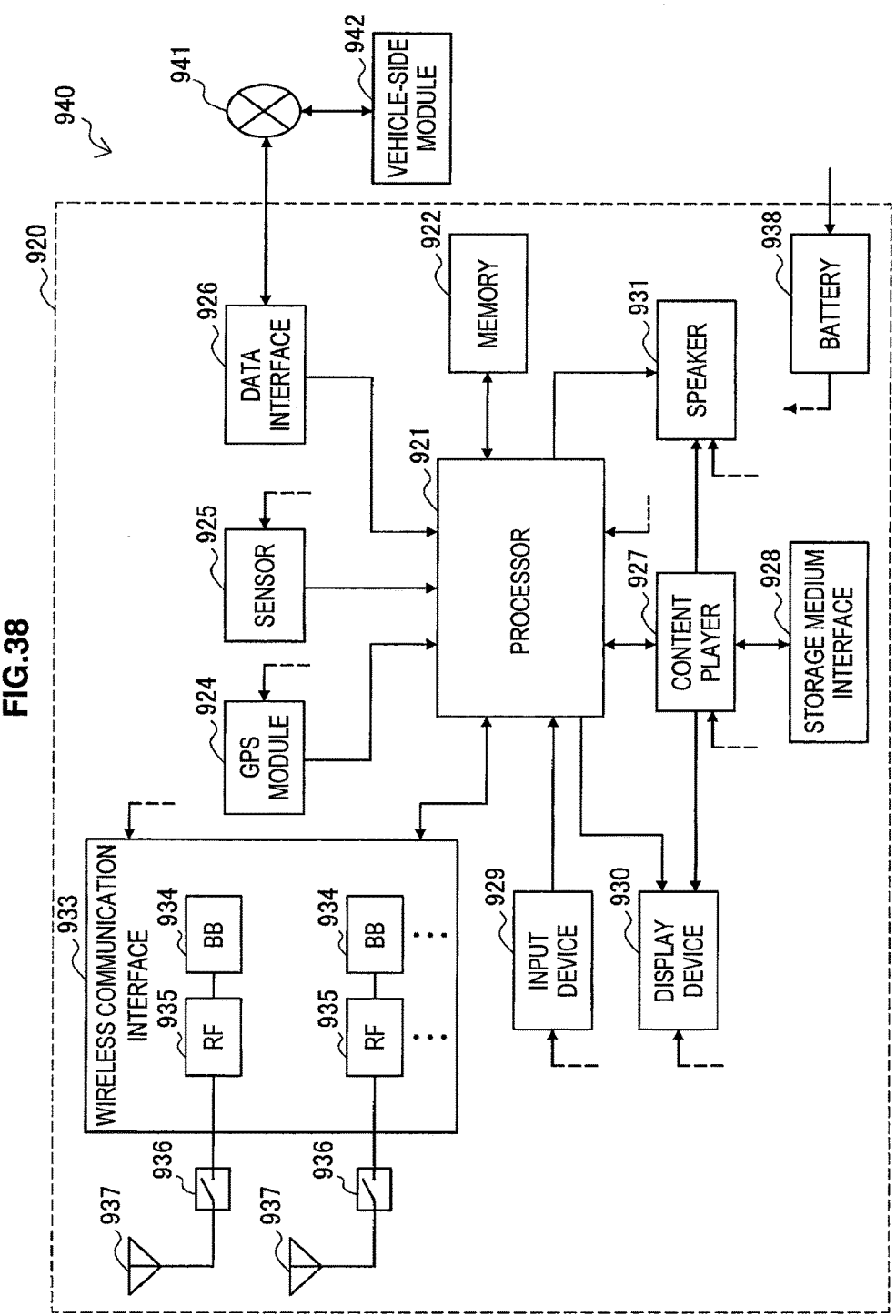
FIG. 38 is a block diagram illustrating an example of a schematic configuration of a car navigation device.

FIG. 38 is a block diagram illustrating an example of a schematic configuration of a car navigation device 920 to which the technology according to the present disclosure may be applied. The car navigation device 920 is equipped with a processor 921, memory 922, a Global Positioning System (GPS) module 924, a sensor 925, a data interface 926, a content player 927, a storage medium interface 928, an input device 929, a display device 930, a speaker 931, a wireless communication interface 933, one or more antenna switches 936, one or more antennas 937, and a battery 938.

The processor 921 may be a CPU or SoC, for example, and controls a car navigation function and other functions of the car navigation device 920. The memory 922 includes RAM and ROM, and stores programs executed by the processor 921 as well as data.

The GPS module 924 measures the position (for example, the latitude, longitude, and altitude) of the car navigation device 920 by using GPS signals received from GPS satellites. The sensor 925 may include a sensor group including a gyro sensor, a geomagnetic sensor, and a barometric pressure sensor, for example. The data interface 926 is connected to an in-vehicle network 941 via a port not illustrated in the drawing, and acquires data generated on the vehicle side, such as vehicle speed data.

The content player 927 plays content stored on a storage medium (for example, a CD or DVD) inserted into the storage medium interface 928. The input device 929 includes devices such as a touch sensor that detects touches on a screen of the display device 930, buttons, or switches, and receives operations or information input from a user. The display device 930 includes a screen such as an LCD or OLED display, and displays a navigation function or an image of played-back content. The speaker 931 outputs audio of a navigation function or played-back content.

The wireless communication interface 933 supports a cellular communication scheme such as LTE or LTE-Advanced, and executes wireless communication. Typically, the wireless communication interface 933 may include a BB processor 934, an RF circuit 935, and the like. The BB processor 934 may conduct processes such as encoding/decoding, modulation/demodulation, and multiplexing/demultiplexing, for example, and executes various signal processing for wireless communication. Meanwhile, the RF circuit 935 may include components such as a mixer, a filter, and an amp, and transmits or receives a radio signal via an antenna 937. The wireless communication interface 933 may also be a one-chip module integrating the BB processor 934 and the RF circuit 935. The wireless communication interface 933 may also include a plurality of BB processors 934 and a plurality of RF circuits 935 as illustrated in FIG. 38. Note that although FIG. 38 illustrates an example of the wireless communication interface 933 including a plurality of BB processors 934 and a plurality of RF circuits 935, the wireless communication interface 933 may also include a single BB processor 934 or a single RF circuit 935.

Furthermore, in addition to a cellular communication scheme, the wireless communication interface 933 may also support other types of wireless communication schemes such as a short-range wireless communication scheme, a near field wireless communication scheme, or a wireless LAN scheme. In this case, a BB processor 934 and an RF circuit 935 may be included for each wireless communication scheme.

Each antenna switch 936 switches the destination of an antenna 937 among a plurality of circuits included in the wireless communication interface 933 (for example, circuits for different wireless communication schemes).

Each antenna 937 includes a single or a plurality of antenna elements (for example, a plurality of antenna elements constituting a MEM antenna), and is used by the wireless communication interface 933 to transmit and receive radio signals. The car navigation device 920 may also include a plurality of antennas 937 as illustrated in FIG. 38. Note that although FIG. 38 illustrates an example of the car navigation device 920 including a plurality of antennas 937, the car navigation device 920 may also include a single antenna 937.

Furthermore, the car navigation device 920 may also be equipped with an antenna 937 for each wireless communication scheme. In this case, the antenna switch 936 may be omitted from the configuration of the car navigation device 920.

The battery 938 supplies electric power to the respective blocks of the car navigation device 920 illustrated in FIG. 38 via power supply lines partially illustrated with dashed lines in the drawing. Also, the battery 938 stores electric power supplied from the vehicle.

In the car navigation device 920 illustrated in FIG. 38, one or more structural elements (for example, the band recognition unit 261, the measurement unit 263, the measurement control unit 265, and/or the report unit 267) included in the processing unit 260 described with reference to FIG. 7 may be implemented in the wireless communication interface 933. Alternatively, at least part of the one or more structural elements may be implemented in the processor 921. As an example, the car navigation device 920 may mount a module including part (for example, the BB processor 934) or all of the wireless communication interface 933, and/or the processor 921, and the one or more structural elements may be implemented in the module. In this case, the module may store a program for causing a processor to function as the one or more structural elements (in other words, a program for causing a processor to execute the operations of the one or more structural elements), and may execute the program. As another example, a program for causing a processor to function as the one or more structural elements may be installed in the car navigation device 920, and the wireless communication interface 933 (for example, the BB processor 934) and/or the processor 921 may execute the program. In the above manner, the car navigation device 920 or the module may be provided as a device including the one or more structural elements, and a program for causing a processor to function as the one or more structural elements may be provided. In addition, a readable storage medium having the program stored therein may be provided. These points of the one or more structural elements included in the processing unit 260 similarly apply to one or more structural elements (for example, the band recognition unit 261, the measurement unit 263, the measurement control unit 271, and/or the report unit 267) included in the processing unit 270 described with reference to FIG. 12, one or more structural elements (for example, the band recognition unit 261, the measuring unit 281, the measurement control unit 283, and/or the report unit 285) included in the processing unit 280 described with reference to FIG. 15, and one or more structural elements (for example, the band recognition unit 261, the measurement unit 291, the measurement control unit 293, and/or the report unit 295) included in the processing unit 290 described with reference to FIG. 28.

In the car navigation device 920 illustrated in FIG. 38, the wireless communication unit 220 described with reference to FIG. 7 may be implemented in the wireless communication interface 933 (for example, the RF circuit 935). Also, the antenna unit 210 may also be implemented in the antenna 937.

In addition, the technology according to the present disclosure may also be realized as an in-vehicle system (or vehicle) 940 that includes one or more blocks of the car navigation device 920 discussed above, the in-vehicle network 941, and a vehicle-side module 942. That is, the in-vehicle system (or the vehicle) 940 may be provided as the device including the one or more structural elements included in the processing unit 260 (or the processing unit 270, the processing unit 280, or the processing unit 290). The vehicle-side module 942 generates vehicle-side data such as the vehicle speed, number of engine revolutions, or malfunction information, and outputs the generated data to the in-vehicle network 941.

8. Conclusion

The eNode B 100, the UE 200, and various communication control processes according to embodiments of the present disclosure have been described above with reference to FIGS. 5 to 38. According to embodiments of the present disclosure, the measurement related information related to the execution of measurement by the UE in the extension band, which is other than the component carrier (the band of the predetermined bandwidth) in the frequency bands allocated to the service provider is acquired. In addition, on the basis of the measurement related information, control related to measurement by the UE in the extension band (that is, the measurement related control) is performed.

Accordingly, in a case in which the allocated frequency bands are utilized (that is, in a case in which the extension band is also used), the load of measurement by the terminal device can be suppressed.

First Embodiment

For example, according to the first embodiment, the measurement related information is information related to the execution and non-execution of measurement by the UE in the extension band. In addition, the measurement related control includes control of the execution of measurement by the UE in the extension band. Specifically, for example, the measurement related control includes instructing the UE 200-1 to execute measurement or not to execute measurement in the extension band.

Thus, for example, in a case in which the operator determines that the measurement in the extension band is unnecessary, the UE 200 may omit the measurement in the extension band. Accordingly, in a case in which the allocated frequency bands are utilized (that is, in a case in which the extension band is also used), the load of measurement by the UE 200 can be suppressed.

According to the modification example of the first embodiment, the measurement related control includes instructing the UE 200 to execute measurement or not to execute measurement in the extension band in a manner that the UE 200 using the frequency bands for communication does not execute measurement in the extension band.

Thus, it becomes possible to suppress the load of measurement by the UE. More specifically, for example, the frequency of handover (inter-cell handover) in the same frequency band is higher than the frequency of handover between different frequency bands. Thus, the load of measurement for handover in the same frequency band (that is, measurement in the frequency band used by the UE) is larger than the load of measurement for handover between different frequency bands (that is, measurement in the frequency bands not used by the UE). Accordingly, in particular, by reducing measurement in the frequency band used by the UE, it becomes possible to suppress the load of measurement by the UE more effectively.

Note that the result of measurement in the frequency band that is already used is continuously acquired, and thus, the measurement in the CC is considered to be sufficient in many cases without executing measurement in the extension band. On the other hand, since the bandwidth of the frequency band that is not used may be different from the bandwidth of the frequency band used (the CC and/or the extension band may be different in some cases), it would be desirable to obtain a result of measurement of the band including the extension band in addition to the CC. Therefore, as described above, it would be more desirable to omit measurement in the extension band in the frequency band used by the UE, than to omit measurement in the extension band in the frequency band not used by the UE.

Second Embodiment

For example, according to the second embodiment, in a case in which the UE 200-2 is in an idle state for a radio resource, the execution of measurement is controlled in a manner that measurement is not executed in the extension band, which is other than the CC (the band of the predetermined bandwidth) in the frequency bands allocated to the service provider.

Thus, it becomes possible to suppress the load of measurement by the UE in a case in which the allocated frequency bands are utilized (that is, in a case in which the extension band is also used). More specifically, for example, there is a demand of suppression of power consumption by the UE as much as possible in a case in which the UE is in the RRC_Idle state, in particular. Accordingly, by omitting measurement in a case of the RRC_Idle state in this manner, the load of measurement by the UE in the RRC_Idle state can be suppressed, resulting in suppression of power consumption. In addition, for example, information in a paging channel is considered to be transmitted in the CC (the band of the predetermined bandwidth), not in the extension band. In this case, since the quality in the CC is more important than the quality in the extension band, by omitting measurement in a case of the RRC_Idle state, useless measurement can be reduced.

Third Embodiment

According to the third embodiment, each of the first measurement result being a result of measurement by the UE 200-3 in the CC and the second measurement result being a result of measurement by the UE 200-3 in the extension band is acquired.

Accordingly, it becomes possible to control wireless communication in consideration of the communication quality in each of the CC (the band of the predetermined bandwidth) and the extension band. As an example, it becomes possible to appropriately determine whether or not to cause the UE 200 to perform wireless communication in the extension band.

For example, the first measurement result is a result obtained by measurement executed over a first period in the CC, and the second measurement result is a result obtained by measurement executed over a second period in the extension band. In addition, the second period is longer than the first period.

Such measurement periods make it possible to obtain a highly reliable measurement result also in the extension band, which has a narrower bandwidth (that is, the amount of control signal that can be used for measurement is smaller) than the CC. For example, it becomes possible to obtain a more reliable RSRP and/or RSRQ by averaging the reception power of more control signals (for example, the CRS and/or the CSI-RS).

For example, the condition for the report of the second measurement result is different from the condition for the report of the first measurement result.

Thus, for example, it becomes possible to report the measurement result in the CC and the measurement result in the extension band at more appropriate timing for each.

Fourth Embodiment

According to the fourth embodiment, the measurement related information is setting information related to the transmission of the control signal used for measurement by the UE. In addition, the measurement related control includes control of the transmission of the control signal in the extension band (that is, the control signal transmission control).

For example, the control signal transmission control includes control of the transmission of the control signal in a manner that the density of the control signal transmitted in the extension band is different from the density of the control signal transmitted in the CC. More specifically, for example, the control signal transmission control includes control of the transmission of the control signal in a manner that the density of the control signal transmitted in the extension band is lower than the density of the control signal transmitted in the CC.

As an example, the control signal transmission control includes control of the transmission of the control signal in a manner that the control signal is transmitted in the extension band with less antenna ports than antenna ports used for the transmission of the control signal in the CC.

By such control of the transmission of the control signal, the number of control signals used for measurement is reduced. Thus, for example, it becomes possible to suppress the load of measurement by the UE in a case in which the extension band is also used. In addition, for example, an overhead due to the control signal used for measurement is suppressed.

According to the modification example of the fourth embodiment, the control signal transmission control includes control of the transmission of the control signal in a manner that the control signal is not transmitted in the extension band.

By control of the transmission of the control signal in this manner, measurement is not executed in the extension band. Thus, for example, it becomes possible to suppress the load of measurement by the UE in a case in which the extension band is also used. In addition, for example, an overhead due to the control signal used for measurement is suppressed.

The preferred embodiments of the present disclosure have been described above with reference to the accompanying drawings, whilst the present disclosure is not limited to the above examples, of course. A person skilled in the art may find various alterations and modifications within the scope of the appended claims, and it should be understood that they will naturally come under the technical scope of the present disclosure.

In addition, examples in which the communication system is a system complied with LTE, LET-A, or a communication standard equivalent to this have been described above; however, the present disclosure is not limited to the above examples. For example, the communication system may be a system complied with another communication standard. Furthermore, examples in which the communication system includes the eNode B as an example of a base station (or access point) and the UE as an example of the terminal device have been described above; however, the present disclosure is not limited to the above examples. For example, the communication system may include another kind of base station (or access point) and/or another kind of terminal device.

Also, the process steps in the communication control process in this specification are not strictly limited to being executed in a time series following the sequence described in a flowchart. For example, the process steps in the communication control process may be executed in a sequence that differs from a sequence described herein as a flowchart, and furthermore may be executed in parallel.

Also, it is possible to create a computer program for causing the processor (for example, CPU, DSP, etc.) equipped in a device (for example, the communication control device and/or the terminal device) of the present specification to function as the components (for example, the information acquisition unit and the communication control unit) of the above device (in other words, a computer program for causing the above processor to execute the operation of the components of the above device). Also, a storage medium storing the computer program may be provided. Also, a device (for example, a completed product or a module (component, processing circuit, chip, etc.) for a completed product) including a memory that stores the above computer program and one or more processors capable of executing the above computer program may be provided. Also, a method including the operation of the components of the above device (for example, the information acquisition unit and the communication control unit) is included in the technology according to the present disclosure.

Additionally, the present technology may also be configured as below.

(1)

A communication control device including:

an acquisition unit configured to acquire measurement related information related to execution of measurement by a terminal device in an extension band, which is other than a band of a predetermined bandwidth in frequency bands allocated to a service provider; and a control unit configured to perform control related to the measurement by the terminal device in the extension band, on the basis of the measurement related information.

(2)

The communication control device according to (1), wherein the measurement related information is information related to execution and non-execution of the measurement by the terminal device in the extension band, and wherein the control related to the measurement by the terminal device includes control of the execution of the measurement by the terminal device in the extension band.

(3)

The communication control device according to (2), wherein the control of the execution of the measurement by the terminal device includes instructing the terminal device to execute or not to execute measurement in the extension band.

(4)

The communication control device according to (3), wherein the control of the execution of the measurement by the terminal device includes instructing the terminal device to execute or not to execute measurement in the extension band in a manner that a terminal device that is using the frequency bands for communication does not execute measurement in the extension band.

(5)
The communication control device according to any one of (1) to (4),
wherein the acquisition unit acquires each of a first measurement result and a second measurement result, the first measurement result being a result of measurement by the terminal device in the band of the predetermined bandwidth, the second measurement result being a result of measurement by the terminal device in the extension band.

(6)
The communication control device according to (5),
wherein the first measurement result is a result obtained by measurement for a first period in the band of the predetermined bandwidth,
wherein the second measurement result is a result obtained by measurement for a second period in the extension band, and
wherein the second period is longer than the first period.

(7)
The communication control device according to (5) or (6),
wherein a condition for a report of the second measurement result is different from a condition for a report of the first measurement result.

(8)
The communication control device according to (7),
wherein the report of the first measurement result is a report triggered by each of one or more kinds of events, and
wherein the report of the second measurement result is a report triggered by each of at least one kind of event including another kind of event that is not included in the one or more kinds of events.

(9)
The communication control device according to (8),
wherein the other kind of event is that a relation between the first measurement result and the second measurement result satisfies a predetermined condition.

(10)
The communication control device according to any one of (7) to (9),
wherein the report of the first measurement result and the report of the second measurement result are reports that are triggered by at least one event of a same kind, and
wherein a part or all of the at least one event of the same kind has a first threshold for the report of the first measurement result and a second threshold for the report of the second measurement result.

(11)
The communication control device according to any one of (7) to (10),
wherein the report of the first measurement result is a report made in a first cycle, and
wherein the report of the second measurement result is a report made in a second cycle that is different from the first cycle.

(12)
The communication control device according to (1),
wherein the measurement related information is setting information related to transmission of a control signal used for measurement by the terminal device, and
wherein the control related to the measurement by the terminal device includes control of the transmission of the control signal in the extension band.

(13)
The communication control device according to (12),
wherein the control of the transmission of the control signal includes control of the transmission of the control signal in a manner that a density of the control signal transmitted in the extension band is different from a density of the control signal transmitted in the band of the predetermined bandwidth.

(14)
The communication control device according to (13),
wherein the control of the transmission of the control signal includes control of the transmission of the control signal in a manner that the density of the control signal transmitted in the extension band is lower than the density of the control signal transmitted in the band of the predetermined bandwidth.

(15)
The communication control device according to (14),
wherein the control of the transmission of the control signal includes control of the transmission of the control signal in a manner that the control signal is transmitted in the extension band with a smaller number of antenna ports than a number of antenna ports with which the control signal is transmitted in the band of the predetermined bandwidth.

(16)
The communication control device according to (14),
wherein the control of the transmission of the control signal includes control of the transmission of the control signal in a manner that the control signal is not transmitted in the extension band.

(17)
A communication control method including:
acquiring measurement related information related to execution of measurement by a terminal device in an extension band, which is other than a band of a predetermined bandwidth in frequency bands allocated to a service provider; and
performing control related to the measurement by the terminal device in the extension band, on the basis of the measurement related information.

(18)
A terminal device including:
a recognition unit configured to recognize an extension band, which is other than a band of a predetermined bandwidth in frequency bands allocated to a service provider; and
a control unit configured to control execution of measurement in a manner that part of the measurement in the extension band is not executed or none of the measurement in the extension band is executed.

(19)
The terminal device according to (18),
wherein, in a case in which the terminal device is in an idle state for a radio resource, the control unit controls the execution of the measurement in a manner that the measurement in the extension band is not executed.

(20)
An information processing device including:
a memory configured to store a predetermined program; and
a processor capable of executing the predetermined program,
wherein the predetermined program causes execution of recognizing an extension band, which is other than a band of a predetermined bandwidth in frequency bands allocated to a service provider, and controlling execution of measurement in a manner that part of the measurement in the extension band is not executed or none of the measurement in the extension band is executed.

REFERENCE SIGNS LIST 1 communication system
10 cell
20 UE (User Equipment)
100 eNode B
151, 161, 171 information acquisition unit
153, 163, 173 communication control unit
200 UE (User Equipment)
261 band recognition unit
265, 271, 283, 293 measurement control unit
267, 285, 295 report unit

The invention claimed is:

1. A communication control device comprising:
a frequency band allocated to a service provider, the frequency band including a predetermined bandwidth and an extension band;
acquisition circuitry configured to acquire measurement related information related to execution of measurement by a terminal device in the extension band, which is a frequency band directly adjacent to and narrower than a band of the predetermined bandwidth in frequency bands allocated to the service provider; and
control circuitry configured to perform control related to the measurement which is averaged over a period of time by the terminal device in the extension band, based on the measurement related information.

2. The communication control device according to claim 1,
wherein the measurement related information is information related to execution and non-execution of the measurement by the terminal device in the extension band, and
wherein the control related to the measurement by the terminal device includes control of the execution of the measurement by the terminal device in the extension band.

3. The communication control device according to claim 2,
wherein the control of the execution of the measurement by the terminal device includes instructing the terminal device to execute or not to execute measurement in the extension band.

4. The communication control device according to claim 3,
wherein the control of the execution of the measurement by the terminal device includes instructing the terminal device to execute or not to execute measurement in the extension band in a manner that a terminal device that is using the frequency bands for communication does not execute measurement in the extension band.

5. The communication control device according to claim 1,
wherein the acquisition circuitry acquires each of a first measurement result and a second measurement result, the first measurement result being a result of measurement by the terminal device in the band of the predetermined bandwidth, the second measurement result being a result of measurement by the terminal device in the extension band.

6. The communication control device according to claim 5,
wherein the first measurement result is a result obtained by measurement for a first period in the band of the predetermined bandwidth,
wherein the second measurement result is a result obtained by measurement for a second period in the extension band, and
wherein the second period is longer than the first period.

7. The communication control device according to claim 5,
wherein a condition for a report of the second measurement result is different from a condition for a report of the first measurement result.

8. The communication control device according to claim 7,
wherein the report of the first measurement result is a report triggered by each of one or more kinds of events, and
wherein the report of the second measurement result is a report triggered by each of at least one kind of event including another kind of event that is not included in the one or more kinds of events.

9. The communication control device according to claim 8,
wherein the another kind of event is that a relation between the first measurement result and the second measurement result satisfies a predetermined condition.

10. The communication control device according to claim 7,
wherein the report of the first measurement result and the report of the second measurement result are reports that are triggered by at least one event of a same kind, and
wherein a part or all of the at least one event of the same kind has a first threshold for the report of the first measurement result and a second threshold for the report of the second measurement result.

11. The communication control device according to claim 7,
wherein the report of the first measurement result is a report made in a first cycle, and
wherein the report of the second measurement result is a report made in a second cycle that is different from the first cycle.

12. The communication control device according to claim 1,
wherein the measurement related information is setting information related to transmission of a control signal used for measurement by the terminal device, and
wherein the control related to the measurement by the terminal device includes control of the transmission of the control signal in the extension band.

13. The communication control device according to claim 12,
wherein the control of the transmission of the control signal includes control of the transmission of the control signal in a manner that a density of the control signal transmitted in the extension band is different from a density of the control signal transmitted in the band of the predetermined bandwidth.

14. The communication control device according to claim 13,
wherein the control of the transmission of the control signal includes control of the transmission of the control signal in a manner that the density of the control signal transmitted in the extension band is lower than the density of the control signal transmitted in the band of the predetermined bandwidth.

15. The communication control device according to claim 14,
wherein the control of the transmission of the control signal includes control of the transmission of the control signal in a manner that the control signal is transmitted in the extension band with a smaller number of antenna ports than a number of antenna ports with which the control signal is transmitted in the band of the predetermined bandwidth.

16. The communication control device according to claim 14,
wherein the control of the transmission of the control signal includes control of the transmission of the control signal in a manner that the control signal is not transmitted in the extension band.

17. A communication control method comprising:
allocating a frequency band to a service provider, the frequency band including a predetermined bandwidth and an extension band;
acquiring measurement related information related to execution of measurement by a terminal device in the extension band, which is a frequency band directly adjacent to and narrower than a band of the predetermined bandwidth in frequency bands allocated to the service provider; and
performing control related to the measurement which is averaged over a period of time by the terminal device in the extension band, based on the measurement related information.

18. A terminal device comprising:
a frequency band allocated to a service provider, the frequency band including a predetermined bandwidth and an extension band;
recognition circuitry configured to recognize the extension band, which is a frequency band directly adjacent to and narrower than a band of the predetermined bandwidth in frequency bands allocated to the service provider; and
control circuitry configured to control execution of measurement, which is averaged over a period of time, in a manner that part of the measurement in the extension band is not executed or none of the measurement in the extension band is executed, based on acquired measurement related information related to the execution of measurement.

19. The terminal device according to claim 18,
wherein, in a case in which the terminal device is in an idle state for a radio resource, the control circuitry controls the execution of the measurement in a manner that the measurement in the extension band is not executed.

20. An information processing device comprising:
a memory configured to store a predetermined program;
a processor capable of executing the predetermined program; and
a frequency band allocated to a service provider, the frequency band including a predetermined bandwidth and an extension band;
wherein the predetermined program causes execution of recognizing the extension band, which is a frequency band directly adjacent to and narrower than a band of the predetermined bandwidth in frequency bands allocated to the service provider, and
controlling execution of measurement, which is averaged over a period of time, in a manner that part of the measurement in the extension band is not executed or none of the measurement in the extension band is executed, based on acquired measurement related information related to the execution of measurement.

* * * * *